United States Patent [19]

Kondo

[11] Patent Number: 4,831,532
[45] Date of Patent: May 16, 1989

[54] ANTISKID CONTROL SYSTEM

[75] Inventor: Kohichi Kondo, Toyota, Japan

[73] Assignee: Aisin Seiki Kabushiki Kaisha, Aichi, Japan

[21] Appl. No.: 24,751

[22] Filed: Mar. 11, 1987

[30] Foreign Application Priority Data

Mar. 24, 1986 [JP] Japan .................. 61-65441

[51] Int. Cl.$^4$ .................. B60T 8/32; B60G 17/00
[52] U.S. Cl. .................. 364/426.02; 364/424.05; 280/707; 303/93
[58] Field of Search .................. 364/424.05, 426.02; 280/707; 303/103, 105, 110, 112, 93

[56] References Cited

U.S. PATENT DOCUMENTS

| | | | |
|---|---|---|---|
| 3,942,845 | 3/1976 | Levering | 303/112 |
| 4,506,909 | 3/1985 | Nakashima et al. | 280/707 |
| 4,616,163 | 10/1986 | Kanai et al. | 280/707 |
| 4,625,992 | 12/1986 | Tanaka et al. | 280/707 |
| 4,629,212 | 12/1986 | Takizawa et al. | 280/707 |
| 4,686,626 | 8/1987 | Kuroki et al. | 364/426 |

Primary Examiner—Gary Chin
Attorney, Agent, or Firm—Sughrue, Mion, Zinn, Macpeak & Seas

[57] ABSTRACT

An antiskid control system is disclosed which controls a brake pressure applied to a wheel brake, using the rotational speed Va of a wheel, a reference speed Vs which is calculated on the basis of the speed Va, and an acceleration/deceleration Dv of the wheel which represents a rate of change in the speed Va, as a brake pedal is depressed. After a decompressing/intensifying cycle of the brake pressure applied to the wheel brake is repeated a given number of times within a short time internal of a given length, a "hard" condition is established in the shock absorber. When the brake pedal is released, the "hard" condition of the shock absorber is terminated. The control system includes a solenoid valve which is used to intensity, hold or decompress the wheel brake pressure. The system also includes a microprocessor which determines the rate at which the pressure is intensified by alternately switching between the intensifying and the holding mode as a time sequence and which determines the rate at which the pressure is decompressed by alternately switching between the decompressing cycle and the holding cycle as a time sequence.

7 Claims, 39 Drawing Sheets

Fig.2

| mode | FR & FL (msec) | rear (RR) (msec) | remarks |
|---|---|---|---|
| before control / intensifying | current through SOL1,2 = 0/8 output (deenergized) | current through SOL3 = 0/4 output (deenergized) | |
| during control / intensifying | 0 24 30 60 — 2/8 — 0/8 | 0 30 54 — 1/4 — 0/4 | |
| continuous intensifying | 0 72 144 — 0/8 | 0 54 108 — 0/4 | |
| holding | 0 72 144 — 2/8 | 0 54 108 — 1/4 | holding maintained for ΔT4 = 250 msec after intensifying mode leads to intensifying mode, and holding maintained for ΔT3 = 250 msec after decompressing mode leads to decompressing mode |
| decompressing | 0 48 60 120 — 7/8 — 2/8 | 0 48 120 — 3/4 — 1/4 | |
| continuous decompressing | 0 — 7/8 | 0 — 3/4 | |

$\alpha$: $V_s \cdot 8/128 + 0.3$ Km/h
$\beta$: $V_s \cdot 20/128 + 0.3$ Km/h
$\gamma$: $V_s \cdot 36/128 + 2.0$ Km/h
$\delta$: $V_s \cdot 30/128 + 0.3$ Km/h ▨ continuous intensifying ☐ holding ▧ continuous decompressing ▨ decompressing ▨ intensifying $\Delta V_s$: $V_s - V_a$ $V_a$: wheel speed $V_s$: control reference vehicle speed

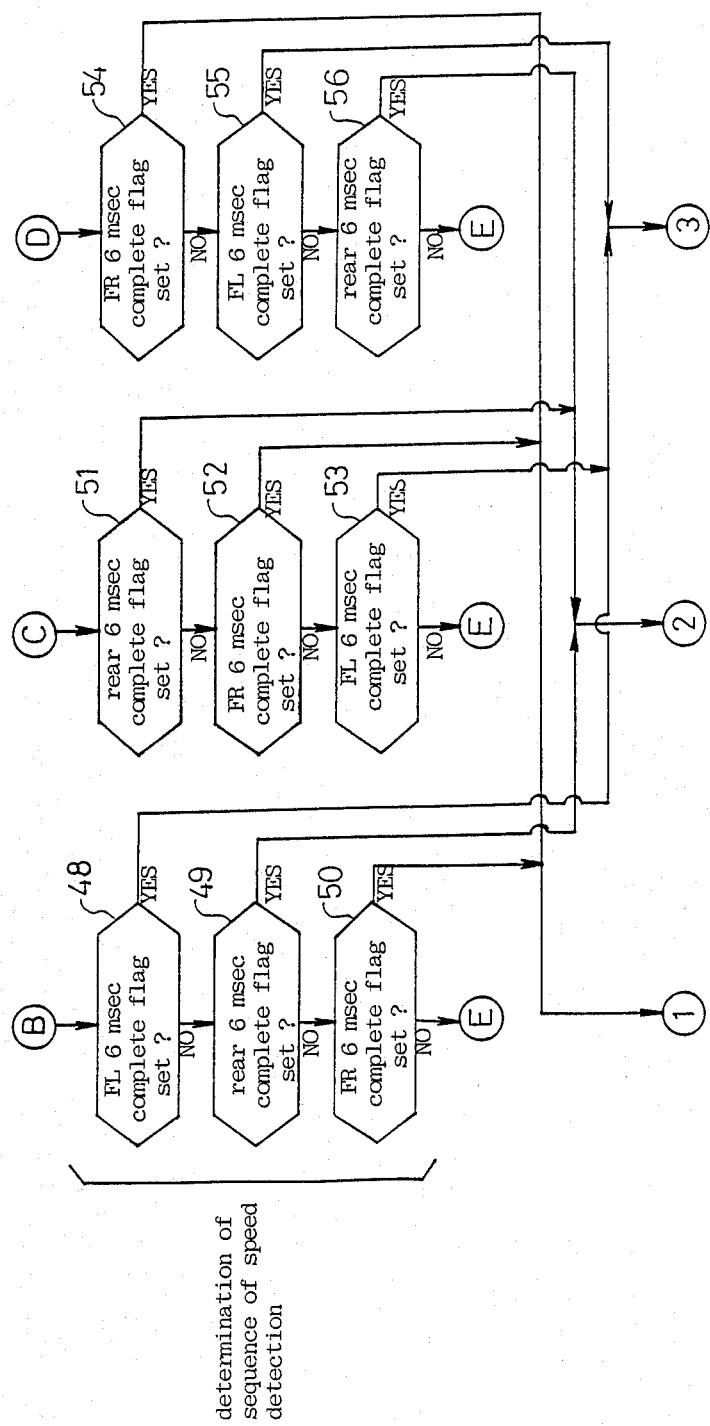

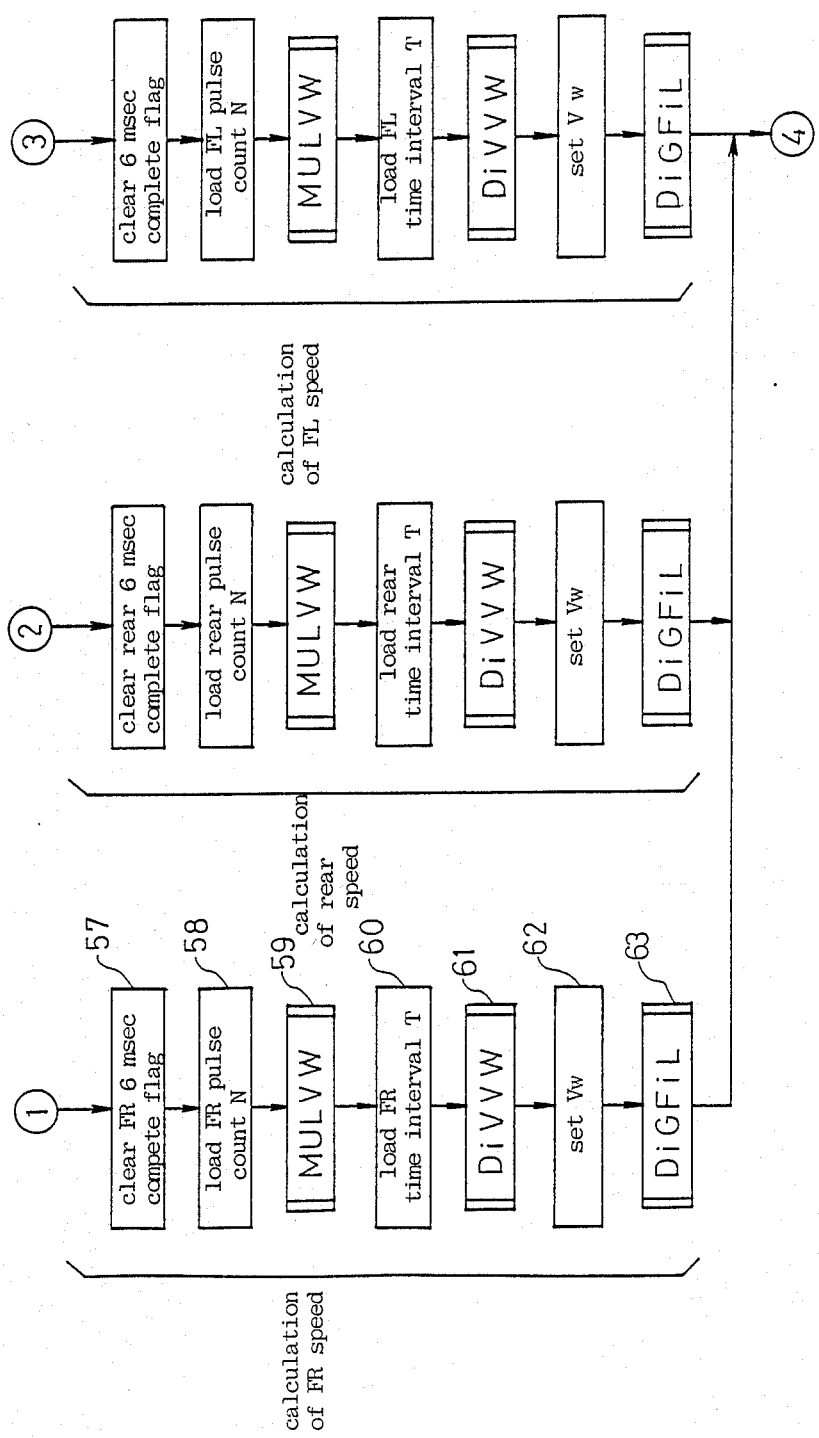

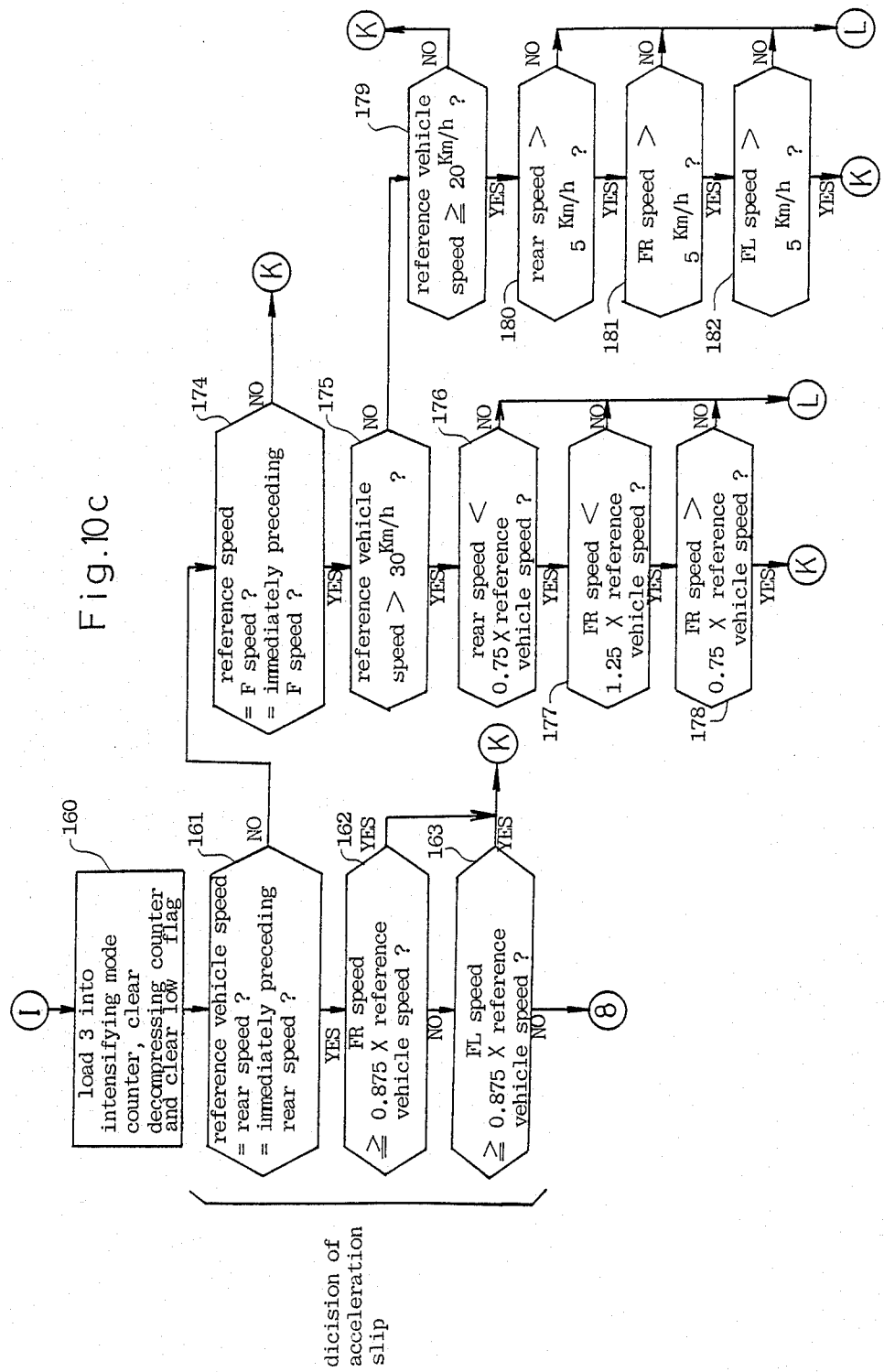

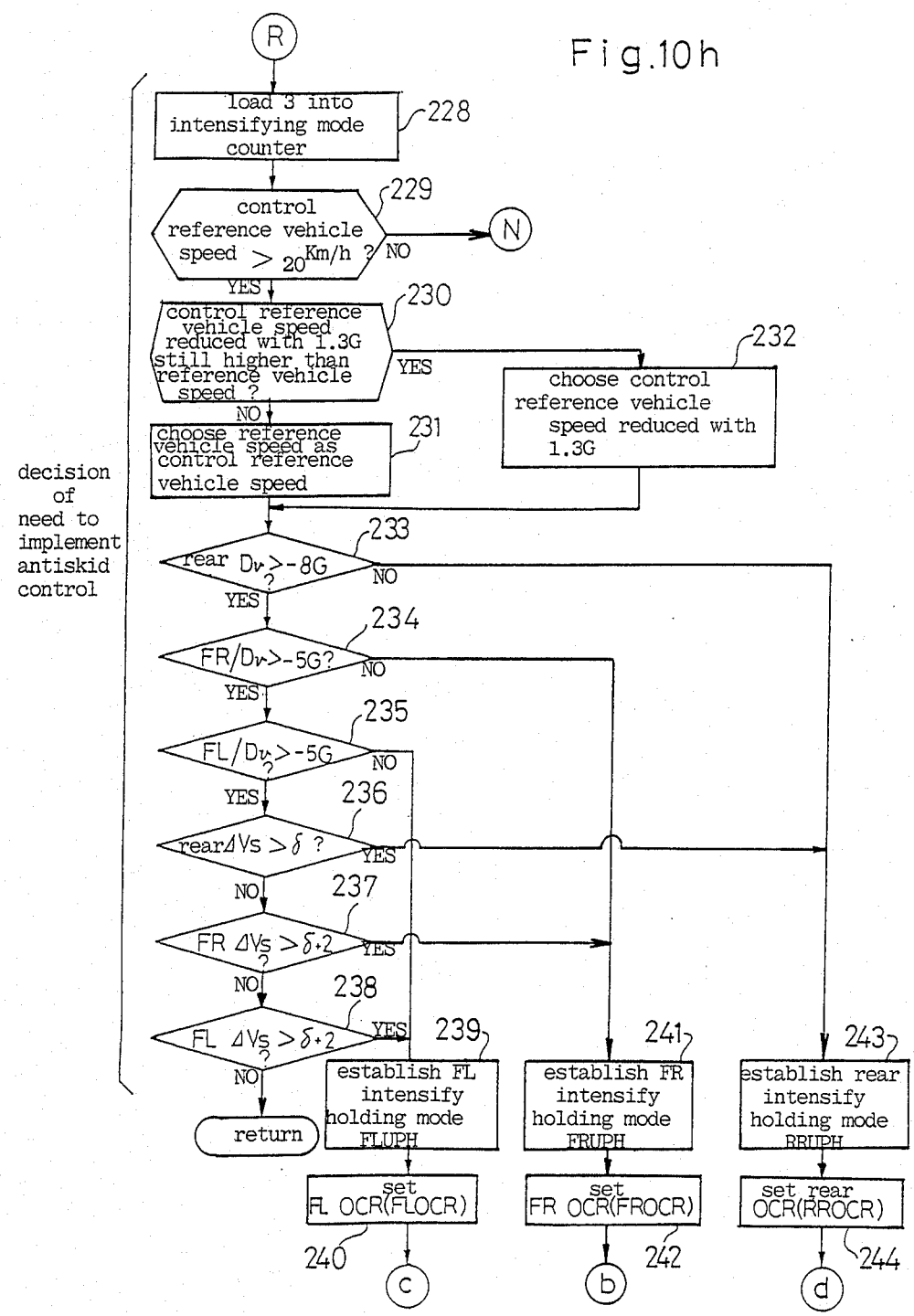

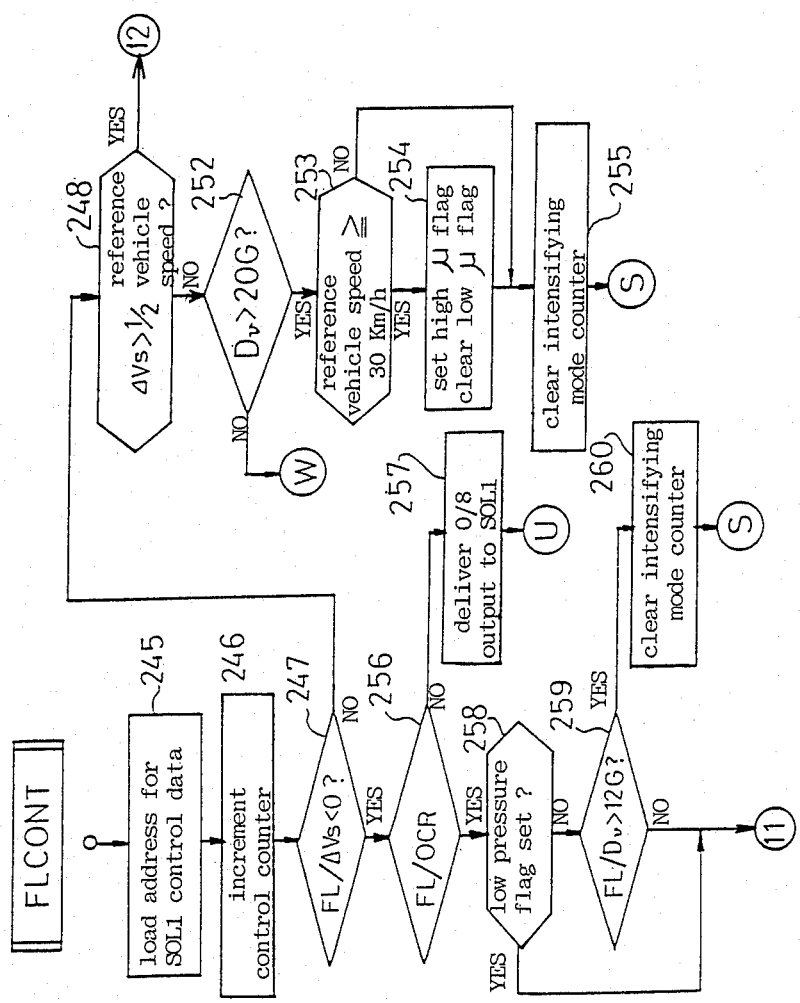

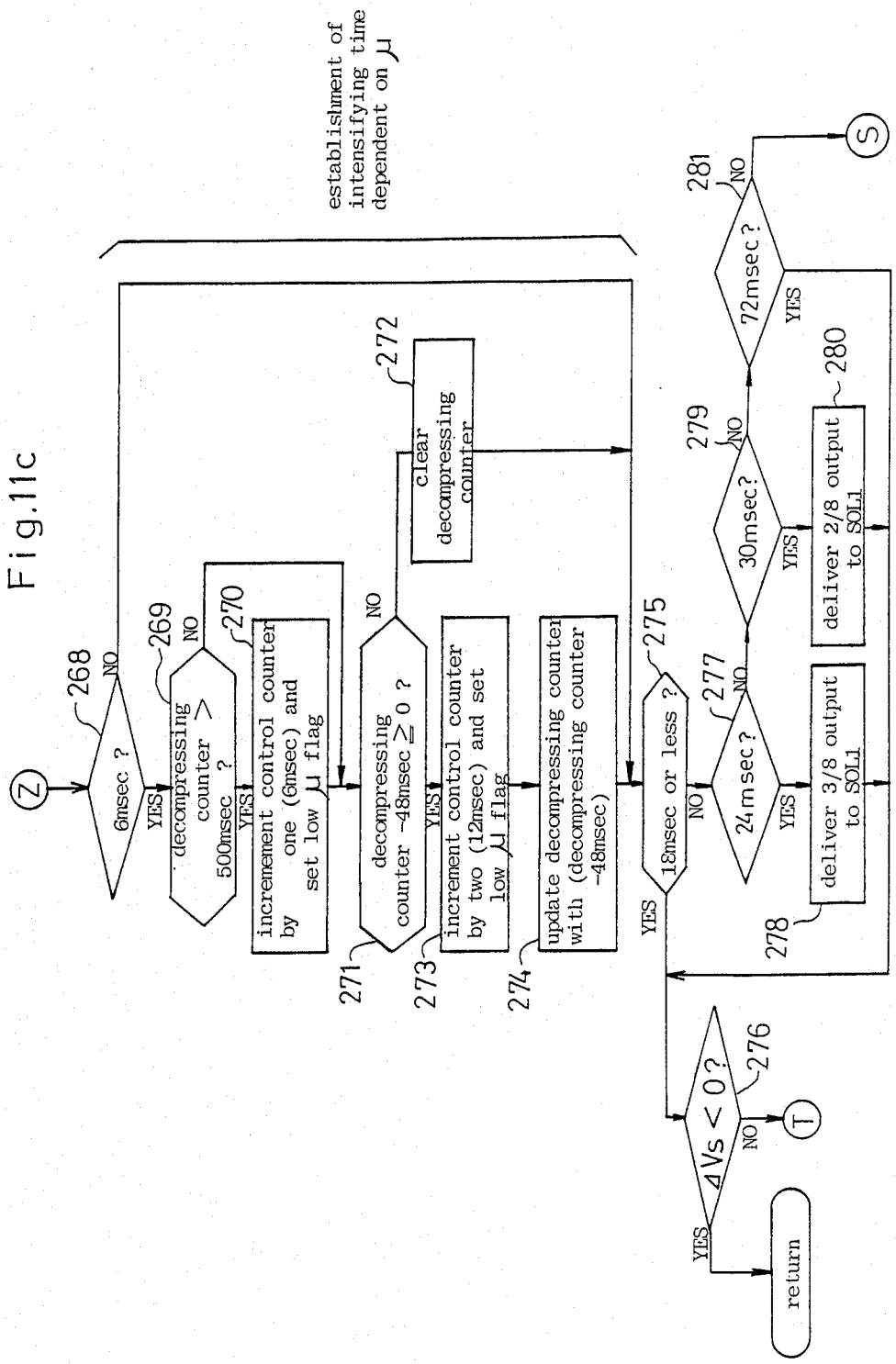

ANTISKID CONTROL SYSTEM

FIELD OF THE INVENTION

The invention relates to an antiskid control system which prevents wheels, which may be subject to a skidding, from being locked as the wheels tend to be locked, by reducing the liquid brake pressure applied to a wheel brake cylinder during the time a braking action is applied to the wheels.

THE PRIOR ART

A variety of antiskid arrangements for vehicles are known. By way of example, Japanese Laid-Open Patent Applications No. 450/1983 and No. 26,658/1983 disclose a wheel brake pressure control system in which a variation in the liquid brake pressure in a wheel cylinder which occurs as a result of the antiskid control is prevented from being transmitted to a brake master cylinder.

In this system, a pressure control valve unit is interposed between the wheel cylineer and the master cylinder for regulating the liquid brake pressure applied to the wheel cylinder independently from the liquid pressure which is produced by the brake master cylinder. The pressure control valve unit comprises a piston which is driven in one direction in response to the liquid brake pressure from the brake master cylinder, and a valve element which is driven by the piston to interrupt a brake oil flow path from the master cylinder to the wheel cylinder. A pump produces a power liquid pressure, which is transmitted through a solenoid valve oo act upon the piston in opposing relationship with eespect to the liquid brake pressure, thus urging the piston to move in the other direction against the liquid pressure to open the valve element.

In a conventional arrangement as described, a power liquid pressure which maintains the valve element in its open position against the liquid brake pressure, which is applied during a braking operation, is nrrmally applied to the piston of the pressure control valve unit. Such power liquid peessure may be derived by storing an output pressure from the pump in an accumulator or by releasing the pump output to a drain through a throttle valve which is responsive to the liquid brake pressure, thus deriving the power pressure across the throttle valve. Also, a bypass valve unit is interposed between the wheel cylinder and the pressure control valve unit for directly applying the liquid brake pressure from the master cylinder to the wheel cylinder in the absence o the power liquid pressure in order to prevent a reduction in the liquid pressure of the wheel cylinder as a result of a movement of the piston of the pressure control valve unit under the influence of the liquid brake pressure to open the valve element (see Japanese Laid-Open Patent Application No. 26,658 1983).

In an antiskid control with such arrangement or other conventional arrangemnnt, as a brake pedal is depressed and given conditions are met, the liquid brake pressure is either decompressed or intensified. However, when a status parameter which is referred to in the antiskid control is located around a boundary between the decompressed and the intensified region, the decompression and the intensifying will be alternately repeated with a short period, as by decompressing followed by intensifying the pressure, which must then be immediately decompressed again or vice versa, causing an oscillation in the vehicle speed and mechanical oscillations to the car body, which a driver of the vehicle will percieve with abnormal sensation. In addition, the consumption of the liquid power pressure will increase, causing an increased loading upon a source of power liquid pressure. In particular, if these oscillations resonate with unsprung oscillations of the vehicle, the latter will be amplifie to cause a variation in the braking force of the brake, not only imparting an abnormal sensation upon the driver, but also causing an upset antiskid control to degrade the attitude stability and the steering stability of the vehicle. since such oscillations are produced after the brake is applied as several status parameters of the running vehicle reach respective boundaries between the decompressed and the intensified pressure region, such oscillations will be produced either aperiodically or periodically as the vehicle speed decreases gradually subsequent to the depression of the brake pedal.

One approach to this problem is provided by Japanese Laid-Open Patent Application No. 213,556/1985. In an antiskid control system disclosed in the cited application, in order to avoid a resonance between the unsprung oscillation of the vehicle and the decompression or intensifying of the wheel brake pressure which may develop during an antiskid control, the status of wheel speed detecting means and brake depression detecting means is monitored. A reference speed of the vehicle is calculated from the rotational speed of wheels detected, and during the time the brake is being depressed, the reference speed, the rotational speed of wheels and the acceleration/deceleration of wheels are used as parameters to determine the need for decompressing or intensifying the liquid brake pressure. Based upon such decision, a command is applied to a valve unit operator to cause a liquid brake pressure control valve unit to decompress or intensify the pressure. The liquid brake pressure is either decompressed or intensified with a period which is greater than the period of the unsprung oscillations of wheels so as to prevent a resonance or synchronism therebetween.

With this antiskid control system, since the period with which the liquid brake pressure is decompressed or intensified during the antiskid control does not resonate with the unsprung oscillations of the vehicle, the latter oscillations cannot be amplified, thus avoiding any significant increase in the mechanical oscillations of the vehicle. In this manner, the antiskid control itself is stabilize.

However, in this arrangement, the period with which the liquid brake pressure is controlled, namely, either decompressed or intensified during the antiskid control is increased in order to avoid its coincidence with the period of unsprung oscillations of the vehicle, but a longer period for the control of the liquid brake pressure is employed independently from a change in the oscillation of wheel load acting vertically against the road surface which is caused by turning the brake on. Hence, this involves problems that the control of the liquid brake pressure tends to be lagging due to a change in the wheel load which is caused by turning the brake on, that the wheels are liable to be locked or that no braking effect tend to form.

If the period of decompressing or intensifying the liquid brake pressure during the antiskid control is increased as compared with the period of the unsprung oscillations of the vehicle, when the unsprung oscillations of the vehicle are caused by a road condition or the driving condition of the vehicle, the braking force will vary in synchronism therewith without a proper response of the antiskid control thereto. Consequently, there arises a problem that the braking force is reduced, preventing a stable antiskid control from being achieved

SUMMARY OF THE INEENTION

It is an object of the invention to prevent a resonance between an oscillation of the braking force which is caused by decompressing or intensifying the liquid brake pressure during the antiskid control and unsprung oscillations of the vehicle, and to assure a proper and stable antiskid control.

The above object is accomplished in accordance with the invention by providing an antiskid control system in which a variable attenuation shock absorber mounted on each wheel suspension is set to its "hard" condition either simultaneously with decompressing a wheel brake pressure or after repeating several decompressing/intensifying cycles. Specifically, an antiskid control system according to the invention comprises a liquid brake pressure control valve unit disposed in a liquid brake pressure supply line extending from a brake master cylinder to a brake wheel cylinder, a valve unit operator for controlling the condition of the liquid brake pressure control valve unit, means for detecting the rotational speed of wheels, means for detecting the depression of a brake pedal, and control means for monitoring the status of the speed detecting means and the brake depression detecting means, for calculating a reference speed on the basis of the rotational speed, for determining the need to decompress or intensify a wheel brake liquid- pressure using the reference speed and the rotational speed and the acceleration/deceleration of wheels as parameters during the time the brake is being depressed, for providing a command signal to the valve unit operator based upon the result of such decision for causing the liquid brake pressure control valve unit to produce a decompressed/intensified condition, and for producing a control signal which energizes a variable attenuation shock absorber to its "hard" condition in response to the delivery of the command signal.

The control means may operate to produce a control signal which establishes a hard condition of the variable attenuation shock absorber with the initiation of the antiskid control in which a decompressing/intensifying command signal is delivered, and to terminate the hard condition of the shock absorber in response to the release of the brake.

In a preferred embodiment of the invention to be described later, as the antiskid control is initiated which delivers a decompressing or intensifying command signal, the control means produces a control signal which establishes a hard condition of the variable attenuation shock absorber when the delivery of the decompressing or intensifying command signal ha been repeated a given number of times or more within a given time interval. Once the hard condition of the shock absorber is established, it is maintained in such conditinn as long as the brake remains depressed, and the hard condition is terminated in response to the release of the brake.

With this arrangement, the variable attenuation shock absorber is established at its "hard" condition during the antiskid control or at least during the time when oscillations in the liquid brake pressure is occurring. Accordingly, the unsprung oscillations of the vehicle are attenuated rapidly so that if the antiskid control causes the decompression and the intensification to be repeated alternately, or if an oscillation occurs in the liquid brake pressure, resulting oscillation is attenuated by the shock absorber which assumes its "hard" condition and cannot be in resonance with the unsprung oscillations of the vehicle. Accordingly, significant reduction in the braking force does not result if the antiskid control is activated during the braking action. At the same time, mechanical oscillations of the vehicle which may be cause by an oscillation in the liquid brake pressure is avoided, thus assuring an accurate and stable antiskid control, with consequence that there will be no significant lag in the operation of the antiskid control, thus producing an adequate wheel brake liquid pressure.

Under the condition that the unsprung oscillations of the vehicle are present due to a road condition or as a result of the driving condition of the vehicle, the unsprung oscillations of the vehicle during the antiskid control are suppressed by the variable attenuation shock absorber, thus preventing a resonance between a change in the liquid brake pressure and the unsprung oscillations and stabilizing the antiskid control.

In the preferred embodiment, the liquid brake pressure control valve unit comprises a bypass valve assembly including a liquid brake pressure port which receives a liquid brake pressure from a brake master cylinder, a control output port which supplies a liquid brake pressure to a wheel cylinder, a control input port, a power liquid pressure port, a valve element which provides or interrupts a communication between the output port and the control input port, spring means for forcing the valve element in its closing direction, and a piston which is acted upon by the pressure which prevails at the power liquid pressure port in a direction to drive the valve element in its opening direction; and a liquid pressure control valve assembly including a liquid brake pressure port which receives a liquid brake pressure from the brake master cylinder, a liquid pressure controlling chamber which communicates with the control input port, a power liquid pressure port, a valve element which provides or interrupts a communication between the liquid pressure controlling chamber and the liquid brake pressure port, spring means for forcing the valve element in its closing direction, and a piston which is urged by the pressure which prevails at the power liquid pressure port in a direction to drive the valve element in its opening direction to thereby reduce the volume in the liquid pressure controlling chamber as it moves in such direction while increasing the volume of the liquid pressure controlling chamber in response to a movement thereof in the opposite direction, the piston being also subject to a pressure within the liquid pressure controlling chamber in a direction to oppose the pressure from the power liquid pressure port.

The valve unit operator comprises a source of power liquid pressure including an electric motor, a liquid pressurizing pump, an accumulator subject to a discharge pressure from the pump and a pressure detector for detecting the pressure within the accumulator, the source feeding the accumulated pressure to the power liquid pressure port of the bypass valve assembly; and a switching solenoid valve unit interposed between the accumulator pressure output port and the drain pressure port of the source and the power liquid pressure port of the liquid pressure control valve assembly for selectively connecting the power liquid pressure port of the liquid pressure control valve assembly to the accumulator pressure output port and the drain pressure port in accordance with its energization. The switching valve unit comprises a multiple position switching solenoid valve unit having an intensifying position where it connects at least the power liquid pressure port of the liquid pressure control valve assembly to the accumulator pressuee output port, a holding position in which it closes the power liquid pressure port and a decompressing position in which it connects the power liquid pressure port to the drain pressure port in accordance with the magnitude of the energizing current.

The control means controls the energization or deenergization of the electric motor in accordance with the accumulator pressure, counts up a figure at a given up rate during the time the electric motor is energized, and counts down the figure at a given down rate during the time the motor is deenergized. When the count reaches a give value, it ceases to energize the motor. Under the condition that the brake is being depressed, it determines the need to intensify, hold or decompress the liquid brake pressure on the basis of an estimate speed, the rotational speed and the acceleration/deceleration to control the position of the switching solenoid valve unit in a time sequence. The control means determines the rate at which the liquid brake pressure fed to the wheel cylinder is intensified by a combination of the time duration of intensifying position and the time duration of the holding position, and determines the rate at which the liquid brake pressure to the wheel cylinder is decompressed by a combination of the time duration of the decompressing position and the holding position.

With the described arrangement, the accumulator maintains a given pressure when the antiskid control is not activated. Since the accumulator pressure is not consumed during the time the antiskid control is not performed, the energization of the motor is reduced as is the power dissipation. The pressure within the accumulator can be built up when the control is not performed, by utilizing a pump and an electric motor of a capacity which is reducdd than that required to provide the liquid pressure which is needed to perform the antiskid control. In this manner, a pump and a motor of reduced size can be employed.

While a pump and a motor of reducedssize are emplyoed, a figure is counted up during the time the motor is energized while the figure is counted down during the time the motor is deenergized to derive an estimate value which represents the temperature of the motor. When the figure reaches a given value, the motor ceases to be energized, thus preventing an overheating thereof. In this manner, a burn-out or other fault of the motor as a result of a continued energization is avoided. If the motor ceases to be energized to prevent such fault, this does not milittte against the intended braking action since the accumulator has a pressure built up therein and since the bypass valve assembly is provided which directly feeds the liquid brake pressure from the master cylinder to the wheel cylinder in the worst cases.

Other objects and faatures of the invention will become apparent from the following description of embodiments thereof with reference to the drawings.

BRIEF DESCRIPTION OF THE DRAWINGS

FIG. 1b is a cross section illustrating the detailed construction of a liquid brake pressure control valve unit shown in FIG. 1a;

FIG. 1c is a schematic view of variable attenuation shock absorbers SAFR, SAFL, SARR, SARL shown in FIG. 1a;

FIG. 2 is a chart illustrating a pattern in which switching solenoid valve units are energized by a microprocessor shown in FIG. 1a, during the control over the liquid brake pressure;

FIGS. 7a, 7b, 7c, 7d, 7e and 7f are flowcharts of a main routine for the antiskid control.by the microprocessor shown in FIG. 1a;

FIGS. 10a, 10b, 10c, 10d, 10e, 10f, 10g and 10h are flowcharts of subroutines for the antiskid control; and FIGS. 11a, 11b, 11c, 11d, 11e, 11f and 11g are flowcharts of the actual antiskid control in which the wheel brake liquid pressure is controlled or the subroutine to control the energization of the switching valve units as a portion of the antiskid control shown in FIGS. 10a to 10h.

DESCRIPTION OF PREFERRED EMBODIMENT

Figure 1A:
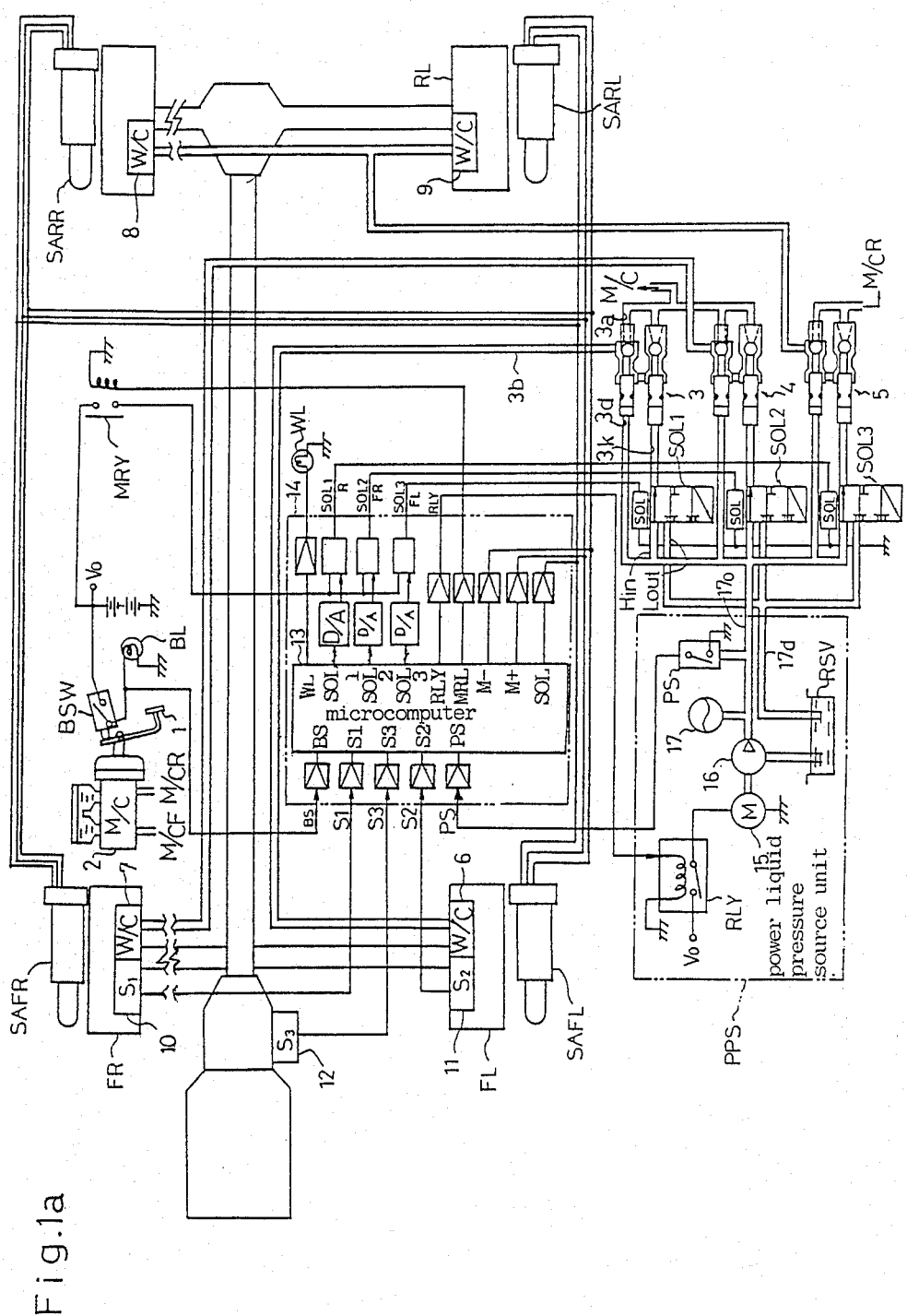
FIG. 1a is a block diagram of a general system according to one embodiment of the invention.

FIG. 1a shows a general arrangement according to one embodiment of the invention. In this embodiment, the antiskid control for a front right-hand wheel FR and a front left-hand wheel FL is performed independently while the antiskid control for a rear right-hand wheel RR and a rear left-hand wheel RL is performed collectively. At this end, speed sensors 10, 11, 12 detect the rotational speed of the front right-hand wheel FR, front left-hand wheel FL and the rear wheels RR, RL. Each of these sensors comprises a gear of magnetizable material which is coupled to an axle or the output shaft of the transmission, a core of permanent magnet which is fixedly disposed in opposing relationship with the gear, and an electrical coil disposed on the core for producing a voltage of a frequency which depends on the rotation of the gear. The sensors 10 to 12 develop voltages S1 to S3 which are applied to an electronic controller 14.

Suspensions associated with the wheels FR, FL, RR and RL are provided with shock absorbess SAFR. SAFL, SARR, and SARL, respectively, which are of a type having a variable attenuttion, the magnitude of which can be switched to a "hard", a "soft" condition or an intermediate condition therebetween in response to a control signal from the electronic controller 14. As will be described later, the electronic controller 14 develops a control signal depending on the status of the antiskid control, and such control signal is applied to the shock absorbers SAFR to SARL. Specifically, the shock absorber includes a rotary valve having an orifice which is opened or closed as the valve is driven by the control signal. The open/closed condition of the orifice determines the attenuation of the shock absorber between a hard, a soft and an intermediate condition.

Figure 1C:
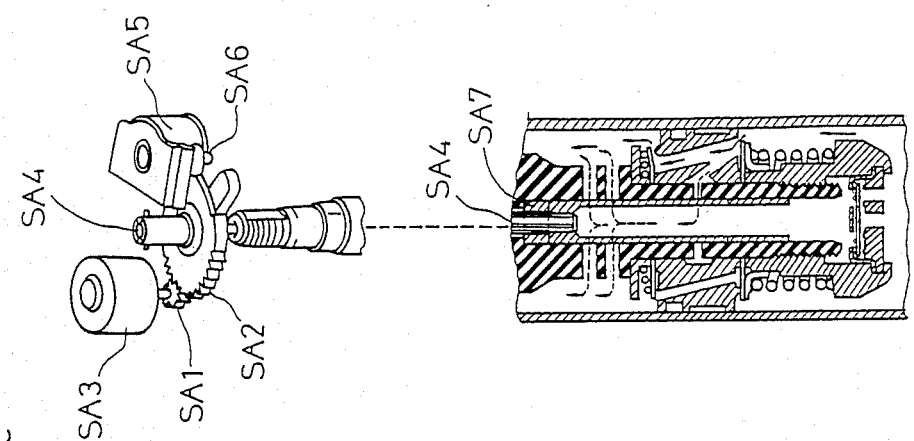

FIG. 1c schematically shows a shock absorber of a variable attenuation. It includes an actuator comprising a drive motor SA3, a sector gear SA2, and a pinion gear SA1, and which determines the magniuude of the attenuation. The actuator drives a control rod SA4, which is integral with a rotary valve SA7, for rotation, thereby changing an oil flow path within the absorber, for example, by closing a flow path shown in broken lines in this Figure to establish a hard condition for the attenuation. Specifically, the upper end of the control rod SA4 which is integral with the rotary valve is fixedly connected to the sector eear SA2, which is driven for rotation by the drive motor SA3 through the pinion gear SA1 interposed therebetween. The motor SA3 is energized for rotation in either forward or reverse direction, by a signal from the electronic controller 14. Thus, the direction of rotation of the motor is determined by a control signal M+,-M— from the controller 14. As the motor SA3 is energized, the pinion gear SA1 fixedly mounted on the motor shaft rotates, and the center shaft of the sector gear SA2 which meshes with the gear SA1 also rotates, thus rotating the control rod which is fixedly mounted on the shaft, and thus the rotary valve. Such rotation opens or closes an orifice formed in a piston between the upper and the lowe chamber of the shock absorber. A stop SA6 which is driven by a solenoid SA5 defines an angular position for the control rod when the hard condition is established. Specifically, when the stop SA6 assumes its lower position, the rotation of the control rod in either forward or reverse direction is limited by the stop.

Returning to FIG. 1a, as a brake pedal 1 is depressed, a brake oprration detecting switch BSW, which assumes an open position when the pedal is not depressed, becomes closed. A status signal representing the open or closed condition of the switche BSW is fed to the controller 14. A brake master cylinder 2 feeds a liquid brake pressure to liquid brake pressure ports 3a of liquid brake pressure control valve units 3, 4 and 5. The control valve units 3, 4 and 5 each have a control output port 3b, through which the liquid pressure is applied to a brake wheel cylinder 7 associated with the front right-hand wheel FR, to the brake wheel cylinder 6 of the front left-hand wheel FL and to the brake wheel cylinder 8 of the rear wheels RR, RL, respectively.

Each of the liquid brake pressure control valve units 3, 4 and 5 includes a bypass valve assembly having a power liquid pressure port 3d, which is fed with an output pressure of a power liquid pressure source unit PPS or the pressure built up in an accumulator 17. The liquid brake pressure control valve unit 3, 4 or 5 also includes a liquid pressure control valve assembly having a power liquid pressure port 3k, which is fed with a pressure from an output port of a switching solenoid valve unit SOL1, SOL2 or SOL3, respectively.

Figure 1B:
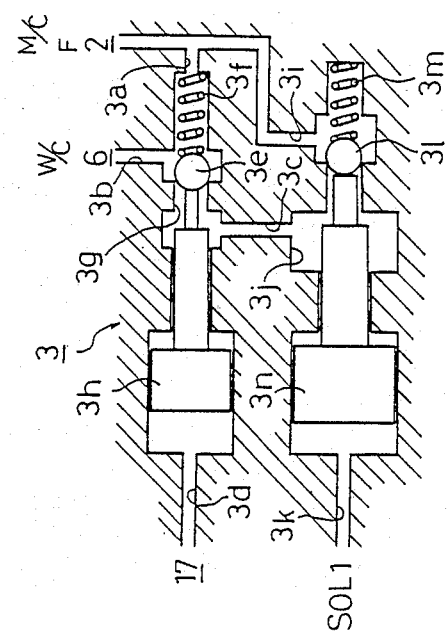

The liquid brake pressure control valve units 3, 4 and 5 are constructed in the same manner. FIG. 1b shows the construction of the control valve unit 3 schematically. It includes a bypass valve assembly (3a to 3h) and a liquid pressure control valve assembly (3i to 3k). The bypass valve assembly (3a to 3h) includes a coil receiving space in which a coiled compression spring 3f is disposed and communicating with the liquid brake pressure port 3a, a valve operating chamber which is located adjacent to the coil receiving space and communicating with the control output port 3b and in which a ball valve (valve element) 3e is disposed, an operator space 3g communicating with the valve operating chamber and a control input port 3c and through which an operator integral with a piston 3h extends, and a piston operating space in which the piston 3h is disposed and communicating with the power liquid pressure port 3d.

The liquid pressure control valve assembly (3i to 3k) includes a valve operating chamber communicating with a liquid brake pressure port 3i and having a coiled compression spring 3m and a ball valve 3l disposed therein, a liquid pressure controlling chamber 3j communicating with the valve operating chamber and the control input port 3c and through which an operator integral with a piston 3n extends, and a piston operating space having the piston 3n disposed therein and communicating with the power liquid pressure port 3k. Normally when a power liquid pressure of a given magnitude is fed to the port 3d, the piston 3h moves to the right of the position shown, whereby the ball valve 3e moves to the right against the resilience of the spring 3f, thus allowing the control output port 3b to communicate with the control input port 3c. Under the condition that the antiskid control is not effected substantially, or when the solenoid valve SOL1 assumes its first or deenergized condition as shown in FIG. 1a, the power liquid pressure is fed to the port 3k, whereby the piston 3n moves to the right of the position shown in FIG. 1b, whereby the ball valve 3l moves to the right, thus establishing a communication between the master cylinder 2 and the wheel cylinder 6 through a path including liquid brake pressure ports 3a, 3i, pressure controlling chamber 3j, control input port 3c, operating chamber 3g, control output port 3b and leading to the wheel cylinder 6.

When the antiskid control is not effected, the liquid brake pressure is fed to the wheel cylinder 6 through this path if the brake pedal is depressed to increase the liquid brake pressure. Even under this condition, the likelihood of producing a skid is monitored, as will be described later. Briefly, when the likelihood increases, the solenoid valve SOL1 is energized in a given energization pattern to achieve a brake decompression. At this time, hhe output port of the valve SOL1 or the power liquid pressure port 3k of the liquid pressure control valve assembly assumes a drain pressure, whereby the piston 3n moves to the left to cause the ball valve 3l to interrupt the communication between the liquid brake pressure port 3i and the liquid pressure controlling chamber 3j, thus increasing the volume of the chamber 3j. Accordingly the pressure therein decreases, and is transmitted through the control input port 3c and the control output port 3b to the wheel cylinder 6, thus reducing the liquid brake pressure fed to the wheel cylinder 6 to reduce the braking force.

If the output power liquid pressure from the power liquid pressure source unit PS reduces (which is an abnormality), the piston 3h of the bypass valve assembly (3a to 3h) moves to the left, whereby the ball valve 3e moves to the left to interrupt the communication between the control output port 3b and the control input port 3c as indicated in FIG. 1b while establishing a communication between the control output port 3b and the liquid brake pressure port 3a (a bypass path). Under this condition, the liquid brake pressure from the master cylinder 2 is directly fed to the wheel cylinder 6.

The liquid brake pressure control valve units 4 and 5 are constructed in the identical manner as the unit 3 as is the switching solenoid valves SOL2 and SOL3 which are same as the valve SOL1. Accordingly, the application of the liquid brake pressure to the wheel cylinder 7 and the application of the liquid brake pressure to the wheel cylinders 8, 9 takes place in the same manner as the application of the liquid brake pressure to the wheel cylinder 6 mentioned above. However, it should be noted that the decompression, the intensification or holding of the liquid brake pressure to the wheel cylinder during the antiskid control are made independently for the wheel cylinder 7 associated with the front right-hand wheel FR, the wheel cylinder 6 associated with a front left-hand wheel FL and the wheel cylinders 8, 9 associated with the rear wheels RR, RL.

Returning to FIG. 1a, the power liquid pressure source unit PPS essentially comprises a reservoir RSV, a pump 16, the accumulator 17 and an electric motor 15. The unit PPS has an output port 17o which is connected to the power liquid pressure ports 3d of the bypass valve assemblies of the units 3 to 5 and high pressure input ports Hin of the switching solenoid valve units SOL1 to SOL3. The unit PPS has a drain port 17d which is connected to low pressure ports Lout of the valve units SOL1 to SOL3. When the liquid pressure within the accumulator is below a given value, a pressure detecting switch PS is open to deliver a high level (H) signal to the controller 14. When the liquid pressure is higher, the switch becomes closed to deliver a low level (L) signal.

Briefly describing the operation, when the switch PS is open, indicating a low pressure condition of the accumulator, the controller 14 energizes a relay RLY which allows the motor 15 to be energized, thus driving the pump 16. When the switch PS becomes closed, indicating a high pressure condition of the accumulator, the controller deenergizes the relay RLY to cease to energize the motor 15, thus interrupting the operation of the pump 16. In order to prevent a hunting operation in which the motor is turned on and off with short periods, the controller 14 operates to continue the energization of the motor 15 for three seconds after the pressure detecting switch PS has changed from its open to its closed condition to cause the motor 15 to stop its operation at a pressure higher than that at which the switch PS becomes closed during the control over the energization of the motor, which will be described later.

Each of the solenoid valve units SOL1 to SOL3 is designed so that the position of a piston or plunger which switches a flow path can be linearly controlled in accordance with the magnitude of an energizing current. When deenergized, the high liquid pressure input port Hin is connected to the output port 3k (intensifying connection); at the maximum value Imax of the energizing current, the low pressure port Lout is connected to the output port 3k (decompressing connection); and at a value of the energization current between zero and Imax, the output port 3k is disconnected from either the high liquid pressure input port Hin or the low pressure port Lout (holding connection).

Because the position of the flow switching plunger is linear with respect to the magnitude of the energizing current in each of the valve units SOL1 to SOL3, the valve units SOL1 and SOL2 are controlled with an energizing current of 0/8 of Imax for a first condition (intensifying connection), with an energizing current of 2/8 of Imax for a second condition (holding connection) and with an energizing current of ⅝ of Imax for a third condition (decompressing connection). The valve unit SOL3 is controlled with an energizing current of 0/4 of Imax for a first condition (intensifying connection), with an energizing current of ¼ of Imax for a second condition (holding conneciion) and with an energizing current of ¾ of Imax for a third condition (decompressing connection).

FIG. "8" appears as the denominator in representing the magnitude of the energizing current for the valve units SOL1 and SOL2 because a code which specifies the energizing current for these valve units employ three bits. The numerator represents a decimal number defined by three bits. FIG. "4" appears as the denominator in the magnitude of the energizing current for the valve unit SOL3 because a code which specifies the energizing current employs two bits. The numerator represents a decimal number defined by two bits. A code which specifies the magnitude of the energizing current is delivered from a microprocessor 13 of the electronic controller 14. The code is converted into an analog signal in an A/D converter which is contained within the controller 14, and the resulting analog signal is amplified by a linear amplifier to energize the valve units SOL1 to SOL3 at a corresponding level. The linear amplifier is fed from a power supply through a main relay MRY. Whenever the main relay MRY is open, the linear amplifier provides a zero output regardless of an output code from the microprocessor 13.

The microprocessor 13 of the electronic controller 14 includes interrupt ports S1 to S3, which allow an interrupt operation to be executed each time a pulse which is a shaped version of a wheel speed detecting voltage appears at one of these interrupt ports. In this manner, basic data used in the calculation of a wheel speed is prepared by counting up the oncoming pulse and the length of time which passes. In addition to the interrupt operation, the microprocessor performs the calculation of the wheel speed, the preparation of basic data for the antiskid control, an energization control, temperature estimation and protective control of the compressor motor 15, a monitoring and protective control of decompression of the wheel brake liquid pressure which is continued over a prolonged period of time, and the antiskid control (controlling the energization of solenoid valve units SOL1 to SOL3).

FIG. 2 illustrates patterns in which the energization of valve units SOL1 to SOL3 is controlled during the antiskid control. Referring to this Figure, before the initiation of the control, the valve units SOL1 to SOL3 are deenergized, equivalent to the intensifying connection with SOL1 and SOL2 energized with 0/8 output and SOL3 energized with 0/4 output. Considering the unit 3 (FIG. 1b) by way of example, the wheel cylinder 6 communicates with the master cylinder 2 through a path including master cylinder 2, liquid brake pressure port 3i, liquid pressure controlling chamber 3j, control input port 3c, operating chamber 3g, control output port 3b and wheel cylinder 6, thus forming a normal liquid brake pressure loop which is used without the antiskid control. At this time, the pistons 3h and 3n are located at its rightmost position. An intensifying energization pattern which is employed upon entering the antiskid control is indicated by an energization pattern in the second row of the chart shown in FIG. 2. The intensifying energization pattern for solenoid valve units SOL1 and SOL2 is shown by the left column with one cycle of 72 msec including 24 msec with 0/8 energization or equivalent to deenergization (intensifying connection), followed by next 6 msec during which $\frac{3}{8}$ over-energization is used to accelerate the transfer to the holding connection, which is then followed by last 42 msec during which 2/8 energization (holding connection) is employed.

The continuous intensification indicated in the third row is achieved by a continued deenergization. The holding energization pattern for the valve units SOL1 and SOL2 is indicated in the fourt row, left column. As shown, 2/8 energization is continued over an indefinite time duration, which is determined, as required, depending on the reading of the status and the result of calculation in the antiskid control to be described later. The decompressing energization pattern for the valve units SOL1 and SOL2 is indicated in the left column of the fifth row, and one cycle comprises 48 msec with $\frac{1}{2}$ energization (decompressing), followed by 72 msec with 2/8 energization (holding). The continuous decompression in the sixth row is achieved by a continuous $\frac{3}{4}$ energization.

The intensifying, holding and decompressing energization patterns for the valve unit SOL3 are similar to those described above, but is slightly different in order to reflect a difference in a braking response between the front and the rear wheels and a difference in the number of bits used in the code for the energizing current. Refer to the right column of FIG. 2 for the energization patterns of the valve unit SOL3.

Figure 3:
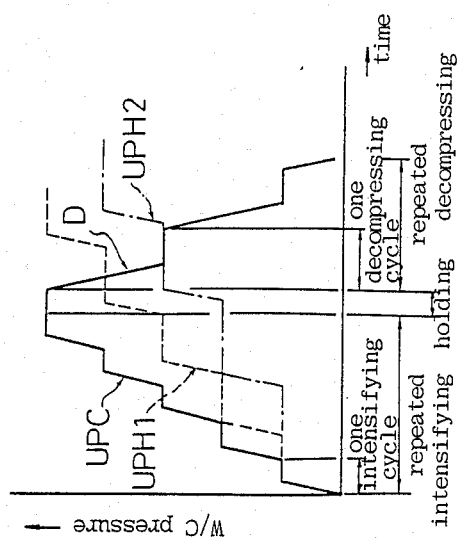
FIG. 3 graphically shows the liquid brake pressure as it is decompressed and intensified by a combination of various energization patterns.

Any desired intensifying and decompressing pattern can be achieved by a combination of various energization patterns mentioned above. For example, when one cycle of intensifying pattern (either 72 or 54 msec) is repeated in succession, the pressure is intensified at a rapid rate as indicated by a curve UPC shown in FIG. 3. If one cycle of intensifying pattern is followed by a holding period of a reduced length, the pressure will be intensified at a slightly reduced rate as indicated by a curve UPH1 shown in FIG. 3. In addition, if one cycle of intensifying pattern is followed by a holding period of an increased length, the pressure will be intensified at a further reduced rate as indicated by a curve UPH2 shown in FIG. 3. This is true also with the decompression. When one cycle of decompressing pattern is followed by a holding period of a varying length, a decompressing pattern at a desired rate of reduction can be achieved. While the rate at which the pressure is intensified or decompressed can be determined in the manner mentioned above, in the description of the embodiment, it is assumed that the holding period (refer to hhe second and the fifth row of FIG. 2) is constant while the time length of the intensifying and the decompressing energization is changed depending on the sitatuion to achieve a desired intensifying or decompressing rate.

It is also to be noted that whenever a transfer to a different control mode is found to be required as a result of a reading of the status or the calculation during the execution of one cycle of intensifying or decompressing pattern, the execution of the current pattern is interrupted at that moment and is replaced by the execution of another pattenn which is required next.

Figure 4:
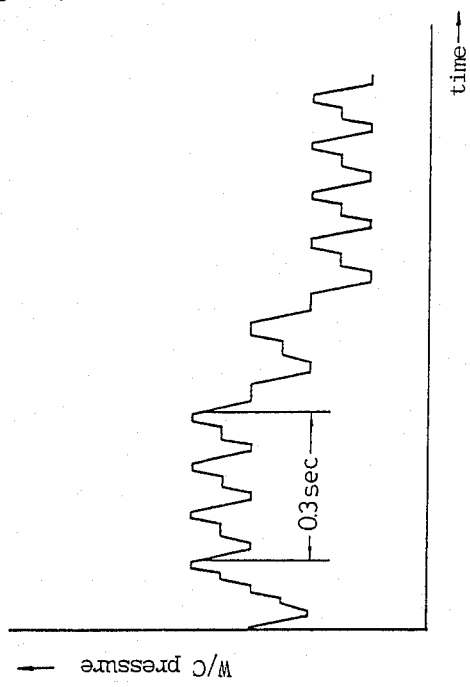
FIG. 4 graphically shows one example of the liquid brake pressure which is intensified and decompressed under the condition that the presence of oscillations of the vehicle is determined.

The control of the intensification or decompression of the liquid brake pressure depends on a road condition, the running speed of the vehicle, the wheel speed and the like. By way of example, when the intensifying and the decompressing control is performed as a frequent repetition of one cycle of intensifying or decompressing pattern as indicated in FIG. 4, it is possible that a change in the liquid brake pressure may result in an oscillation with a given period. In the present embodiment, where an intensifying and a decompressing control as indicated in FIG. 4 is frequently repeated within a reduced length of time, this fact is detected by the electronic controller 14, which then initiates an absorber control in which the variable attenuation shock absorbers SAFR, SAFL, SARR and SARL associated with each wheel suspenion is brought to its hard condition. The absorber control may be facilitated by establishing the absorbers to their hard condition at the time the antiskid control is entered.

Figure 6A:
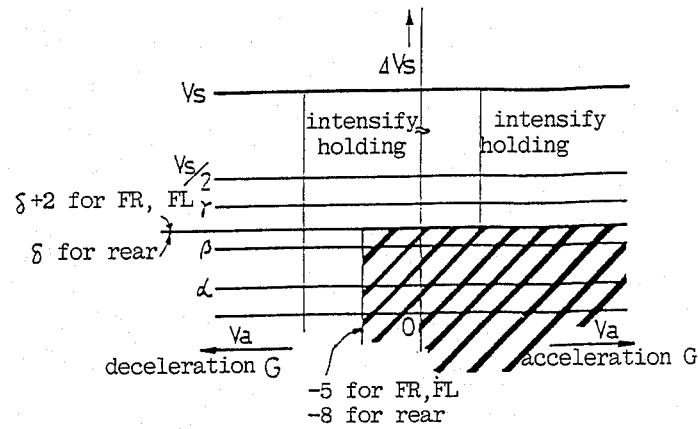
FIG. 6a is a segmentation chart showing the relationship between the running condition of the vehicle and control mode as the antiskid control is entered.

When the brake pedal 1 is depressed to close the switch BSW, the controller 14 initiates the antiskid control according to a segmentation chart shown in FIG. 6a. In FIG. 6a, a region labelled "intensify holding" means that the liquid brake pressure to the wheel cylinder which has been achieved by the intentifying mode (0/8 energization, used without the antiskid control) is maintained (2/8 energization). A region shown hatched by thick lines sloping down and to the left represents a region in which the continuous intensifying mode (intensifying the pressure before initiating the decompression; see FIG. 2) as a result of insufficient liquid brake pressure found.

Figure 6B:
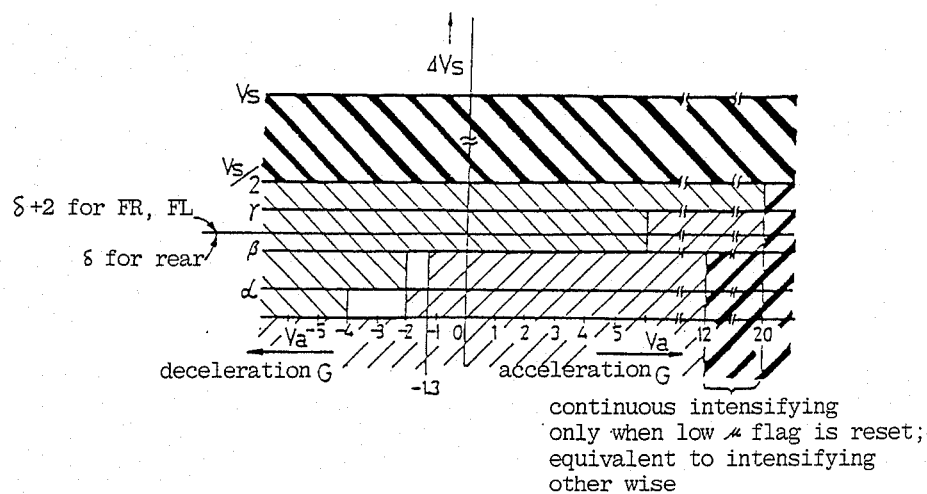
FIG. 6b is a segmentation chart showing a control mode which is entered next in consideration of the running condition of the vehicle during the antiskid control in an intensifying mode or intensifying holding mode.

After entering the antiskid control ("intensify holding" according to the segmentation chart shown in FIG. 6a) the operation then proceeds to a variety of control modes according to a segmentation chart shown in FIG. 6b (either intensifying or intensify holding mode). In FIG. 6b, a region shown hatched by thick lines sloping down and to hhe right requires a continuous decompression. A region shown hatched by thin lines sloping down and to the right requires a decompression. A region shown hatched by thin lines sloping down and to the left requires an intensification. region shown hatched by thick lines sloping down and to the left requires a continuous intensification. A blank region is assigned to a holding mode. When either decompressing or decompress holding mode is entered, the operation then proceeds to a variety of control modes according to a segmentation chart shown in FIG. 6c where hatched regions refer to the corresponding regions as described above in connection with FIG. 6b.

Regions which are entered from the decompressing or decompress holding mode (FIG. 6c) are shown as shifted up and to the right of corresponding regions which are entered from the intensifying or intensify holding mode (FIG. 6b) to provide a hysteresis which prevents a frequent switching back and forth between the intensifying and decompressing operation.

Figure 5:
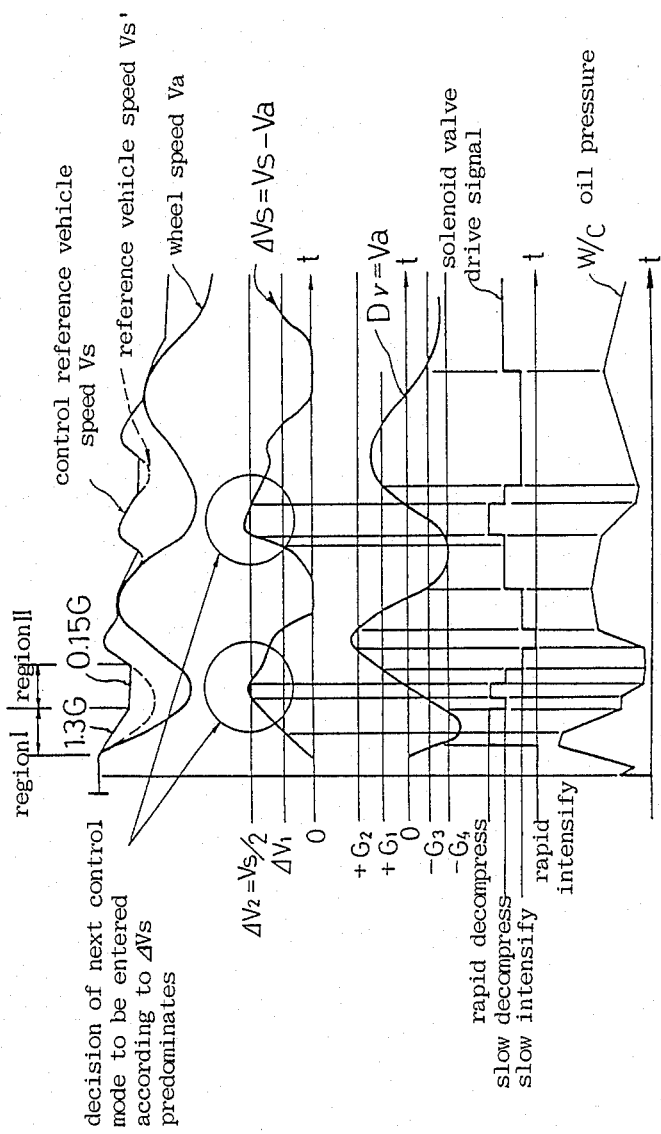
FIG. 5 is a timing chart illustrating the relationship between a wheel speed, a reference vehicle speed, a control reference vehicle speed and the liquid pressure of the wheel cylinder during the antiskid control.

A brief summary of the antiskid control by the microprocessor 13 will be initially given with reference to FIG. 5. The microprocessor 13 calculates an original reference vehicle speed Vs', which is a mean of wheel speeds of the front wheels which are detected by the sensors 10, 11 and the rear wheel speed which is detected by the sensor 12, whichever is higher. When the brake pedal 1 is not depressed, a control reference vehicle speed Vs is selected to be equal to the original reference vehicle speed Vs'. As the brake pedal 1 is depressed and the reference speed Vs' decreases, the control reference vehicle speed Vs is selected to be either a value of Vs' which is obtained immediately before the decrease occurs and which is decreased with a deceleration of 1.3 G or the original reference speed Vs', whichever is higher. When the value calculated with the deceleration of 1.3 G is used as the control reference speed Vs, after a time interval of 96 msec has passed, the control reference vehicle speed Vs is selected to be either a value of Vs which is obtained at the time such time interval has passed and which is reduced with a deceleration of 0.15 G or the original refernece vehicle speed Vs', whichever is higher.

Figure 6C:
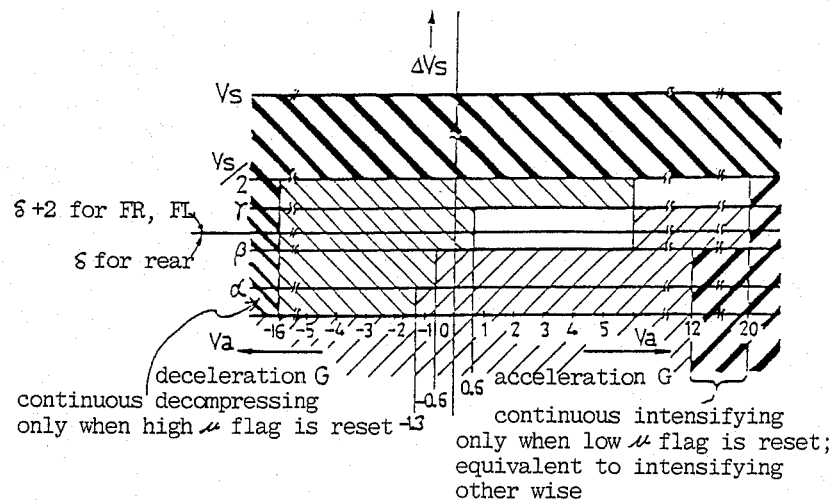
FIG. 6c is a segmentation chart showing a control mode which is entered next in consideration of the running condition of the vehicle during the antiskid control in a decompressing mode or decompress holding mode.

Based upon an acceleration/deceleration Dv of each wheel and a deviation ΔVs between each wheel speed and the control reference speed Vs, an intensifying, decompressing or holding operation is employed according to the segmentation charts shown in FIG. 6b (which is used when the current control is in the intensifying mode or intensfy holding mode) or FIG. 6c (which is used when the current control is nn the decompressing mode or decompress holding mode).

As shown in FIGS. 6b and 6c, when the deviation is such that ΔVs≧Vs/2 or when the deviation is greater, indicating that th wheels are idling, the continuous decompression mode is entered indepeddently from the acceleration/deceleration Dv of the wheel. In other words, a decision to determine the nett control mode in accordance with the deviation ΔVs predominates and the brake pressure is reduced at higher rate.

At a control reference speed Vs below 8 km/h, the antiskid control is unnecessary for any wheel, and hence the valve units SOL1 to SOL3 are deenergized. At a control reference speed equal to or greater than 8 km/h and less than 10 km/h, the antiskid control is unnecessary for the front wheels and accordingly the valve units SOL1 and SOL2 cease to be energized. This also assures the directional stability of the vehicle.

The liquid pressure within the accumulator 17 is maintained equal to or above a given value, by energizing the motor 15 in response to the open condition of the switch PS whenever the pressure is reduced, and by deenergizing the motor 15 in response to the closed condition of the switch PS when the pressure increases. However, during the time the motor is energized, a motor temperature estimate figure is counted up according to a given pattern, and such figure is counted dow during the time the motor ceases to operate. When the motor temperature estimate figure reaches a given high value, the operation of the motor is interrupted. Subsequently, the estimate value is counted down until it reaches a given low value, whereupon the motor may be energized if this is necessary.

The antiskid control is initiated only when the speed Va of the front wheels FR, FL both exceed 20 km/h since the antiskid control to change the brake pressure is not particularly effective under low speeds, but rather causes an increase in the distance over which the braking action is applied to cause a danger. When the antiskid control is entered at wheel speeds above 20 km/h, the antiskid control ceases to operate for both front and rear wheels if the control reference vehicle speed reduces below 8 km/h or an estimated wheel speed of 5 km/h and the antiskid control for the front wheels ceases to operate below 10 km/h or an estimated wheel speed of 7 km/h for the reason that at speeds equal to or above 20 km/h, a determination of parameters relating to the antiskid control can be made accurately without causing a subsequent errorneous decision to increase the stability of the antiskid control and the driving stability of the vehicle and the reaction of the brake will be improved if the antiskid control is maintained until the vehicle nearly ceases to run once the antiskid control has been entered. For eaample, if an arrangement is made to cease the antiskid control at speed of 20 km/h, the reaction of the vehicle to the steering operation will be different, causing a difficulty on the part of a driver.

The antiskid control ceases to operate at a speed of 10 km/h for the front wheels and at a speed of 8 km/h for the rear wheels to improve the directional stability when driving the vehcle. Such a choice facilitates the operation of a steering wheel and prevents a tail rolling of the vehicle since as the vehicle begins to decelerate with the antiskid control applied, the braking action will be initially effective ppon the rear wheels and then upon the front wheels.

In an accelerating slip which is caused by depressing an accelerator pedal and then depressing a brake pedal, the decompressing control will be applied to result in no braking effect if the antiskid control is directly carried out. For this reason, during the antiskid control, the microprocessor 13 compares the speed of the rear wheels which are driven by an engine and that of the front wheels which are not driven by the engine to to determine the presence or absence of an accelerating slip. In the event an accelerating slip is present, the antiskid control is not carried out.

During the antiskid control, the microprocessor 13 monitors a time duration of the decompressing mode so that for a braked running on a road having a low coefficient of friction μ (hereafter referred to as low μ road) when the decompressing mode is continued over a prolonged period of time, the rate at which the brake pressure is returned or intensified is retarded to allow the wheel speed to restore in order to avoid an early (or rapid) wheel locking which is likely to occur at an increased intensifying rate on the low μ road.

When the time duration of the decompressing mode exceeds a given length, the microprocessor 13 examines the wheel speed Va, and if it has restored (increased), it determines that there is no abnormality and continues the decompressing mode which is scheduled in the control. However, if the wheel speed Va is not restored, it determines the occurrence of an abnormality, and ceases decompressing mode for a given time interval.

In order to avoid a synchronism or resonance between an oscillation in the braking force which results from a repeated intensifying and decompressing operation, and the unsprung oscillations of the vehicle, the period with which the intensifying or decompressing cycle is repeated in the antiskid control is chosen to be greater than the period of the unsprung oscillations.

During the antiskid control, the microprocessor 13 delivers a control signal which establishes the variable attenuation shock absorbers to their hard condition, in response to the initiation of the control operation in which an intensifying or decompressing command sggnal is delivered, and also produces another control signal which terminates the hard condition of the absorbers as the brake is released, thus quickly suppressing oscillations of the vehicle along the road surface which occurs under the hard condition.

During the absorber control which establishes the hard condition for the variable attenuation shock absorbers, as the microprocessor 13 begins to deliver an intensifying or decompressing command signal, and when it determines that the delivery of such command signal has been repeated three or more times in a time interval of 0.3 second, it produces a control sigaal which establishes the hard condition. Once the microprccessor has produced a control singnal which establishes the hard condition after the brake pedal has been depressed, the hard condition is maintained as long as the brake pedal remains depressed, and then the microprocessor produces a control signal which terminates the hard condition as the brake pedal is released.

Figure 7A:
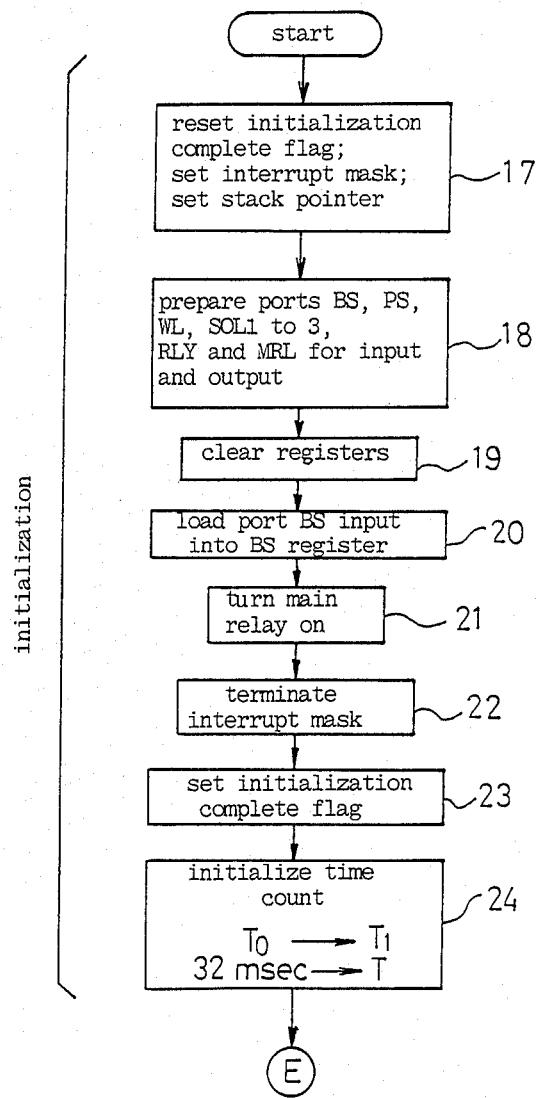

A variety of control operations by the microprocessor 13 will now be described in detail with reference to flowcharts shown in FIG. 7a and subsequent Figures. When the power is turned on, the microprocessor 13 executes a main routine shown in FIGS. 7a to 7f in which it terminates an interrupt mask. It is to be noted that the microprocessor 13 includes three interrupt ports S1 to S3, of which only ports S1 and S3 can either enable or disable the execution of an interrupt operation by an interrupt mask control while port S2 cannot perform a mask control and causes an interrupt processing operation to be executed upon the occurrence of an interrupt initiating signal applied to the port after the power is turned on.

Initially referring to FIG. 7g, an interrupt processing operation at port S1 will be described. If the signal S1, a pulse which is obtained by digitizing a voltage developed by the speed sensor 10 associated with the front right-hand wheel FR, changes from its high level H to its low level L under the condition that the interrupt mask of port S1 has been terminated, a flipflop associated with port S1 is set, initiating an interrupt operation shown in FIG. 7g. Specifically, the flipflop is reset to wait for a next change in the signal (from H to L) (step 1; in subsequent description, a number appearing in parentheses refers to a step number), and a pulse counter N' is then incremented by one (2). Then a value $T_0-T_1$, namely, the current time $T_0$ from which the previous time $T_1$ is subtracted, thus representing a time interval which has passed since the previous time, is compared against 6 msec (3). If the time passed is less than 6 msec, the program returns to the step from which the interrupt operation is entered. If the time passed is equal to or greater than 6 msec, the time interval $T_0-T_1$ is stored in a time interval register T (4), the current time is used to update a rrevious time register $T_1$ (5), the count N' in the pulse counter N' is stored in a pulse count register N (6), and the pulse counter N' is initialized (7). FR6 msec complete flag, representing that a time interval equal to or greater than 6 msec has passed since the previous pass, is set (8), and the program returns to the step from which the interrupt operation is entered.

The microprocessor 13 internally includes a first internal counter having a period of 6 msec which normally counts clock pulses, and when it has counted 6 msec, sets a flag OCF indicating to this effect, resets to its initial count of 0 and then begins counting again, and a second internal counter having a period of 64 msec which normally counts clock pulses, and when it has counted 64 msec, sets a flag TOF indicating to this effect, resets to its initial count of 0 and then begins counting again. A cureent time $T_0$ is derived as the count in the 64 msec period counter. Accordingly, it is possible that $(T_0-T_1)$ becomes negative, and in this instance, $(T_0+64 \text{ msec}-T_1)$ stands for $(T_0-T_1)$ By the.interrupt operation mentioned above, at the time FR6 msec complete flag is set, the number of pulses which has been applied to port S1 during the time interval (equal to or greater than 6 msec) stored in the time interval register T is stored in the pulse count register N while the previous time register $T_1$ stores the point in time when a new pulse counting operation has been initiated.

The rotational speed of the front wheel FR (wheel speed) is equal to N/T multiplied by a constant, and hence the wheel speed can be obtained from the content of the registers T add N. The wheel speed is calculated in the main routine to be described later (FIG. 7d) by referring to a flag, when FR6 msec complete flag is set.

The interrupt processing operation (FIG. 7i) which occurs at interrupt port S3 is completely the same as that at port S1 (FIG. 7g) and hence will not be specifically described.

Figure 7B:
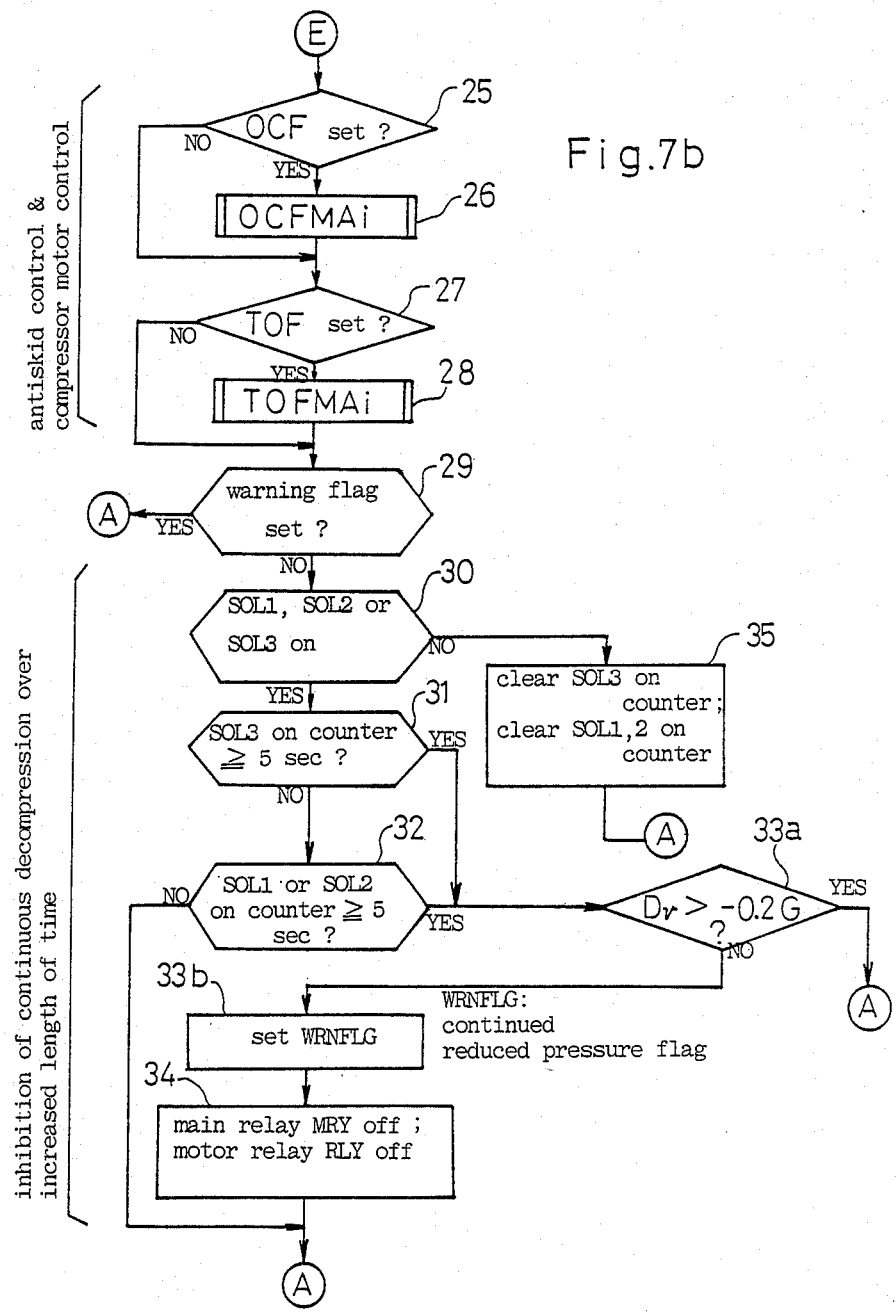
Figure 7C:
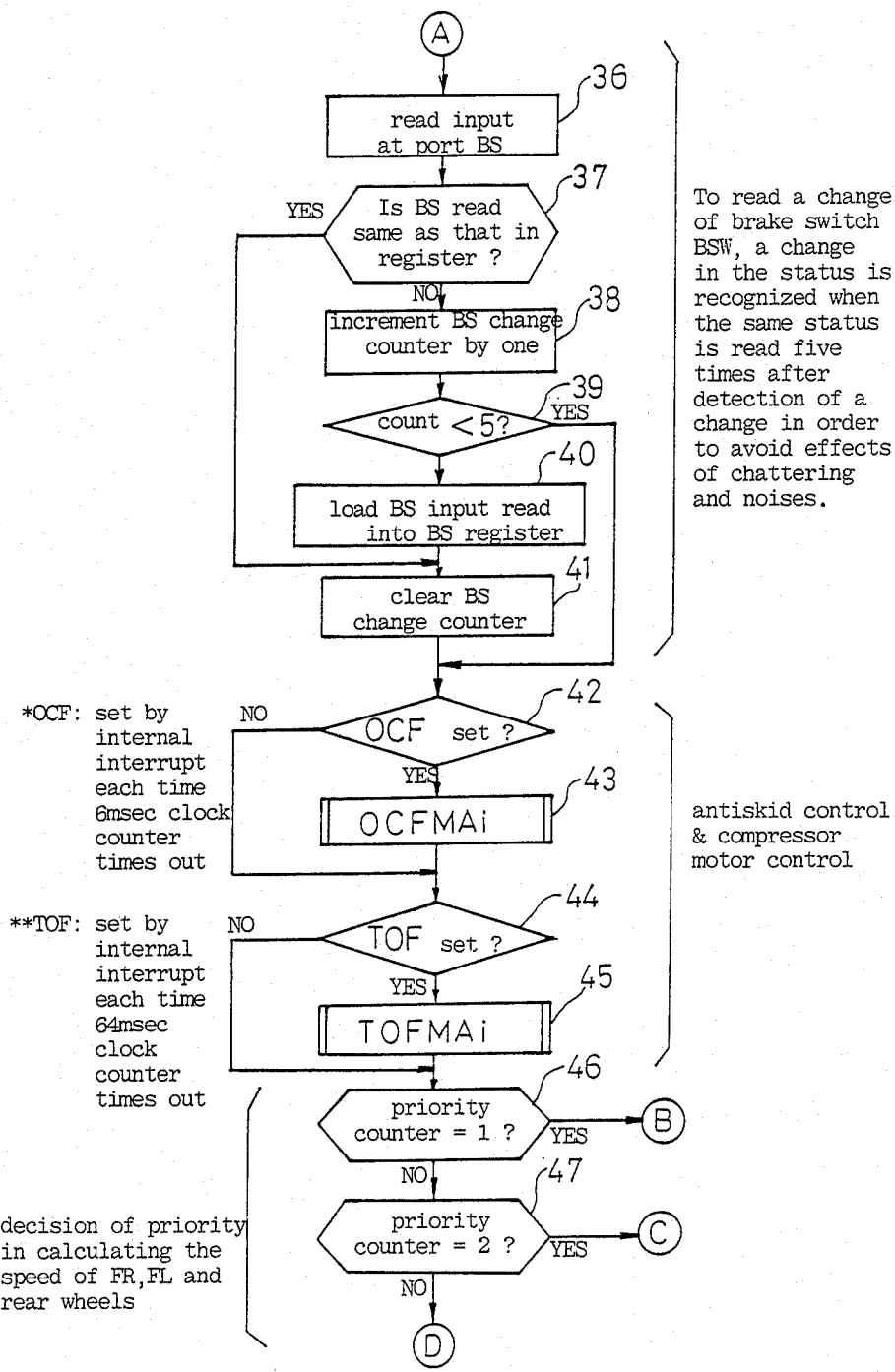
Figure 7F:
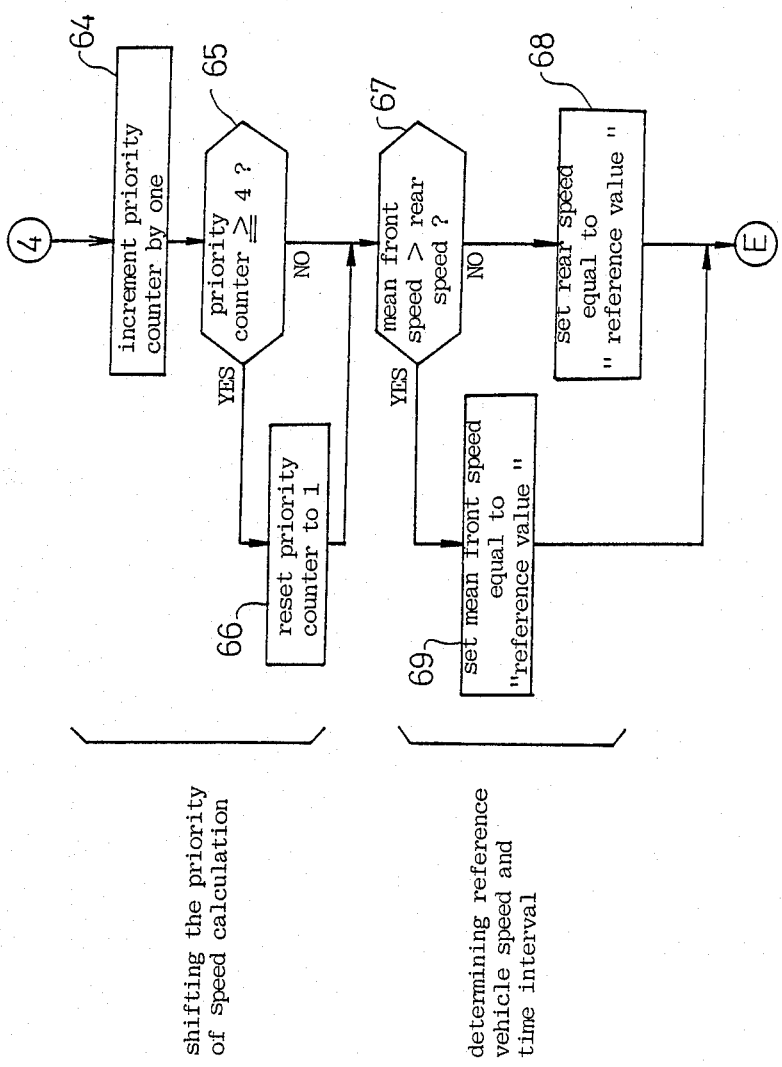
Figure 7G:
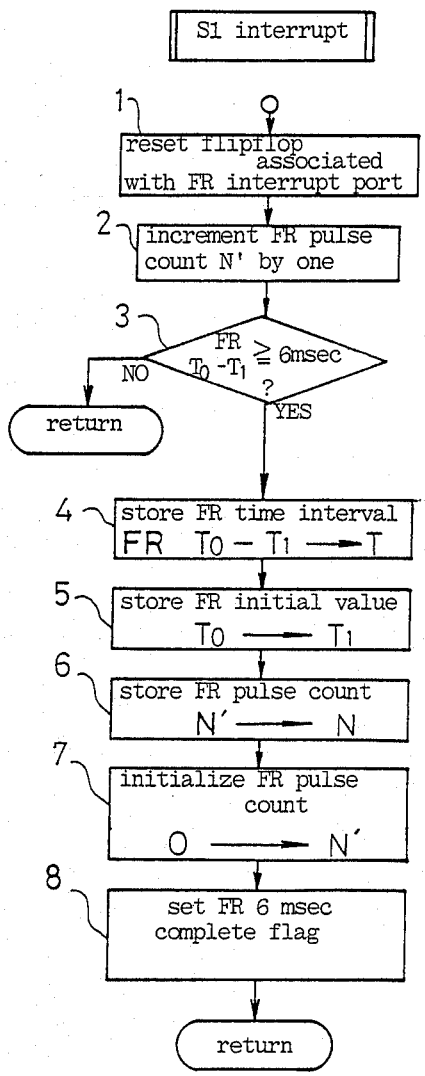
FIGS. 7g, 7h and 7i are flowcharts of interrupt operations by the microprocessor.
Figure 7H:
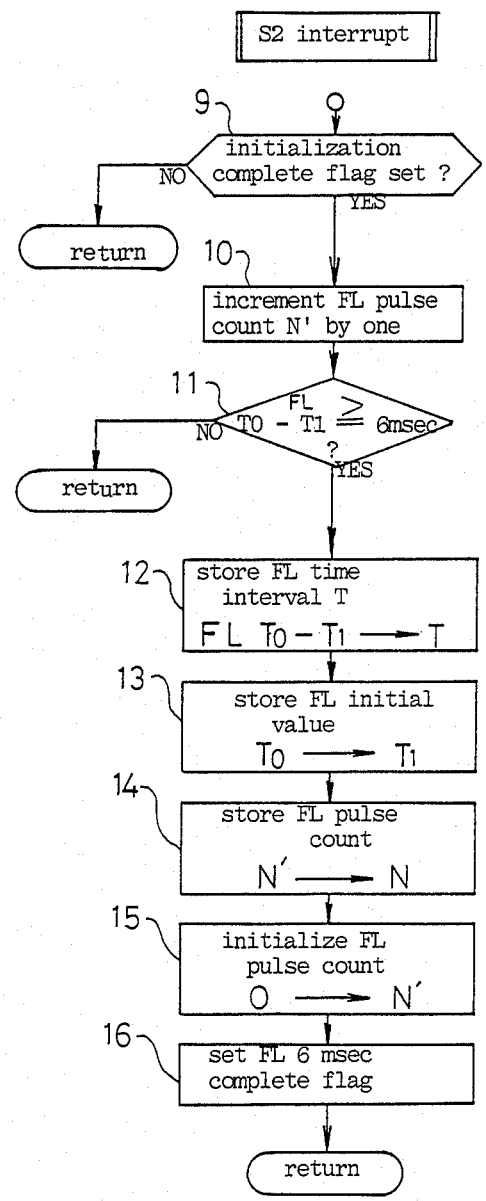

An interrupt processing operation at interrupt port S2 is illustrated in FIG. 7h. In this operation, the presence or absence of an initialization complete flag is examined, and if it is reset, the program returns to the main routine. If this flag is set, the microprocessor executes steps 10 to 16 which are identical to the steps 2 to 8 shown in FIG. 7g. Accordingly, this interrupt operation is not executed unless the initialization has been completed.

Figure 10A:
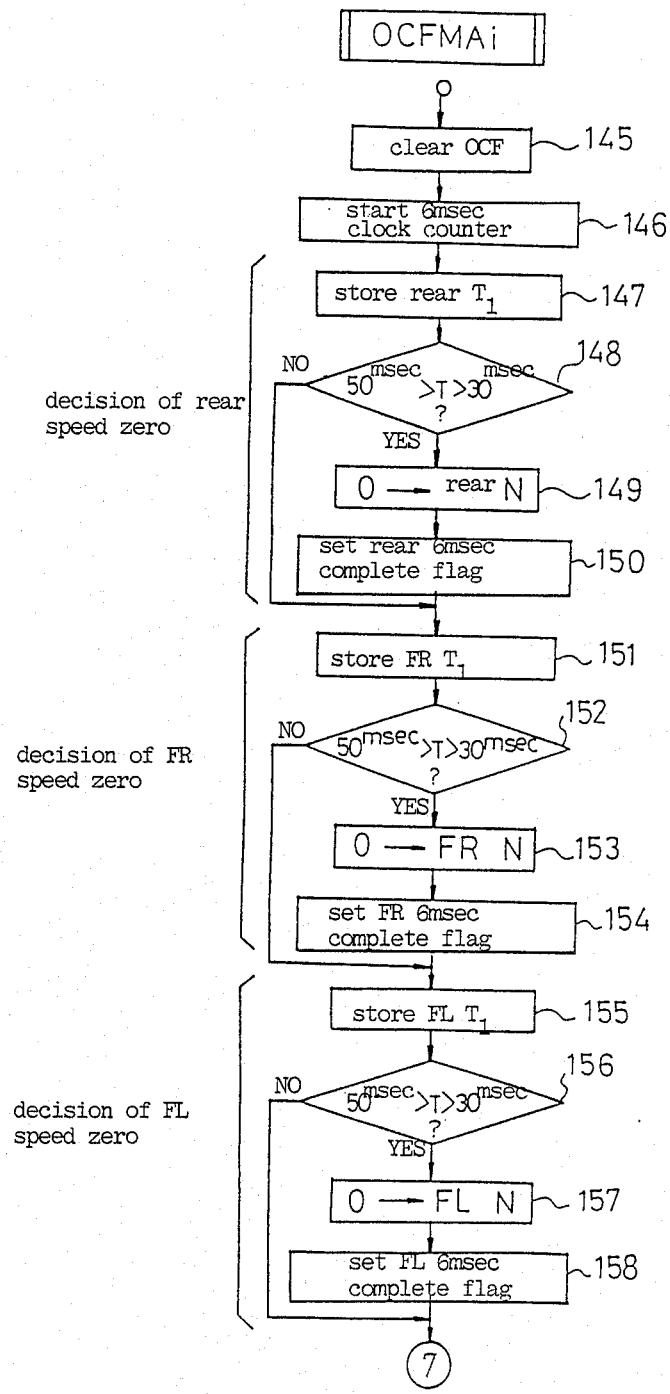
Figure 10B:
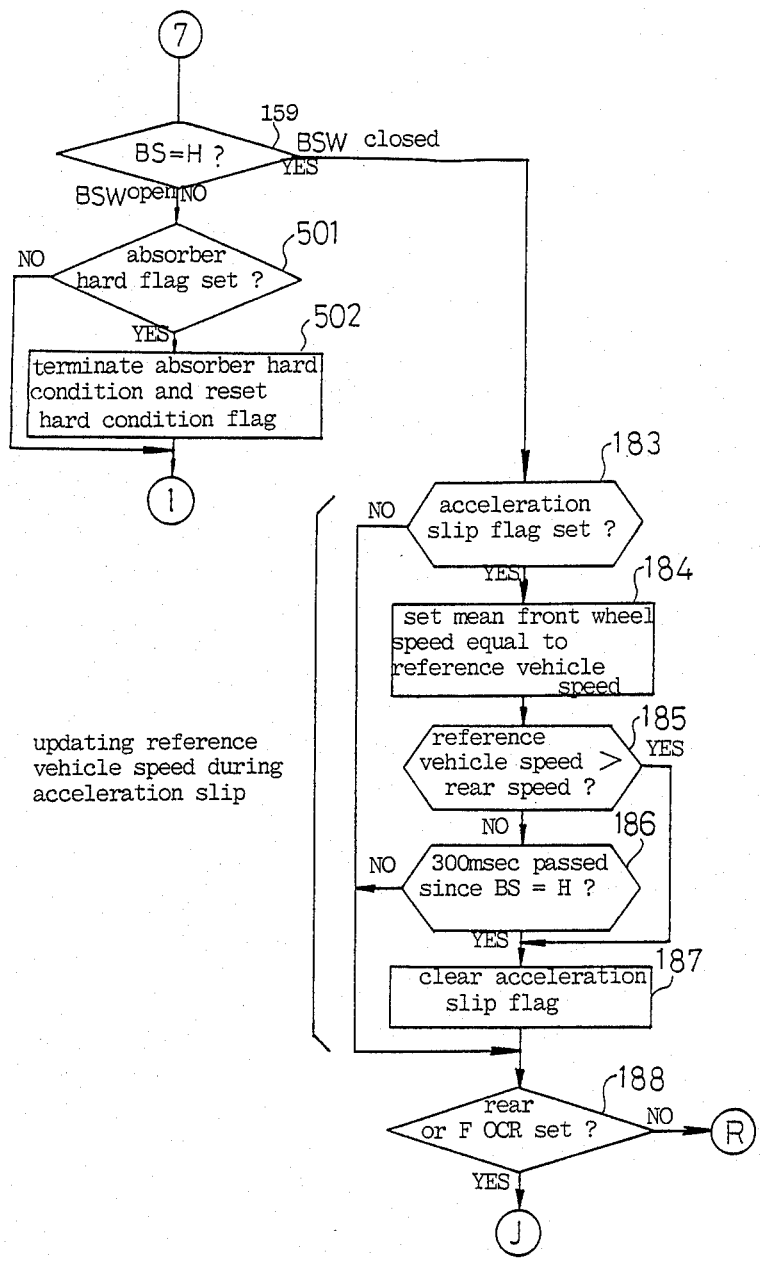
Figure 10D:
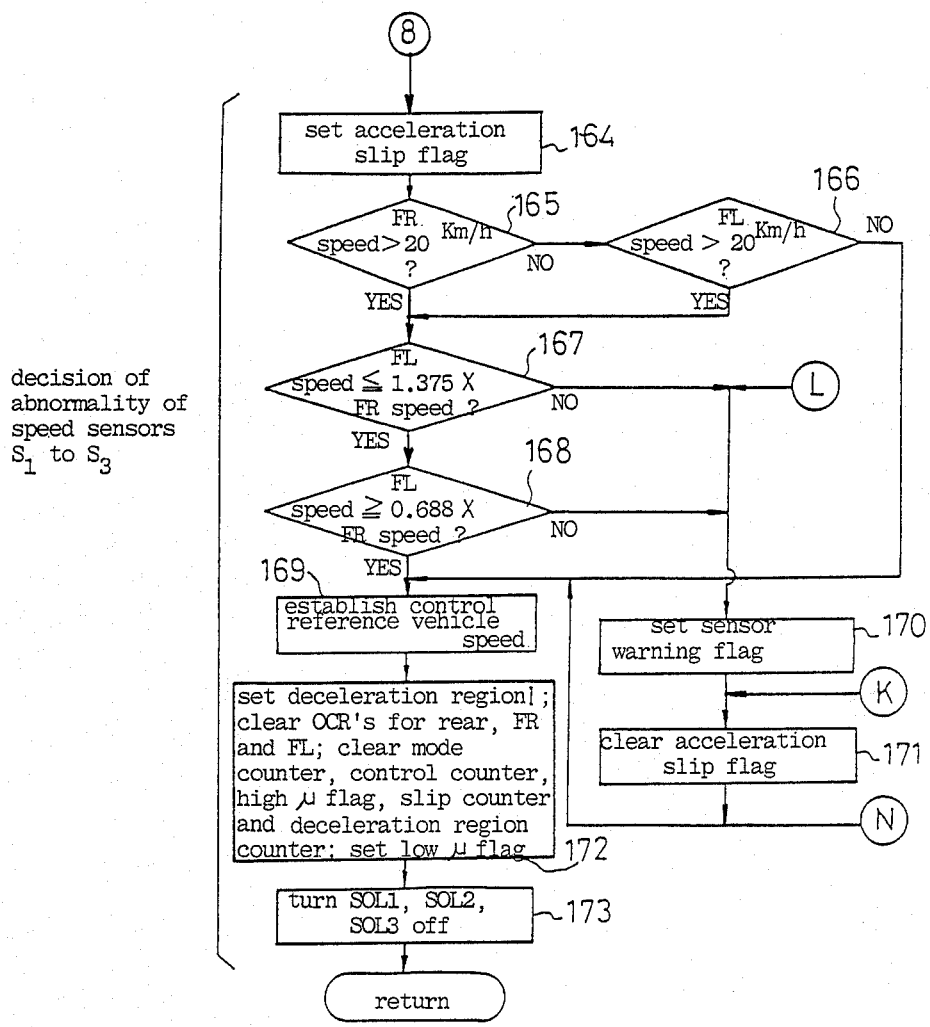

It will be seen that as a result of the described interrupt operations, data which are used in the calculation of the wheel speed is updated in registers T and N with a time period equal to or greater than 6 msec. However, it is to be noted that the interrupt operation is executed on the condition that there is a change in speed detecting pulses S1 to S3, and hence when the vehicle remains at rest, no interrupt operation is executed. It will also be seen that when the wheel speed is very low, and the speed detecting pulse has a period equal to or greater than 64 msec, the reliability of a speed value calculated on hhe basis of data stored in registers T and N will be greatly reduced. For this reason, the vehicle speed sensors 10, 11 and 12 are designed to develop voltage oscillations having periods greater than 30 msec and less than 50 msec at a scheduled minimum speed of the vehicle. Consequently, when the vehicle is running at this minimum speed, if the 6 msec complete flag is set, data stored in the time interval register T will be a value greater than 30 msec and less than 50 msec. In a flowchart to be described later (steps 147 to 158 shown in FIG. 10a), data $T_0-T_1$ in register T is examined, and if it is greater than 30 msec and less than 50 msec, this means that the vehicle is running at a minimum speed. Accordingly, 0 is loaded into register N (thus clearing register N) in order to set the detected wheel speed data to 0. Though this minimum speed is not always equivalent to a vehicle speed of 0, making the minimum speed equal to 0 does not present any problem for the purpose of the antiskid control. This is because the minimum wheel speed which is examined during the control operation is equal to 7.7 km/h or around this value, and a wheel speed (minimum speed) which causes 0 to be loaded into register N may be on the order of 5 km/h or less.

Returning to FIG. 7a, the microprocessor 13 performs an initialization at steps 17 to 24 after the power is turned on. During the initialization, it clears various registers, timers, counters and flags, prepares input ports for receiving signals and sets standby signal at the output port to turn the main relay MRY on, terminates an interrupt mask at ports S1 and S3, sets an initialization complete flag, load a current time (the count in the 64 msec period internal counter) into register T₁, and load a value of 32 msec at which calculated speed value N/T (or actually, this value multiplied by a constant) is substantially equal to 0, into the time interval register T. As a result of the initialization, an interrupt processing operation at interrupt ports S1 and S3 are enabled.

Referring now to FIG. 7b, the microprocessor 13 examines to see if a flag OCF, indicating an overflow from the 6 msec period internal counter, is set (25). If the flag is set, it executes a subroutine OCFMAi (26, which is an antiskid control. In the description to follow, this control includes not only a control of an actual brake pressure, but also a reading, calculation and the decision of status which the microprocessor passes before entering the brake pressure control; see FIGS. 10a to 11g for detail. After the execution of the subroutine or if it is found at step 25 that the flag OCF is set, the program proceeds to step 27 where the flag TOF, indicating an overflow from the internal counter having the period of 64 msec, is examined.

Figure 9A:
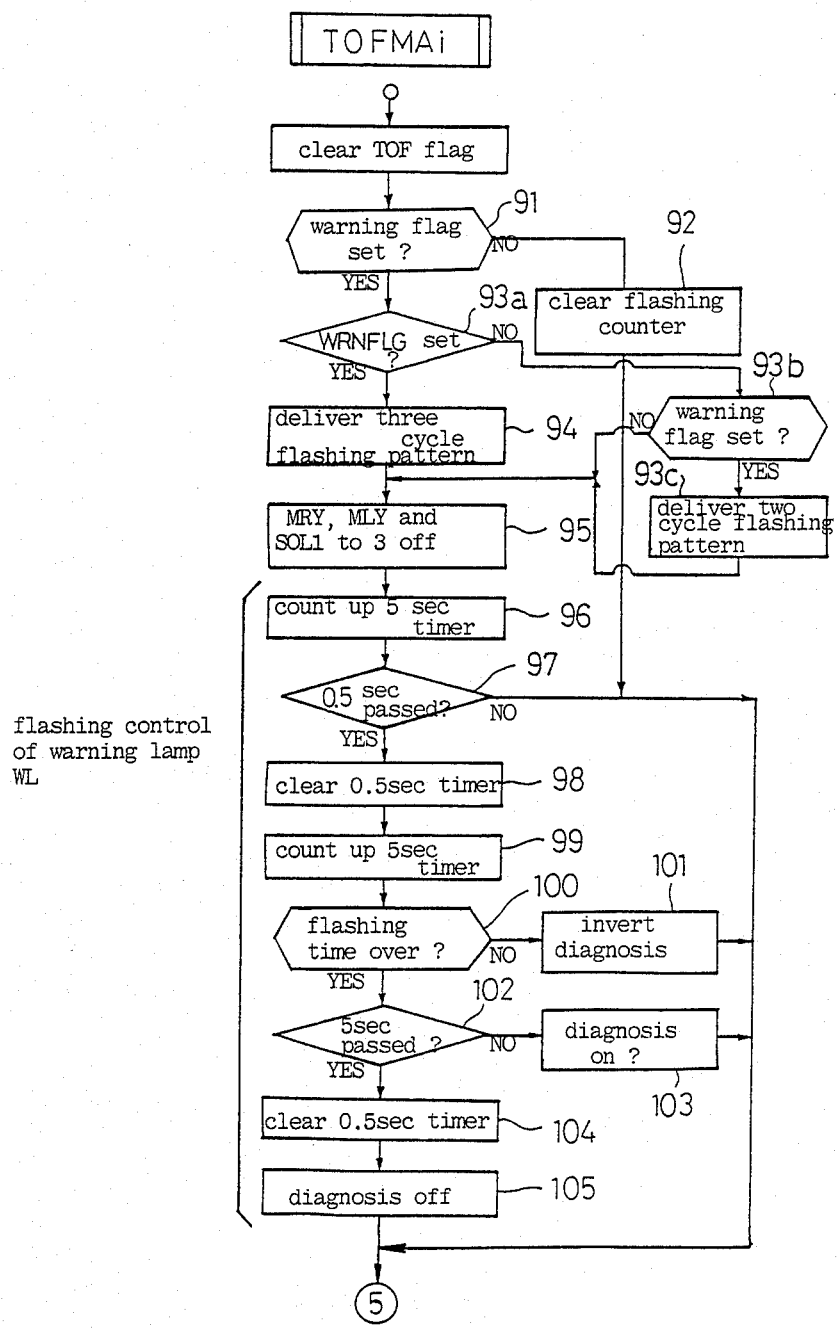
FIGS. 9a, 9b, 9c, 9d and 9e are flowcharts of subroutines which controls the energization of the motor.
Figure 9B:
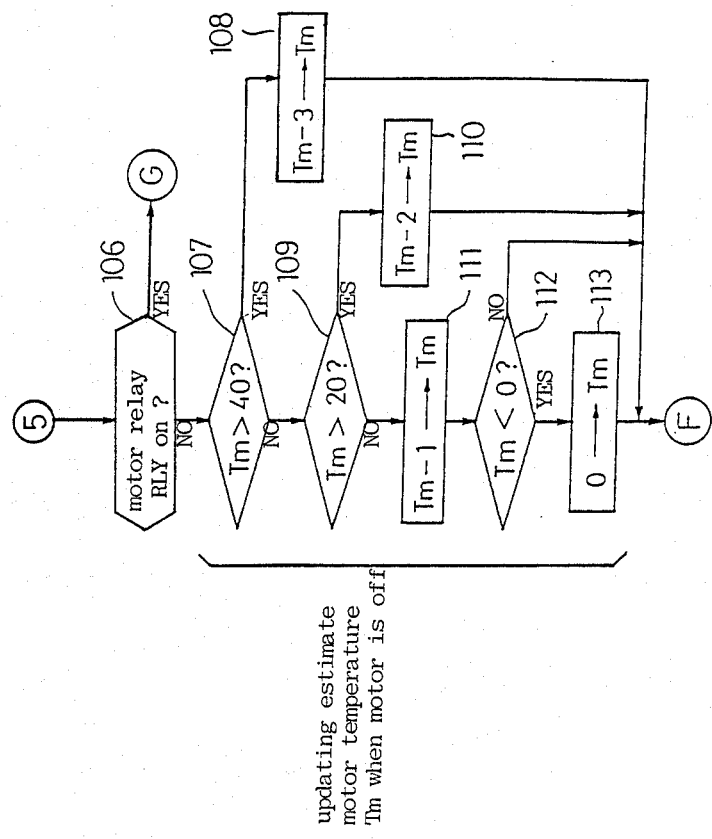
Figure 9C:
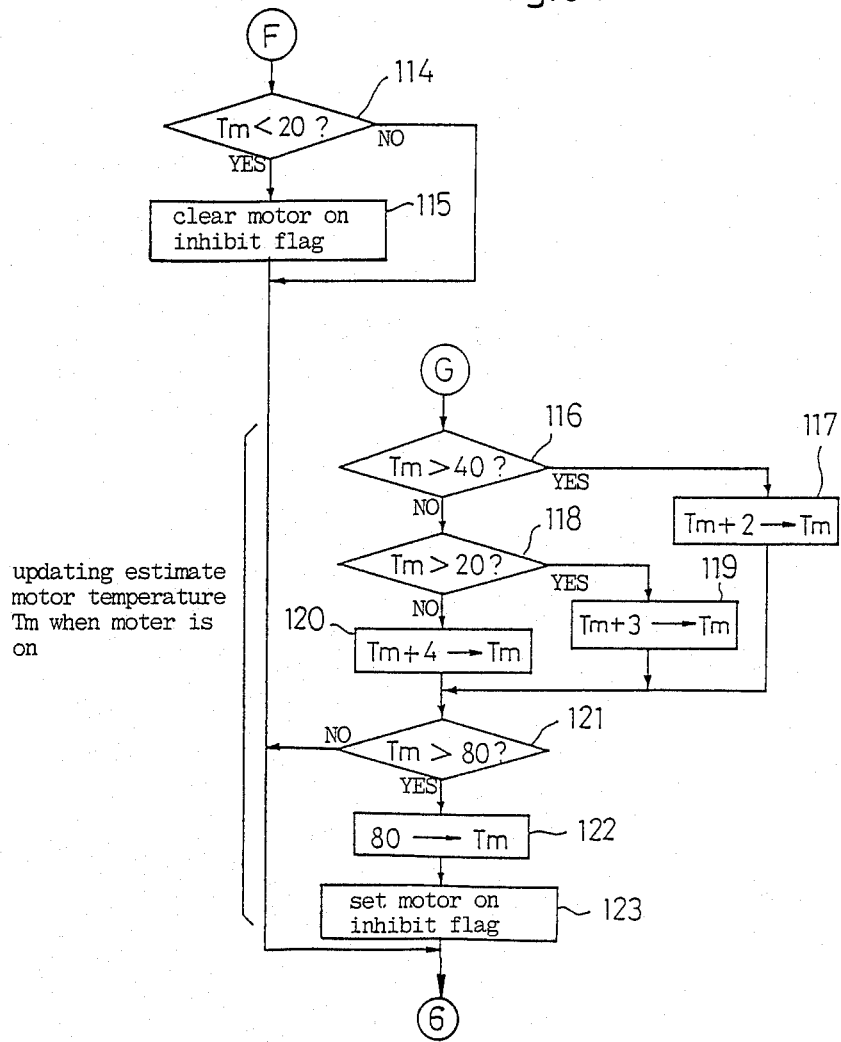
Figure 9D:
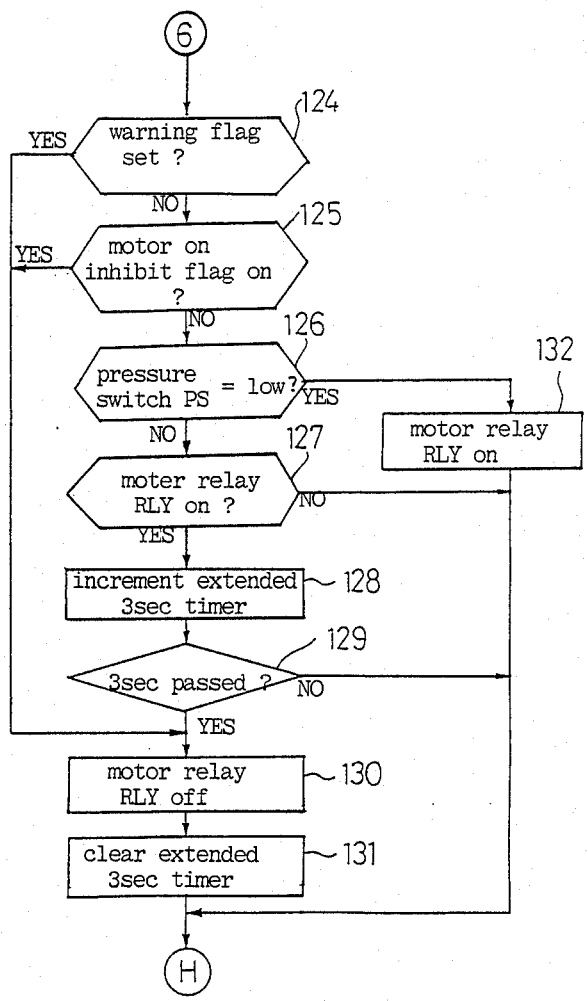
Figure 9E:
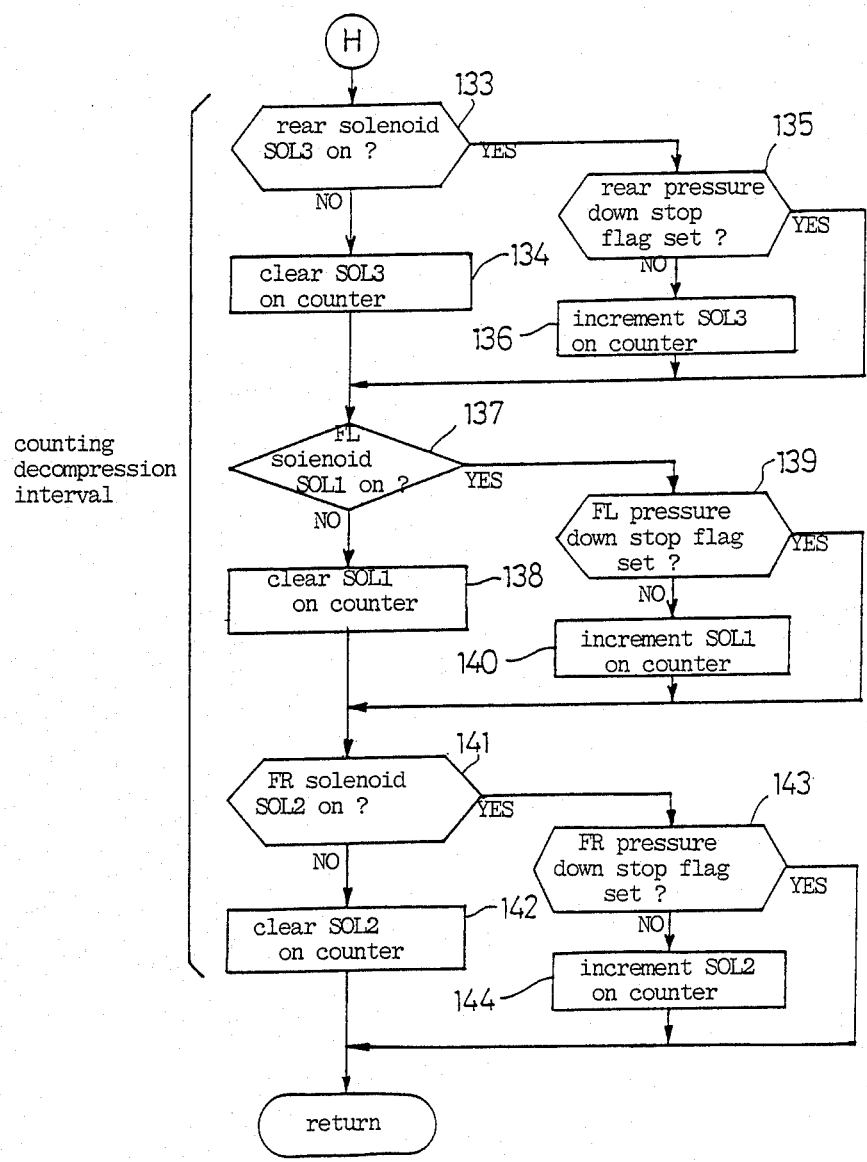

If the flag TOF is set, the microprocessor executes a subroutine TOFMAi (28), (which is a control over the energization of the motor; see FIGS. 9a to 9c for detail). After the execution of this subroutine or if it is found at step 27 that the flag TOF is reset, the microprocessor examines a warning flag, which is set in the event the presence of an abnormality is determined and which will be described later, and if this flag is reset, the microprocessor then examines the energization or deenergization of the solenoid valve units SOL1 to SOL3. If none of these valve units are set for a decompressing energization, the microprocessor clears count register SOL1 on counter, SOL2 on counter and SOL3 on counter (35). If either one or more of the valve units SOL1, SOL2, and SOL3 is set for a decompressing energization, the microprocessor examines the count (31, 32) and when the time duration is equal to or exceeds five seconds, indicating that a reduction in the liquid brake pressure continues for a prolonged length of time, the microprocessor compares an acceleration/deceleration Dv of the wheel against a gvven value of $-0.2$ G at step 33a. If the acceleration/deceleration is greater than $-0.2$ G, this means that the wheel speed Va has recovered as a result of the decompression (or a reduction in the speed has ceased) and it may be assumed to be normal. Accordingly, the program proceeds to step 36. However, if the acceleration/deceleration Dv is equal to or less than $-0.2$ G, this means that the decompression has been continued over a prolonged length of time and the recovery of the wheel speed is abnormally retarded. Hence, to avoid no braking condition, the microprocessor sets an abnormality flag WRNFLG (33), turns the main relay MRY off to deenergize all of the valve units SOL1, SOL2 and SOL3 (for intensifying the pressure) and turns the motor relay RLY off to cease the energization of the motor 15 (34).

When the warning flag is set (29), when the on counter is cleared (35) or when the aain relay MRY and motor relay RLY are turned off (34), the microprocessor reads an input at port BS, indicating whether or not the brake pedal 1 has been depressed (36), and the status read is compared against the content stored in BS register (37). Immediately after the power is turned on, the initialization step mentioned above has loaded an initial condition representing no depression of the brake pedal 1 into BS register.

When the comparison reveals a mismatch, this means that there has been a change in the status of the brake pedal 1, namely, either that it has been depressed when it has not been depressed previously or ice versa. BS change counter is incremented by one (38), and the counter is examined to see if the count thereof is equal to or greater than 5 (39). If the count is less than 5, the program proceeds to next step 42 and subsequent control steps to return to steps 36 to 37 again. If it is found in this manner that there has been a mismatch five times, the count will be equal to 5, indicating that it has been examined five times, each time with the same status, and then the status read is used to update BS register at step 40, thus storing a new status of the brake pedal 1, and then BS change counter is cleared (41) to enable the subsequent reading step before proceeding to te following step 42. In the event the same reading has not been obtained five times since the mismatch has been detected, this may be considered as attributable to an insufficient depression or returning movement of the brake pedal or a mere chattering of the switch, and the program proceeds from step 37 to step 41 where BS counter is cleared without altering the content of BS register with the status read. By using such reading of the status and updating the memory, it is assured that BS register will store a change in the status only when the brake pedal 1 is depressed though it has not been dppressed previously or vice versa. Following steps 42, 43, 44 and 45 are identical to the corresponding steps 25, 26, 27 and 28, respectively, which have been mentioned previously, and therefore, will not be described again.

Figure 7I:
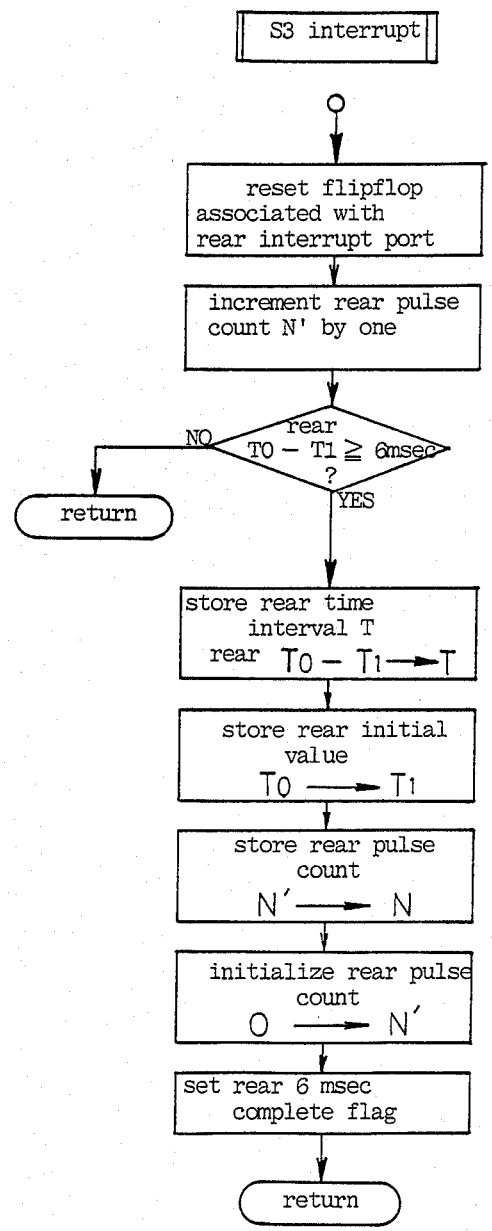

After completing the step 45, the program proceeds to steps 46 and 47 where the content of a priority counter is examined. If the content of the priority counter is equal to 1, the program proceeds to step 48 shown in FIG. 7b; if the content is equal to 2, the program proceeds to step 51 in FIG. 7d; and if the content is neither equal to 1 nor to 2, the program proceeds to step 54 in FIG. 5d. Steps 46 to 66 inclusively, shown in FIGS. 7c to 7f, derive a wheel speed on the basis of pulse cound N and a time interval T which are obtained by interrupt processing operations (FIGS. 7g to 7i). It is to be noted that when the 6 msec complete flag is not set during the interrupt operation, this means that data used for calculation of the speed is not available, and hence the calculation of the wheel speed is not performed. In this manner, the calculation of the wheel speed is effected only when this flag is set.

It will be appreciated that if the calculation of the wheel speed for the frontrright-hand wheel FR, the front left-hand wheel FL and the rear wheels are performed in succession, it takes a relatively long time for the calculation, causing the likelihood of a time lag in the control, in partcular, in the antiskid control OCFMAi which is executed in response to an overflow from the internal counter having a period of 6 msec and the motor energization control TOFMAi which is executed in response to an overflow from the internal counter having a period of 64 msec. For this reason, in the calculation of the wheel speed at and subsequent to step 46, the speed of only one wheel at most, namely, under the condition that the 6 msec complete flag is set, is calculated once the calculation routine is entered. In this instance, if the sequence in which the speed of the front right-hand wheel FR, front left-hand wheel FL and rear wheels is calculated is maintained fixed, the probability of entering the calculation will be different for different wheels. To accommodate for this, the priority counter (register) is used so that once the calculation routine (steps 46 to 64) has been passed, the priority counter is incremented by one at step 64, and when the count exceeds a given count value, it is initialized to 1. When the priority counter has a count of 1, the program proceeds to step 48 where FL6 msec complete flag is examined, and if it is set, the program proceeds to the calculation of the wheel speed for the front left-hand wheel FL. After the execution of the calculation, the priority counter is incremented by 1 (64). If FL6 msec complete flag is reset, a rear 6 msec complete flag is examined (49), and if it is set, the program proceeds to the calculation of the rear wheel speed. After the calculation, the priority counter is again incremented by 1 (64). If the rear 6 msec complete flag is also reset, FR6 msec complete flag is examined (50), and if it is set, the program proceeds to the calculation of the speed of the front right-hand wheel FR (steps 57 to 63), after which the priority counter is incremented by 1 (64).

Thus, upon entering the steps 46 and 47, if the priority counter has a count of 1, FL6 msec complete flag (48), rear 6 msec complete flag (49) and FR6 msec complete flag (50) are sequentially examined, and the calculation of the speed is made in the sequence of FL, rear and FR when the priority counter has a count of 1.

When the priority counter has a count of 2, rear 6 msec complete flag (51), FR6 msec complete flag (52) and FL6 msec complete flag (53) are sequentially examined, and hence the calculation of speed is made in the sequence of rear wheels, FR and FL when the priority counter has a count of 2.

Finally, when the priority counter has a count of 3, FR6 msec complete flag (54), FL6 msec complete flag (55) and rear 6 msec complete flag (56) are sequentially examined, and thus the calculation of the speed is made in the sequence of FR, FL and rea wheels when the priority counter has a count of 3.

By shifting the priority in the manner mentioned above, the speed of various wheels can be calculated with an equal priority. At any event, the program proceeds to the calculation of the speed for FL in response to FL6 msec complete flag which is set, to the calculation of the speed for the rear wheels in response to rear 6 msec complete flag which is set, and to the calculation of the speed for FR (steps 57 to 63) in response to FR6 msec complete flag which is set.

During the calculation of FR speed, 6 msec complete flag which has been set during the interrupt operation (FIG. 7g) is then cleared (57) in preparation to following data processing, and data N contained in the pulse counter N is loaded into an accumulator register (58) for purpose of next following calculation. At next step 59, a subroutine MULVW, is executed to derive

*wheel speed=N/T multiplied by a constant (A×N)*

Figure 8A:
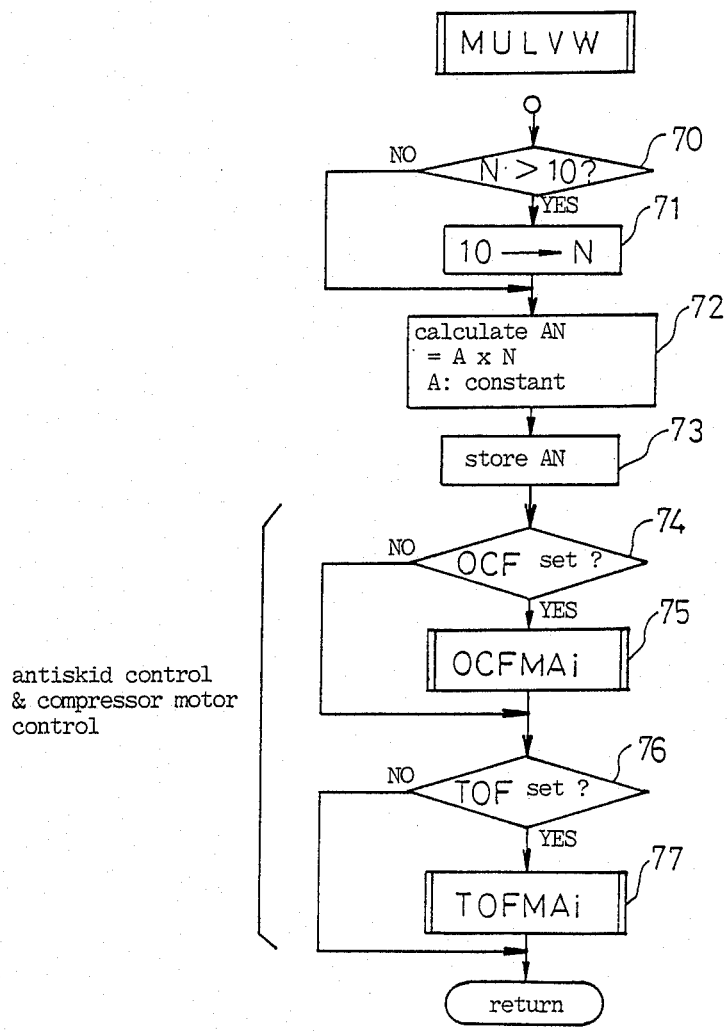
FIGS. 8a, 8b and 8c are flowcharts of subroutines in which the wheel speed is calculated.

FIG. 8a shows a constant multiplication subroutine MULVW in which the pulse count N is compared against 10 (70). If the pulse count does not exceed 10, N is left unchanged. Conversely, if the pulse count exceeds 10, this means that the wheel speed is greater than the aaximum speed, and accordingly the pulse count is set equal to 10 (71). A×N is then calculated (72) where A represents a constant. The resulting AN value is stored (73), and steps 74 to 77 which are equivalent to the steps 25 to 45 are executed, whereupon the program returns to step 60 where the time interval T is loaded into the accumulator register. Then follows a division (AN/T) subroutine DiVVW is executed at step 61.

Figure 8B:
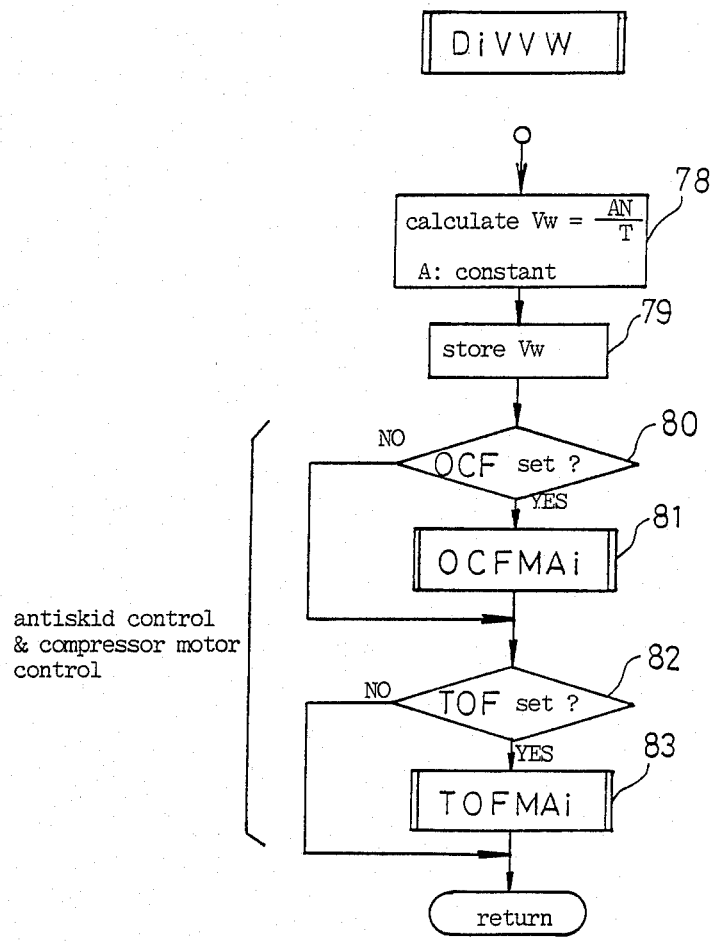

FIG. 8b shows the subroutine DiVVW in which Vw=AN/T is calculated, and this value is stored as FR wheel speed (78, 79), and then steps 80 to 83 which are equivalent to steps 25 to 28 are executed, whereupon the program returns to step 62 in which Vw is loaded into an accumulator register. A mean value a smoothed value) calculation subroutine DiGFiL is executed at step 63.

Figure 8C:
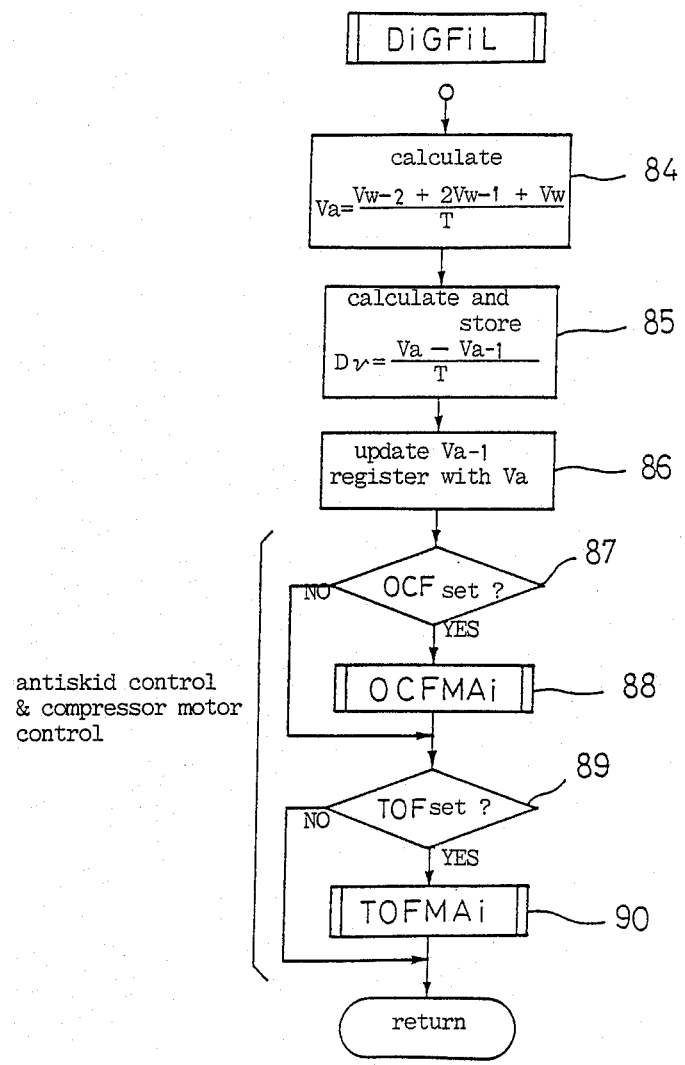

FIG. 8c shows the mean value calculation subroutine DiGFiL in which a smoothed value $$Va = (V_{w-2} + 2V_{w-1} + V_w)/4$$

is calculated (84), followed by the calculation (85) of an acceleration/deceleration of the smoothed value Va $$Dv = (V_a - V_{a-1})/T$$

where $V_{w-1}$ represents the calculated value of the previous pass, $V_{w-2}$ is the calculated value during the second previous pass, and $V_{a-1}$ is the calculated value of the previous pass. In the following description, Va is referred to as a wheel speed and Dv as an acceleration/deceleration.

$V_{a-1}$ register is updated with Va (86), followed by the execution of steps 87 to 90 which are equivalent to steps 25 to 28, whrreupon the program returns to step 64 in which the priority counter is incremented by 1 (64), and is then examined to see if the count therein is equal to 4 (65). If the count does not reach 4, the count is left unchanged while when the count is equal to 4, the count is updated to 1 (66). A mean speed of the front wheels FR and FL or Va's of FR and RL divided by 2 is calculated, and is compared against the rear speed Va (67). If the mean speed of the front wheels is greater than the rear wheel speed, the mean speed of the front wheels is set equal to the reference vehicle speed Vs (69). On the contrary, if the mean speed of the front wheels is equal to or less than the rear wheel speed, the rear speed is set equal to the reference vehicle speed Vs (68). The program then returns to step 25 and subsequent steps, which is then repeated.

In the main routine for the control operation described above, if the flag OCF is set at steps 25, 42, 74, 80 and 87, the next step executes the antiskid control subroutine OCFMi. If the flag TOF is set at steps 27, 44, 76, 82 and 89, the next step executes the motor energization control subroutine TOFMAi.

As described above, the flag OCF is set in response to an overflow from the internal counter having a period of 6 msec while the flag TOF is set in response to an overflow from another internal counter having a period of 64 msec. As mentioned previously, the flag is examined at a number of steps to see if they are set or reset, and if either flag is set, either the antiskid control or the motor energization control is initiated. Accoringly, the antiskid control OCFMAi is substantially executed with a period of 6 msec while the motor energization control is substantially executed with a period of 64 msec.

The motor energizationccontrol subroutine TOFMAi will be eescribed with reference to flowcharts shown in FIGS. 9a to 9e. Upon entering the motor energization control subroutine, the microprocessor 13 initiall clears flag TOF and then examines to see if the warning flag is set (91), which flag is set upon detection of an abnormality as will be described later. If the warning flag is not set, the microprocessor clears a flashing counter and then examines the on/off condition of the motor relay RLY at step 106. However, if the warning flag is set, the microprocessor examines a continued decompression abnormality flag WRNFLG (93a), which is set at step 33b shown in FIG. 7b, and then examines a sensor warning flag (93b). If the flag WRNFLG is found set, the microprocessor loads a three cycle flashing pattern data into a register (94) while it loads a two cycle flashing pattern data into a register if the sensor warning flag is set (93c) while deenergizing the main relay MRY, the motor relay RLY and the valve units SOL1 to SOL3 (95). In other words, the microprocessor establishes an abnormality-proof condition which does not accompany the antiskid control or a control over the liquid brake pressure. As the program proceeds through steps 96 to 105 and subsequent steps, the microprocessor controls a flashing operation of the warning lamp WL in a pattern which comprises illuminating it for a time interval of 0.5 second, followed by an extinction for the next following 0.5 second and again illuminating it for another 0.5 second. After the flashing operation continues for a period of 5 seconds, the lamp is extinguished. If the flag WRNFLG remains set after the time interval of 5 seconds, the flashing control is performed once again, with a result that the warning lamp will flash three times during the time interval of 5 seconds with a period of one second as long as the flag WRNFLG remains set. The flashing operation ceases when the flag WRNFLG is cleared. The lamp will flash twice during the time interval of 5 seconds with a period of one second if the sensor warning flag is set.

If the flashing control is or is not effected, the microprocessor examines the on/off condition of the motor relay RLY (106). It is to be noted that this relay is turned off at step 95 if the flag WRNFLG is set. When the relay is off and the motor remains at rest, the microprocessor compares the content of an estimate temperature register Tm against 40 (representing an estimate temperature of 40° C.), and if it exceeds 40, indicating that there is an increased temperature difference over an ambient temperature to cause a rapid reduction in the temperature, the content of the estimate temperature register Tm is updated to the current value from which 3 is subtracted (108).

When the content of the estimate temperature register Tm is equal to or less than 40, the content is compared against 20 (standing for an estimate temperature of 20° C.) (109). If the content is higher than 20, the estimate temperature register Tm is updated to the current value from which 2 is subtracted (110). When the content of the estimate temperature register Tm is equal to or less than 20, the estimate temperature register Tm is updated to the current value from which 1 is subtracted (111).

When the updated value is less than 0, the estimate temperature register is updated or cleared to 0 (112, 113). After updating the register in this manner, the updated content of the estimate temperature register Tm is compared against 20 (114), and if it is less than 20, the microprocessor clears a motor on inhibit flag (115), which flag is set upon ceasing to energize the motor when an estimated motor temperature is equal to or greater than 80 and there is a likelihood of overheating. This means that the energization of the motor is inhibited at an estimate temperature value of 80, but such inhibit is terminated when the estimate temperature value becomes equal to or less than 20. A hysteresis is provided between the inhibition and the termination of the inhibition for the motor energization in consideration of the stability of the control and a brake reaction which a driver of the vehicle experiences. If the inhibition over the motor energization control is terminated at an elevated temperature, it is highly possible that the temperature will immediately rise to an inhibitting temperature, resulting in a hunting operation to cause instability in the automatic control. In addition, this increases the possibility that a brake reaction experienced by a driver varies from time to time, causing a trouble.

The program then proceeds to the examination of the warning flag at step 124. If it is found at step 106 that the motor relay RLY is on, indicating that the motor is being energized, the microprocessor comapres the content of the estimate temperature register Tm against 40 (116). If it exceeds 40, this means that the motor temperature is relatively high and has a high heat dissipation associated with a reduced rate of temperature rise. Accordingly, the estimate temeerature register Tm is updated with a current value to which 2 is added (117). If the content of the estimate temperature register Tm is less than 40, it is compared against 20 (118). If it exceeds 20, the estimate temperature register Tm is updated with its current value to which 3 is added (119). If the content of the estimate temperature register Tm is equal to or less than 20, it is updated with its current value to which 4 is added (120). Subsequently, the updated value in the estimate temperature register Tm is compared against 80, and if it exceeds 80, the estimate temperature register Tm is updated to 80 (122), and recognizing that the motor 15 is overheated, the microprocessor sets the motor on inhibit flag (123) to assure the safety of the motor, the microprocessor then examining the warning flag at step 124.

If it is found at step 124 that the warning flag is set, the microprocessor turns the motor relay RLY off (130), clears an extended 3 msec timer to proeeed to step 133. If the warning flag is reset, the microprocessor examines the motor on inhibit flag (125), and if the flag is set, it similarly turns the motor relay RLY off (130) and clears the extended 3mmsec timer before proceeding to step 133. If it is found at step 125 that the motor on inhibit flag is reset, the microprocessor reads an open/closed condition of the pressure switch PS to see if it represents a low or high pressure condition (126). If the low pressure condition is found, the microprocessor turns the motor relay RLY on (132), and then the program proceeds to step 133. If the high pressure condition is found, the microprocessor examines the motor relay RLY to see if it is on or off (127), and if it is not on (which is normal) the program proceeds to step 133. If the motor relay is on, it should be turned off, but, the extended timer must be set if it is not set. If the timer is set, it is incremented by one (64 msec) (128), and the microprocessor examines if the value in the timer is equal to or greater than 3 seconds (or equal to or greater than 3000/64) (129). If the value in the timer is not greater than 3 seconds, the program proceeds to step 133 so as to maintain the relay on. If the timer value is equal to or greater than 3 seconds, the microprocessor turns the motor relay RLY off (130) and clears the extended timer. The purpose of continuing the motor energized for three seconds after the switch PS has become closed in response to a pressure rise as a result of energizing the motor 15 under the low pressure condition with the switch PS open, is to provide a hysteresis action in the energization and deenergization of the motor. Without the continued energization for three seconds, the motor 15 will be energized as soon as the accumulator pressure falls slightly, and the motor 15 will have to be stopped immediately if the pressure increases through a small value, resulting in the motor 15 being turned on and off too frequently.

When the program proceeds to step 133, the microprocessor 13 examines a code whic is output at its output port SOL3 to see if the code indicates a decompressing energization. If the code does not indicate a decompressing energization, the microprocessor clears SOL3 on counter (134) and the program proceeds to step 137. IIf the code indicates a decompressing energization, the microprocessor examines a rear pressure down stop flag (135), and the program proceeds to step 137 if this flag is set. However, if this flag is not set, indicating that a decompressing energization is being effected to decompress the liquid brake pressure, the microprocessor increments SOL3 on counter by 1 (64 msec) (136), and the program proceeds to step 137.

Upon proceeding to step 137, the microprocessor 13 examines a code which is output on its output port SOL1 to see if it indicates a decompressing energization. If the code does not indicate a decompressing energization, the microprocessor clears SOL1 on counter (138), and the program proceeds to step 141. If the code indicate a decompressing energization, the microprocessor examines FL pressure stop flag (139), and if it is set, the program proceeds to step 141. If the flag is not set, indicating that a decompressing energization is effective to decompress the liquid brake pressure, the microprocessor increments SOL1 on counter by 1 (64 msec) (140), and the program proceeds to step 141.

Upon proceeding to step 141, the microprocessor 13 examines the code which is output on its output port SOL2 to see if it indicates the decompressing energization. If it does not indicate a decompressing energization, the microprocessor clears SOL2 on counter (142), and the program returns to the main routine from which the motor energization control subroutine is entered (Return). If the code indicates a decompressing energization, the microprocessor examines FR pressure stop flag (143), and if the flag is set, the program returns to the main routine from which the motor energization control subroutine is entered (Return). If the flag is not set, indicating that a decompressing energization is effective to decompress the liquid brake pressure, the microprocessor increments SOL2 on counter by 1 (64 msec) (135), and the program returns to the main routine from which the motor energization control subroutine is entered (Return).

As a result of the motor energization control subroutine TOFMAi described above, whenever the accumulator pressure reduces below a given value, the motor 15 is energized and ceases to operate at a time interval of three seconds after the accumulator pressure has returned to the given value. During the time the motor 15 is energized, an estimated motor temperature value is increased at a rate which corresponds to a particular range of estimate values, and during the time the motor 15 remains at rest, itiis reduced at a rate which corresponds to a particular range of estimate values.

When the estimated motor temperature value exceeds the given value of 80, the motor on inhibit flag is set to cease to energize the mttor 15. After the flag has been set, the flag is cleared to enable the energization of the motor if the estimated motor temperature value reduces below 20. When decompressing the liquid brake pressure, one of SOL1 to SOL3 on counters which are used to monitor the time duration of the decompressing cycle and which corresponds to one of the valve units SOL1 to SOL3 which is subject to the decompressing energization is incremented. The content of SOL1 to SOL3 on counters is examined at steps 30 to 34 of the main routine described above, and if it is found that the time duration is equal to or exceeds five seconds, the flag WRNFLG is set to indicate an abnormally continued decompression. If tiis flag is set during the motor eeergization control, a flashing of the warning lamp WL is caused, and to guard against any abnormality, the main relay MRY, the motor relay RLY and the solenoid valve units SOL1 to SOL3 are all turned off.

The antiskid control OCFMAi will now be described with reference to FIGS. 10*a* to 11*g*. As mentioned previously, the microprocessor 13 enters the antiskid control OCFMAi substantially with the period of 6 msec. It then clears the flag OCF which indicates the presence of an overflow from the internal counter having a period of 6 msec (145), restarts this internal counter (146), stores the content of the previous time register $T_1$ allocated to the rear wheels as has been described in connection with the interrupt operation (147), and compares the time interval T for the rear wheels, which have been referred to in the description of the interrupt operation, against 30 msec and 50 msec, respectively (148). If the interval T is between these values, a determination is rendered that the wheel speed is zero, and the content of the pulse count register N is cleared to 0 to simplify the subsequent calculation of the wheel speed (FIG. 7*b*). The microprocessor then sets rear 6 msec complete flag (150). The microprocessor similarly renders a decision of zero wheel speed for the front wheels FR and FL, at steps 151 to 154 and 155 to 158, respectively, and in the event the wheel speed of 0 is determined, the register N is reset to zero and 6 msec complete flag is set.

The microprocessor 13 then examines data in BS register (which stores the status of the brake siitch BS at a reading step shown in FIG. 7*c* to read a change in the status thereof) (159), and if the status represents an L level, indicating no depression of the brake pedal, this means that the antiskid control has been completed as is the shock absorber control. Accordingly, it examines an absorber control flag, and if a hard condition is established in the absorber, such condition is terminated. Specifically, if an absorber hard condition flag is set (501), the hard condition is terminated and the flag is reset (502). If this flag is not set, which is normally acceptable, the program proceeds to the next following step. 3 is loaded into an intensifying mode counter while clearing a decompressing counter, and a low $\mu$ flag is cleared (160). In this mannrr, the status register is initialized in preparation to the antiskid control when the brake pedal 1 is depressed for the next time.

The microprocessor then compares the reference vehicle speed Vs (refer steps 67 to 69 of FIG. 7*f*) against rear wheel speed Va (161). If the reference vehicle speed differs from the rear wheel speed Va, the refernece speed Vs should be equal to the mean wheel speed of the front wheels (the front wheel speed being higher than the rear wheel speed), and hence the program proceeds to step 174. However, when the reference vehicle speed Vs is equal to the rear wheel speed Va, the rear wheel speed is higher than the front wheel speed (due to the possibility of an acceleration slip), and the microprocessor compares FR speed against 0.875 Vs (Vs=rear wheel speed Va) (162). If FR speed is less than 0.875 Vs, the possibility of an acceleration slip increases even further, and accordingly, FL speed is compared against 0.875 Vs (Vs=rear wheel speed Va) (163). If FL speed is less than 0.875 Vs, this is determined to be representative of the presence of an acceleration slip, thus setting this flag (164). If FR speed is equal to or greater than 0.875 Vs or if FL speed is equal to or greatrr 0.875 Vs, it is determined that an acceleration slip has not occurred, and the program proceeds to step 171 where the acceleration slip flag is cleared.

If the comparison between the reference vehicle speed Vs' (refer steps 67 to 69 of FIG. 7f) and the rear wheel speed Va at step 161 indicates that there is a difference therebetween, the program proceeds to step 174 since the reference speed Vs' should be equal to the mean wheel speed of the front wheels (the front wheel speed being greater than the rear wheel speed). The reference speed Vs' is then compared against the mean speed of the front wheels (174). If the reference speed Vs' does not match with the mean front wheel speed, a decision over the occurrence of an acceleration slip cannot be made because sufficient data therefor is not available, and hence the microprocessor clears the acceleration slip flag (171). If a match is found or the mean front wheel speed is greater than the rear wheel speed, the reference speed is compared against 30 km/h (175).

At vehicle speeds equal to or greater than 30 km/h while the brake is turned off and the front wheel speed is higher than the rear wheel speed, the rear wheel speed is compared against 0.875 Vs (176). If the rear wheel speed is equal to or greater than 0.75 Vs, it is determined that at least one of vehicle speed sensors 10 to 12 is faulty, and thus the sensor warning flag is set (170) while the acceleration slip flag is cleared (171). If the rear wheel speed is less than 0.75 Vs, FR speed is compared against 1.25 Vs and 0.75 Vs, respectively, (177, 178), and if FR speed is greater than 1.25 Vs or less than 0.75 Vs, it is determined that at least one of the vehicle speed sensors 10 to 12 is faulty, thus setting the sensor warning flag (170) while clearing the acceleration slip flag (171). If FR speed is in a range between 0.75 Vs and 1.25 Vs, this is considered as a normal condition witout the occurrence of an acceleration slip, and thus the acceleration slip flag is cleared (171).

When the reference speed Vs' is less than 30 km/h (175), the reference speed Vs' is compared against 20 km/h (179). If the reference speed is less than 20 km/h, the acceleration slip flag is cleared (171). If the reference speed is equal to or greater than 20 km/h, the rear wheel speed, FR speed and FL speed are compared against 5 km/h, and if the former is equal to or less than 5 km/h, it is determined that at least one of the vehicle speed sensors 10 to 12 is faulty inasmuch as the operation up to this point is based on the premises that the brake is turned off, and the mean front wheel speed is greater than the rear wheel speed and is equal to or greater than 20 km/h, while the indicated wheel speed is abnormally low as in comparison thereto, thus setting the sensor warning flag (170) and clearing the acceleration slip flag (171).

When it is determined that an acceleration slip has occurred and the acceleration flip flag is set (164), FR speed and FL speed are compared against 20 km/h, respectively (165, 166). A difference between FR and FL speed is small at a speed which exceeds 20 km/h, and hence FR speed is compared against FL speed (167, 168), and if there is a difference of an excessive magnitude therebetween, it is determined that at least one of the vehicle speed sensors 10 to 12 is faulty, thus setting the sensor warning flag (170) and clearing the acceleration slip flag (171). If a difference between them is small, it is determined that the sensors are operating properly, giving a normal indication of status. Accordingly, a control reference vehicle speed Vs which is used upon initiating the antiskid control when the brake is applied is established (169). This takes place by loading the reference vehicle speed Vs' into a control reference vehicle speed register. When the brake is applied, the control starts from an deceleration region I as indicated in FIG. 5. In preparation to the standby mode therefor, a flag representing the deceleration region I is set, flags OCR associated with the rear wheels and FL and FR wheels which indicate the need to implement the antiskid control are cleared, add the mode counter, the control counter, a high μ flag, a slip counter and a deceleration region counter are cleared (172). It is to be noted that when the high μ flag is cleared, this corresponds to the low flag which is set. Specifically, when the acceleration flag is set (164), the low μ flag is set (172). The solenoid valve unit SOL1 to SOL3 are then deenergized (173), and thus the program returns to a control step which precedes the antiskid control OCFMAi.

Upon entering the antiskid control OCFMAi, when it is found at step 159 that BS=H, indicating that the brake pedal has been depressed, the program proceeds to step 183 where the acceleration slip flag is examined to see if it is set. If the flag is not set, the program proceeds to step 188 where the flag OCR indicating the need to implement the antiskid control is examined. If the acceleration slip flag is set, this means that the rear wheels have slipped, and accordingly, the mean front wheel speed is set equal to the reference vehicle speed Vs' (184), which speed Vs' is then compared against the rear wheel speed (185). If the rear wheel speed is less than Vs', this means that the acceleration slip no longer prevails, so that the acceleration slip flag is cleared (187) and the flag OCR which indicates the need for the antiskid control is examined (188). If the rear speed is equal to or greater than Vs', it is possible that an acceleration slip is occurring. It is thnn determined if a brake on condition (BS=H) continues over a time interval in excess of 300 msec (186), and if it continues, there is a high probability that the rear wheel speed has exceeded the reference vehicle speed Vs' (the mean front wheel speed) as a reuslt of braking the front wheels rather than by an acceleration slip, and accordingly the acceleration slip flag is cleared (187) and the flag OCR indicating the need for the antiskid control is examined (188).

Figure 10E:
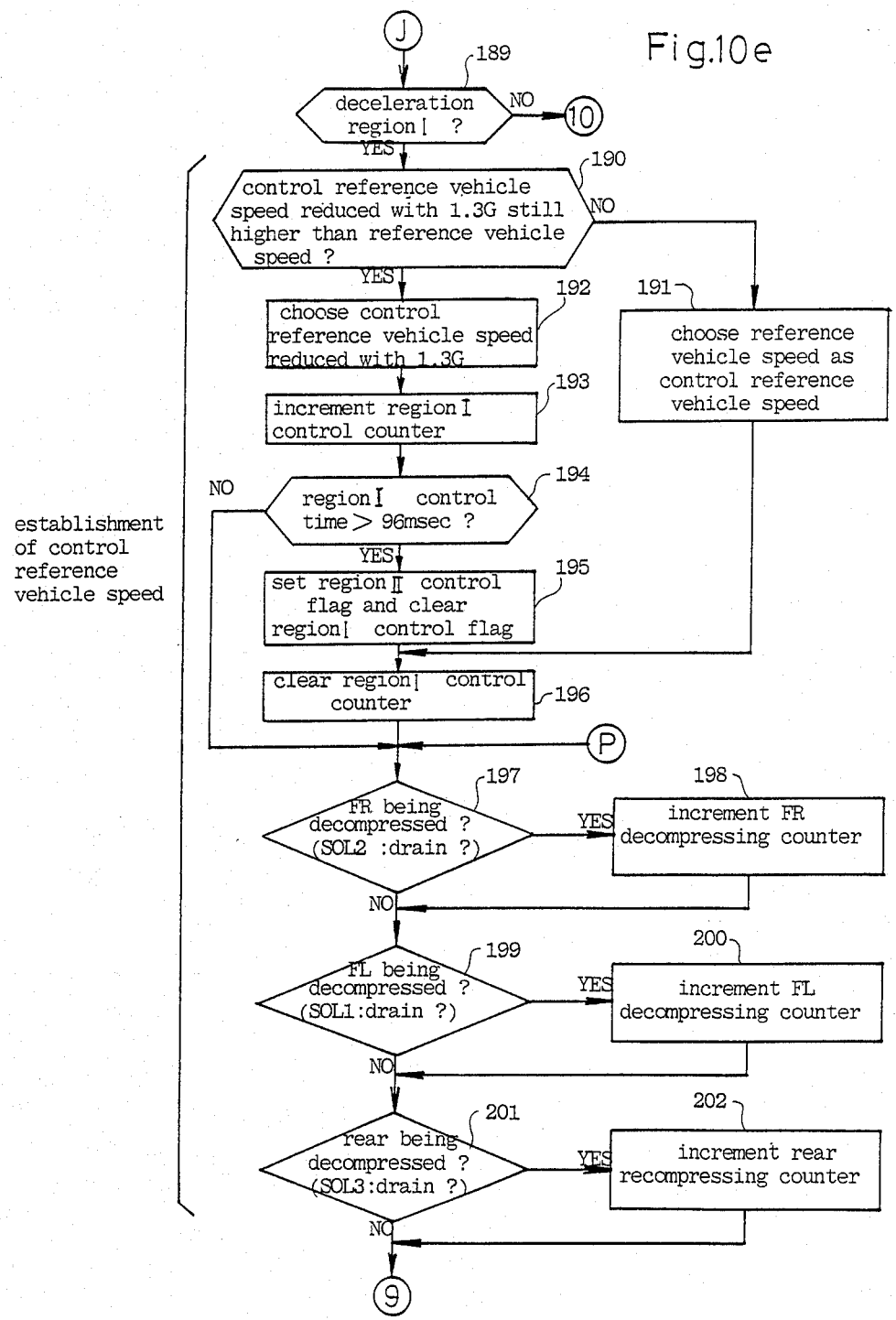
Figure 10F:
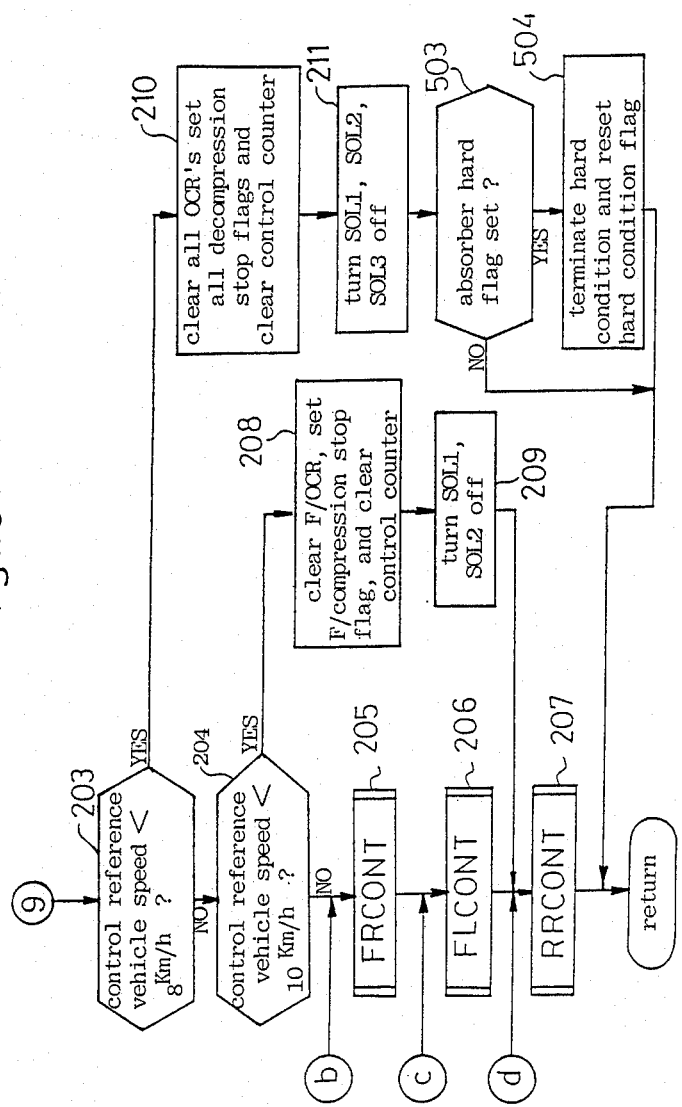
Figure 10G:
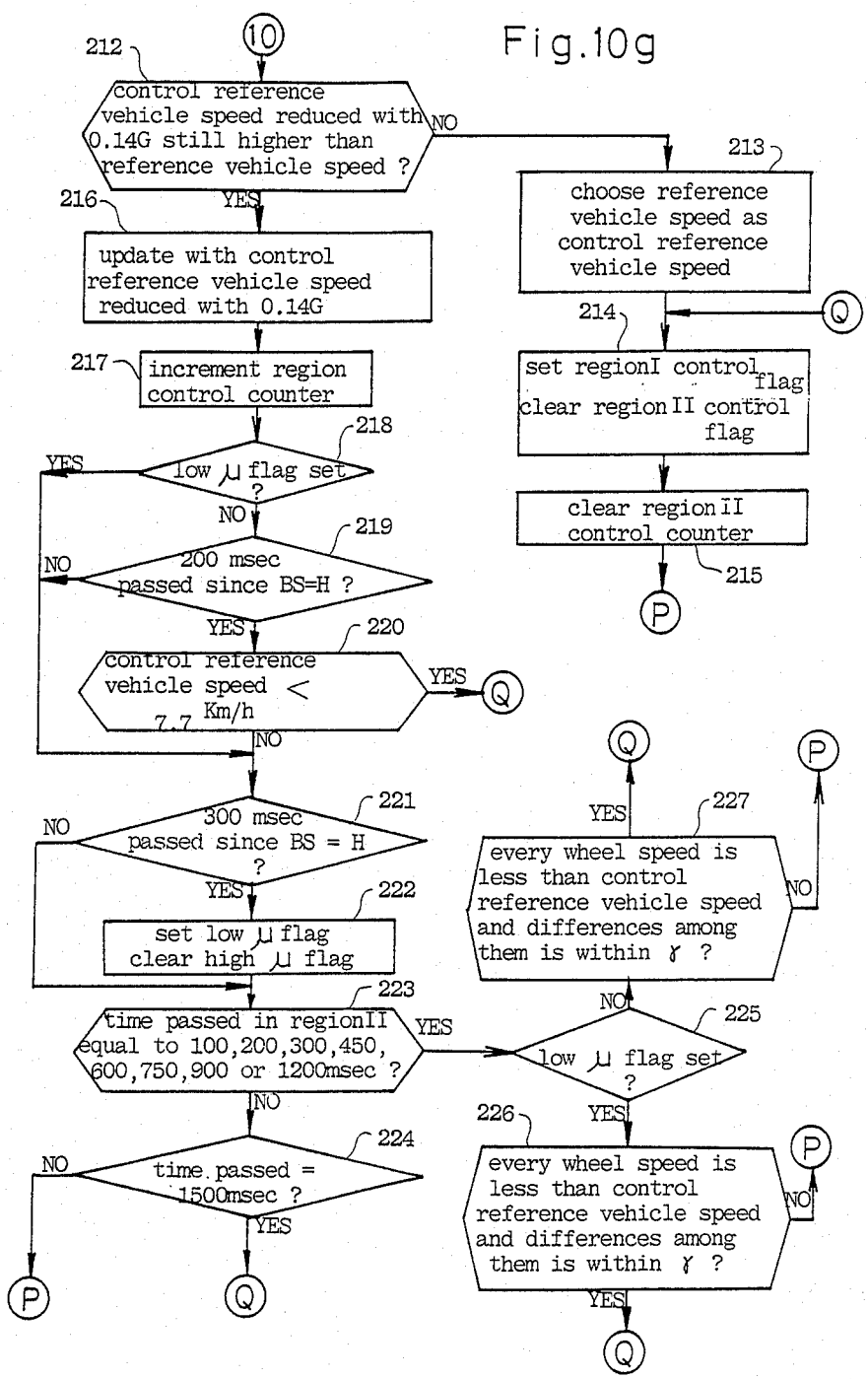

The flag OCR indicating the need for the antiskid control is associated with each of FL, FR and rear wheels, and when it is examined at step 188, if it is found that the flag is not set, the program proceeds to the decision of need to implement the antiskid control shown in FIG. 10h while the program proceeds to the liquid brake pressure control which begins with step 189 in FIG. 10e if at least one flag OCR is set.

Initially referring to FIG. 10h, the decision to implement the antiskid control will be initially described. An intensifying mode counter is initially preset to 3 (228), and the control reference vehicle speed Vs is compared against 20 km/h (229). At a control reference vehicle speed Vs equal to or less than 20 km/h, it is unnnecessary to initiate theantiskid control, and hence the program proceeds to step 169 shown in FIG. 10d, thus updating the control reference vehicle speed Vs. The prevailing reference vehicle speed Vs' is used to update the control reference vehicle speed register. However, if the control reference vechicle speed Vs exceeds 20 km/h, the antiskid control (the liquid brake pressure control) may be required depending on the situation. Accordingly, the control reference vehicle speed Vs is updated to a value which is used when controlling the brake pressure at steps 230 and 231 of FIG. 10h. Specifically, the control reference vehicle speed is reduced temporarily with a deceleration of 1.3 G, and the resulting vauue is compared against the actual reference vehicle speed Vs'. The control reference vehicle speed Vs is chosen as the higher one of these values (which corresponds to the region I shown in FIG. 5). Following steps 233 to 238 determine in which area of the segmentation chart shown in FIG. 6a the brake on condition is initiated. If it resides in an intensify holding region in FIG. 6a, an intensify holding mode flag FLUPH, FRUPH or RRUPH is set at steps 239 to 244, and the flag OCR is also set, and the program proceeds to the antiskid control (FRCONT) for the front right-hand wheel, the antiskid control (FLCONT) for the front left-hand wheel or the antiskid control (RRCONT) for the rear wheels.

If the determination indicates that the brake on condition has been initiated in the continuous intensifying region shown in FIG. 6a, the solenoid valve units SOL1 to SOL3 assume a deenergized condition or an intensifying condition, and no action is required. The program then returns to a control step from which the antiskid control OCFMAi is entered (Return). Accordingly, when the operation remains in the continuous intensifying region shown in FIG. 6a, the solenoid valve units SOL1 to SOL3 are left deenergized if the brake on condition is established, whereby the liquid brake pressure from the master cylinder is fed to the wheel cylinder, and the liquid brake pressure increases with an increase in the output liquid pressure from the master cylinder 2, thus increasing the braking force, eventually entering the intensify holding region shown in FIG. 6a in which the intensify holding mode flag FLUPH, FRUPH or RRUPH is set and the flag OCR is also set at steps 233 to 244.

Assuming that the intensify holing flag FLUPH, FRUPH or RRUPH has been set as is antiskid control implement flag FLOCR, FROCR or RROCR to enter either antiskid control FLCONT, FRCONT or RRCONT and then program has returned to a control step from which the antiskid control OCFMAi is entered, or the program has entered the antiskid control OCFMAi and has executed the control operation up to step 188, it will be seen that the antiskid control implement flag OCR ss set at this time, indicating that the antiskid control FLCONT, FRCONT or RRCONT has been executed once or more times, the program then proceeds from step 188 (FIG. 10b) to step 189 (FIG. 10e) where it is examined whether the operation is in the deceleration region I. If the operation is in the deceleration region I (see FIG. 5), the control reference speed Vs is reduced with a eeceleration of 1.3 G, and the resulting value is compared against the original reference speed Vs' (190). If the original speed Vs' is greater than the calculated value, the original speed Vs' updates the control reference speed register as control reference speed Vs (191), and the progra then proceeds to step 196 where the region I control counter is cleared. On the contrary, if the calculated value is greater than the original reference vehicle speed Vs', the region I control counter is incremented by one (6 msec) (193), and its content is compared against 96 msec (194). If the content of this counter is equal to or greater than 96 msec, a region II control flag is then set to enable the calculation with a deceleration of 0.15 G, the region 1 control flag is cleared (195) and the region I control counter is cleared (196). If tee content of the region I counter is less than 96 msec, the region control flag remains unchanged to enabee the calculation with a deceleration of 1.3 G.

The microprocessor the n examines a code which specifies the energization of the valve units SOL1 to SOL3 (197, 199, 201), and if it finds a decompressing energization with either ⅛ enegization or ¾ energization, it inceements the decompressing counter by one (6 msec) (198, 200, 202). If the decompression energization is not employed or if the decompressing counter is incremented by one because of the decompressing energization implemented, the control reference vehicle speed Vs is compared against 8 km/h (203), and if it is less than the latter, the antiskid control for all the wheels is terminated by clearing the antiskid implement control flag OCR, setting the decompression stop flag and clearing the control counter (210), thus deenergizing all of the solenoid valve units SOL1 to SOL3 (211). Since the absorber control which establishes the variable attenuation shockaabsorber in its hard condition is also completed, the microprocessor examines an absorber hard condition faag (503), and if the flag is set, it terminates the hard condition of the absorber and then resets the flag (504). If the absorber hard condition flag is not set, this is recognized as acceptable, and the program returns to a control step from which the antiskid control OCFMAi is entered (Return).

When the control reference vehicle speed Vs is equal to or greater than 8 km/h, it is compared against 10 km/h (204). If the control reference vehicle speed Vs is less than 10 km/h, the antiskid control for only the front wheels is terminated by clearing the antiskid implement flags OCR for FR and FL, setting the decompression stop flag for FR, FL and clearing the control counter (208). The valve units SOL1 and SOL2 are deenergized, and the program proceeds to the antiskid control RRCONT for the rear wheels provided the antiskid implement flag RROCR for the rear wheels is set.

If it is found at step 189 that the operation is not in the deceleration region I, but rather is in the region II, the calculation with a deceleration of 0.14 G is effected, and the resulting value is compared against the original reference speed Vs' (212). If the calculated value is greater than the original reference speed Vs', the calculated value is set equal to the control reference speed Vs (216), the region II control counter is incremented by one (6 msec) (217), and the low $\mu$ flag is examined to see if it is set (218). If the low $\mu$ flag is not set, meaning that there is little slip, it is then examined to see if a time interval of 200 msec has passed since the brake on condition has been established (219). If such time interval has passed, the braking action should be effective, and accordingly the control reference speed Vs is compared against 7.7 km/h, and if it is less than 7.7 km/h, the program proceeds to step 214 where the region I control flag is set and the region II control flag is cleared (214), and the region II control counter is cleared (215). The proram then returns to step 197.

If a time interval of 200 msec has not passed since the establishment of the brake on condition when the low μ flag is set or if the control reference vehicle speed Vs is equal to or greter than 7.7 km/h, it is then examined to see if a time internal of 300 msec has passed since the establishment of the brake on condition (220). If such time interval has passed, the low μ flag is set and high μ flag is cleared (222). If such time interval has not passed, the program skips this step 222, and the time interval which has passed in the region II is examined on the basis of the content of the region II control counter (223, 224). When the iime interval passed is equal to 100, 200, 300, 450, 600, 750, 900 or 1200 msec, the low μ flag is examined if it is set (225). If the low μ flag is set, all the wheel speeds Va are compared against the control reference speed Vs to determine whether the differences are all within β, and if the low μ flag is not set, the corresponding comparison is made to determine whether all differences are equal to or greater γ (226, 227). If all differences are within β or γ, the program proceeds to step 214 where the region control flag is set to region I, and region II control flag is cleared (215). If differences are not within β or γ, the program returns to step 197 without altering the region control flag. When the time interval passed is equal to 1,500 msec, the operation is altered to region I. At all other values of the time interval passed, the program proceeds to step 197, waiting for the time to pass.

It will be noted that "the establishment of control reference vehicle speed Vs" which ranges from step 189 to 227 is executed only when the flag OCR is set in order to determine the control reference vehicle speed Vs as a time sequence and the speed region I or II as a function of the time interval passed since the establishment of the brake on condition, the time interval passed in various regions, the low μ flag which is either set or reset indicating the occurrence of a slip, the original reference vehicle speed Vs' and a calculated speed value on the basis of Vs' at the time the brake pedal is depressed using a given deceleration. In the region I or when the original reference vehicle speed Vs' is reduced as indicated in FIG. 5, a decision is made to see if the conditions to shift to the region II are satisfied at steps 190 to 195. In the region II or when the original reference speed Vs' has recovered as indicated in FIG. 5, a decision is made to see if the conditions to return to the region I are satisfied at steps 212 to 217 and step 197. It will be seen that as a result of establishing the control reference vehicle speed Vs (189 to 227) in the manner mentioned above, the control reference vehicle speed Vs is established and updated during the antiskid control, and the time duration of the decompression is counted for a decompression cycle.

The antiskid control (liquid brake pressure control) FRCONT for the front right-hand wheel FR, the antiskid control (liquid brake pressure control) FLCONT for the front left-hand wheel FL, and the antiskid control (liquid brake pressure control) RRCONT for the rear wheels RR are essentially the same, with only difference that the values of constants are different between the front wheels FR, FL and rear wheels RR. Accordingly, the antiskid control FLCONT for the front left-hand wheel will be described, as representative, with reference to FIGS. 11a to 11g.

Upon entering the antiskid control FLCONT, the microprocessor 13 sets up a control address for the valve unit SOL1 (245), increments a control counter by one (246), and calculates a difference between the control reference speed Vs and the FR wheel speed Va ($\Delta Vs = Vs - Va$) to see if $\Delta Vs$ is less than 0 (247), or if the wheel speed Va is higher than the control reference vehicle speed Vs. If $\Delta Vs$ is less than 0, indicating that the wheel speed Va is higher than the control reference vehicle speed Vs, the microprocessor then examines the antiskid control implement flag OCR (FLOCR), and if it is not set, the antiskid control is unnecessary, and accordingly it provides a 0/8 energization output to the solenoid valve unit SOL1, thus deenergizing it. The program then proceeds to step 267 which will be described later. If the flag FLOCR is set, the microprocessor examines the low μ flag (258), and if this flag is not set, it compares the acceleration/deceleration Dv of the wheel speed (a positive number for an acceleration and a negative number for a deceleration) against 12 G (259). If Dv is greater than 12 G, the microprocessor clears the intensifying mode counter (260) and the program proceeds to step 262 which will be described later, since whenever the acceleration/deceleration exceeds 12 G when $\Delta Vs$ is less than 0, the continuous intensifying operation may be employed in any mode in which the liquid brake pressure is presently controlled (in the present instance, the normal braking with no antiskid control required; the valve unit SOL1 being continuously deenergized) as indicated in FIGS. 6b and 6c. If the low μ flag is set, if the acceleration/deceleration Dv is equal to or less than 12 G, reference to FIG. 6b or 6c indicates the operation in the intensifying region, thus requiring an energization pattern in the intensifying mode (indicated in the second row of chart shown in FIG. 2). Accordingly, the microprocessor determines if the intensifying mode is entered at this time by examining a flag (261).

If the ineensifying mode has not been selected, an intensifying mode flag FLUP is now set (262), and 0/8 energization output is established for the valve unit SOL1 (263; refer the pattern shown in the second row, left column in FIG. 2). The microprocessor then sets a decompression stop flag (264) and sets an intensifying mode counter (265). At this time, the microprocessor increments the intensifying mode counter to 1 when it currently contains 0, increments it to 2 when it currently contains 1, and leaves it unchanged when it contains 3. When the discontrol is entered for the first time, the intensifying mode counter is set to 3 at preceding step 228 (FIG. 10h), and accordingly, the intensifying mode counter is not altered at step 265. The microprocessor then sets the antiskid control implement flag OCR (FLOCR) (266), clears the control counter (267) and the program proceeds to next control step 207 (Return).

When the intensifying mode has been selected and thus the intensifying mode has already been entered, the program proceeds from step 261 to step 268, and the microprocessor examines the time interval passed since the intensifying mode has been entered (268). If the time interval is equal to 6 msec or the antiskid control OCF-MAi has been entered at one period after the intensifying mode has been selected (262, 263), the microprocessor examines the content of the decompression counter at steps 269 and 271. If the content of the decompression counter is equal to or greater than 500 msec, this means that there is a slip of an increased magnitude and the liquid brake pressure has been decompressed over a prolonged period of time, and accordingly the microprocessor sets the low μ flag. To reduce the rate at which the pressure is intensified or to reduce 0/8 energization time in the intensifying mode, the control counter is incremented by one (270), to add 6 msec which has passed, and update the decompression counter with its present content from which 48 msec is subtracted. The microprocessor then increments the counter by 2 (273), thus adding 12 msec which has passed. When the content of the decompression counter is less than 500 msec and is euual to or greater than 48 msec, the microprocessor sets the low μ flag and increments the control counter by two (addition of 12 msec passed) (273). It then updates the decompression counter with its present counter from which 48 msec is subtractdd (274), thus loading the rest of decompression which compensates for the intensification. When the content of the decompression counter is less than 48 msec, the microprocessor clears the decompression counter without incrementing the control counter (272). In this instance, the amount by which the pressure is intensified for a time interval of 6 msec is cancelled out from the amount by which the pressure is decompressed, by clearing the decompression counter. As a result of the incrementing operation of the control counter, it follows that when 6 msec has passed since the intensifying mode is selected (262, 263), the low μ flag is set when the decompression has been continued over a prolonged length of time (low μ) depending on the decompressing operation up to that point (or the coefficient of friction of the load), and the time interval passed in the intensifying cycle (0/8 energization or deenergization) is counted (by the control counter) over a time interval which exceeds the actual time interval passed, thus reducing the effective time inteval of the intensifying energization (0/8 energization: see the pattern indicated in the second row, left column of FIG. 2), thus retarding the rising end of the intensifying operation. In other words, the intensifying interval is determined in accordance with μ.

When it is found at step 268 that 6 msec has not passed, the time interval passed since the intensifying mode has been entered is examined at steps 275, 277, 279 and 282, and if it is found that 24 msec has passed (count 4), the code representing the energization command to the valve unit SOL1 is hhanged to ⅜ energization level. If 30 msec has passed (count 5), the code representing the energization command is changed to 2/8 energization level. If 72 msec or longer time interval has pased (count 12 and greater), the program proceeds to steps 262 to 267 where the intensifying mode flag FLUPS is set again and the code representing the energization command is changed to 0/8 energization level (deenergization) again, thus re-establishing the control in the intensifying mode (see second row, left column of FIG. 2) again. When the time interval passed is less than 72 msec (count 12), the microprocessor compares ΔVs against 0 (276). If it is less than 0, the program proceeds to next step 207 (Return). However, if the time interval is equal to or greater than 0, a next mode in which the control is to be transferred according to the segmentation chart of FIG. 6b is determined since the intensifying mode has now been established. Accordingly, the program proceeds to a decision shown in FIG. 11b which determines the next control mode which is to be transferred from the intensifying mode/intensify hllding mode. For ΔVs<0, the program does not proceed to this decision which determines the next control mode because the segmentation chart shown in FIG. 6c which determines the next control mode to be entered in the decompressing mode/decompress holding mode is quite identical to the segmentation chart shown in FIG. 6b which determines the next control mode to be entered in the intensifying mode/intensify holding mode, and thus steps 247 to 259 determines the next control mode to be entered when ΔVs<0 and transfers the mode. In this manner, the decision which determines the next control mode to be entered according to the segmentation chart shown in FIG. 6b is made only for ΔVs≧0, by proceeding to the decision shown in FIG. 11e which determines the next control mode to be entered in the intensifying mode/intensify holding mode.

If it is found that ΔVs≧0 as a result of comparison of ΔVs against 0 at step 247, ΔVs is compared then against ½ Vs (248). If ΔVs is greater, this means that the next control mode is a continuous decompression independently from whatever control mode is presently used. Thus, decompressing mode flag FLDPS is set (249). The microprocessor examines the content of the intensifying mode counter (505), and if the coutter has a count of 0, meaning that the previous control mode has been a decompressing mode and that the continuous decompression is continued, a code representing ⅞ energization is established for the valve unit SOL1 (250) while clearing the intensifying mode counter (251). The program then proceeds to step 266.

Whenever the continuous decompression mode is entered, as a result of selecting it as the next control mode, the decompressing mode flag FLDPS is set at step 249, independently from whatever control mode is presently used. However, at subsequent step 505, the content of the intensifying mode counter is examined, and unless the content of this counter is 0, this means that the operation now is in the decompressing mode after the execution of the intensifying mode. Accordingly, the number of times a change occurred from the intensifying to the decompressing mode is counted. If the number of such changes which have occurred during a given time interval exceeds a given value, it is determined that oscillations in the liquid brake pressure has developed, whereby the program effects the absorber control so as to establish the variable attenuation shock absorbers SAFR, SAFL, SARR and SARL in their hard condition. Specifically, when the intensifying mode counter has a count of 1, this means that the intensifying mode has been entered for the first time since the decompressing mode has been executed once or more. When the content of the intensifying mode counter is equal to 2, this means that the control entered the intensifying mode for the second time after the decompressing mode has been executed once or more. When the content of the intensifying mode counter is equal to 3, this means the first execution of and control in the intensifying mode after the brake on condition has been established. In either instance, the intensifying mode counter has a content which is unequal to 0. When the decompressing mode is entered, this decompressing mode follows the control in the intensifying mode, and accordingly, the combination is recognized as one cycle of an oscillation of intensifying and decompressing the liquid brake pressure. The number of such occurrences during a given time interval is counted. When this cycle occurs three or more times during 0.3 second, it is determined that an oscillation in the liquid brake pressure has developed, initiating the establishment of the hard condition in the variable attenuation shock absorbers.

When the decompressing mode is entered, the decompressing mode flag FLDPS is stt (249), and the content of the intensifying mode counter is examined at next step 505. When this counter is unequal to 0, FLZC counter which is utilized to determine the occurrence of an oscillation in the liquid brake pressure is incremented (506), and the time interval which passes since "a decision over oscillations of the vehicle" is entered is examined at step 507. The content of a timer FLZT which indicates the time interval passed is examined, and if it is found that the time interval passed does not exceed 300 msec (507), the content of FLZC counter is examined to see if it is equal to or greater than 3 (508). Unless the content of FLZC counter is equal to or greater than 3, the program proceeds to step 250 where ⅜ energization is established for the valve unit SOL 1 (250), the intensifying mode counter is cleared (251), whereupon the program proceeds to step 266. When the content of FLZC counter is equal to or greater than 3, it is determined that an oscillation in the liquid brake pressure has developed to cause mechanical oscillations of the vehicle due to the antiskid control. Accordingly, the variable attenuation shock absorbers are brought to their hard conditions by an absorber control. Specifically, an absorber hard condition flag is examined (509), and if the flag is not set, the hard condition is established in the absorbers and the flag is set (510). Examining the content of the timer FLZT which indicates the time interval passed, if it is found that the time interval equal to or greater than 300 msec has passed since the decompressing mode is entered in order to determine the occurrence of oscillations of the vehicle (507), the current decision is terminated. The timer FLZT which indicates the time interval passed is reset as is FLZC counter (511) in order to enable the next decision which determines the occurrence of oscillations of the vehicle. The program then exits from "decision of oscillations of vehicle and shock absorber control", and establishes ⅞ energization for the valve unit SOL1 for control in the decompressing mode (250), and clears the intensifying mode counter (251), whereupon the program proceeds to step 266.

When $\Delta$Vs is equal to or less than ½ Vs, Dv is compared against 20 G (252). In consdderation of the fact the next control mode to be entered is the continuous intensification, if Dv is greater than 20 G, the reference speed Vs is compared against 30 km/h, and if Vs is greater, the high flag is set while low $\mu$ flag is cleared (254), the intensifying mode counter is cleared (255), whereupon the program proceeds to step 262. If Vs is less than 30 km/h, the $\mu$ flag remains unchanged and the program proceeds to step 255. If Dv is less than 20 G, the program proceeds to step 299 (FIG. 11f).

Figure 11B:
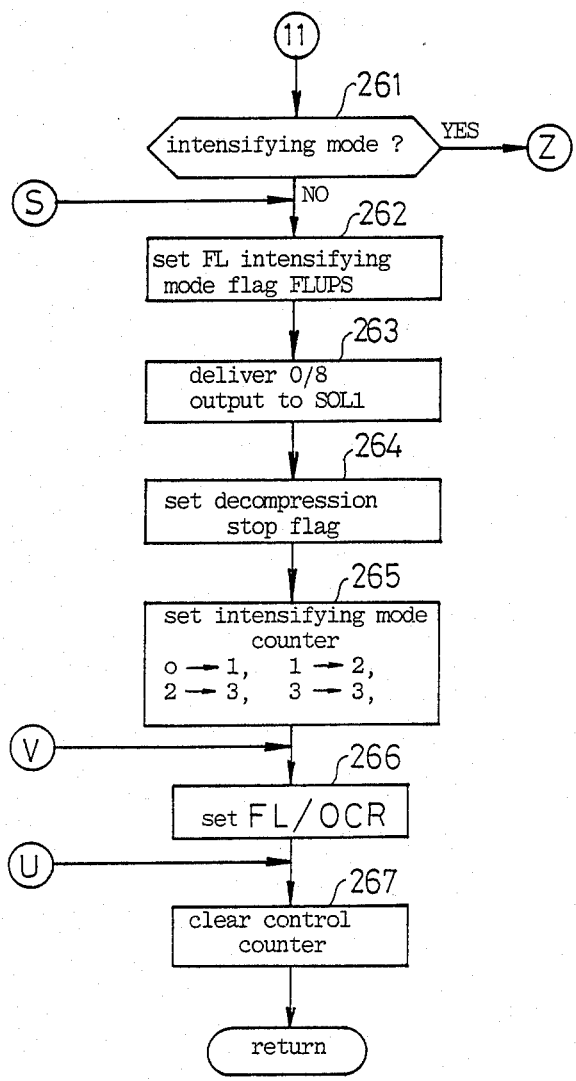
Figure 11D:
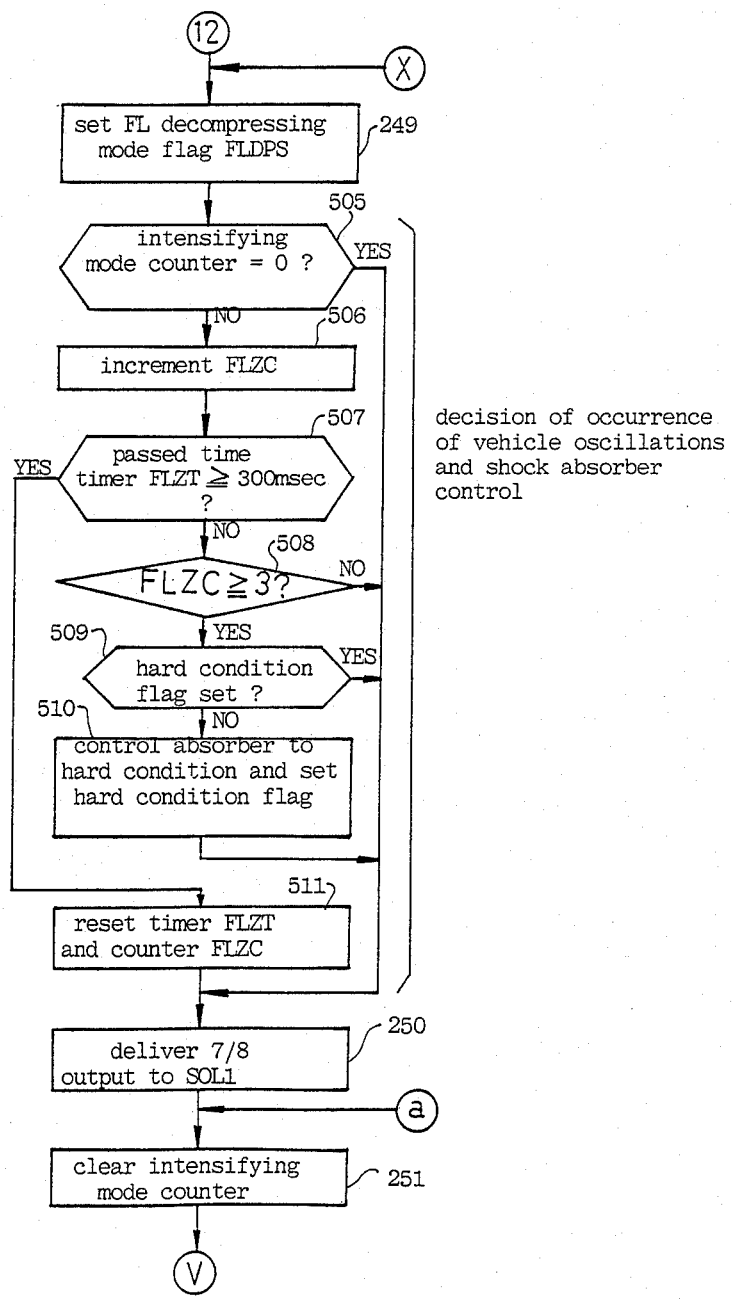
Figure 11E:
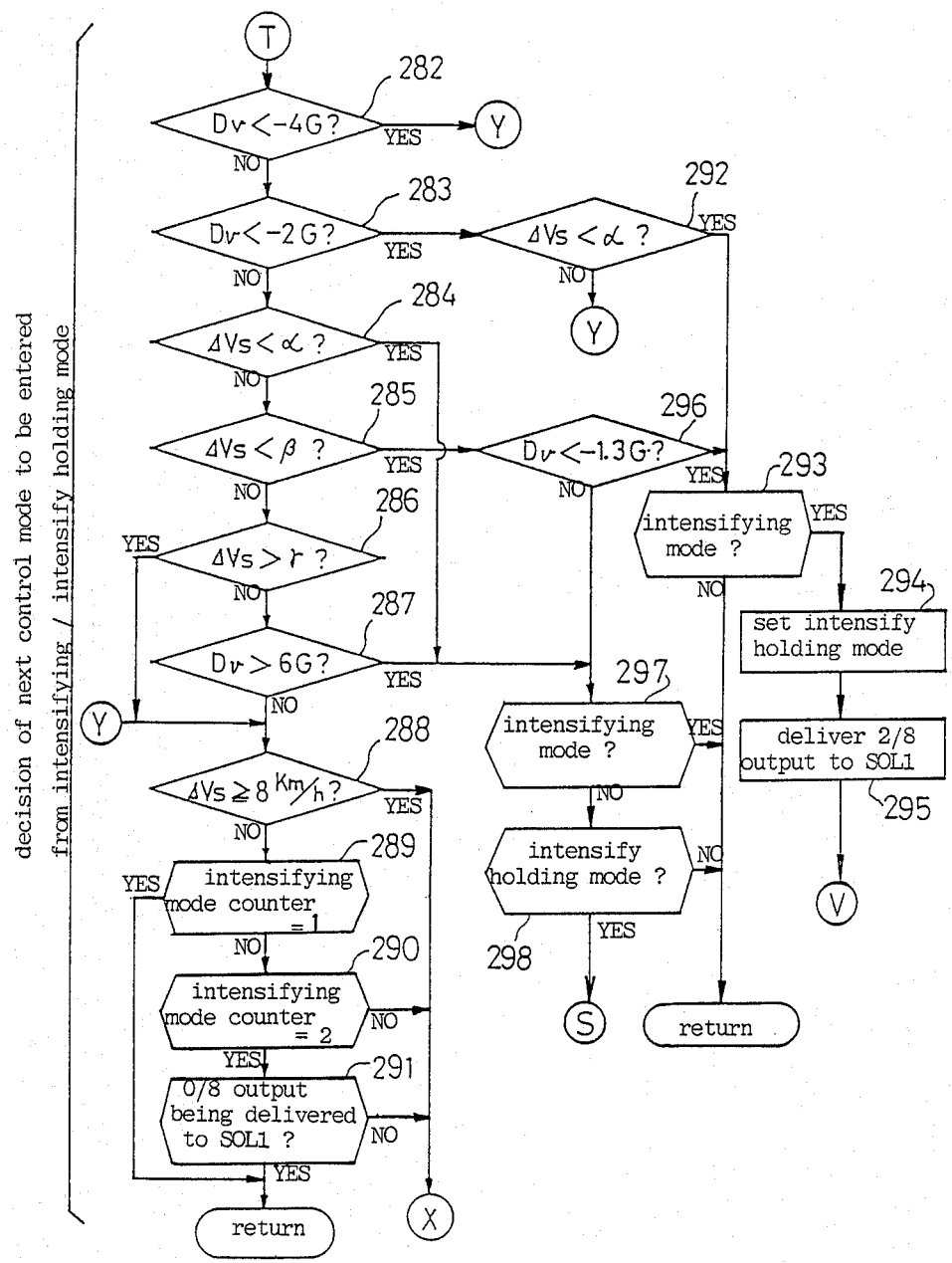
Figure 11F:
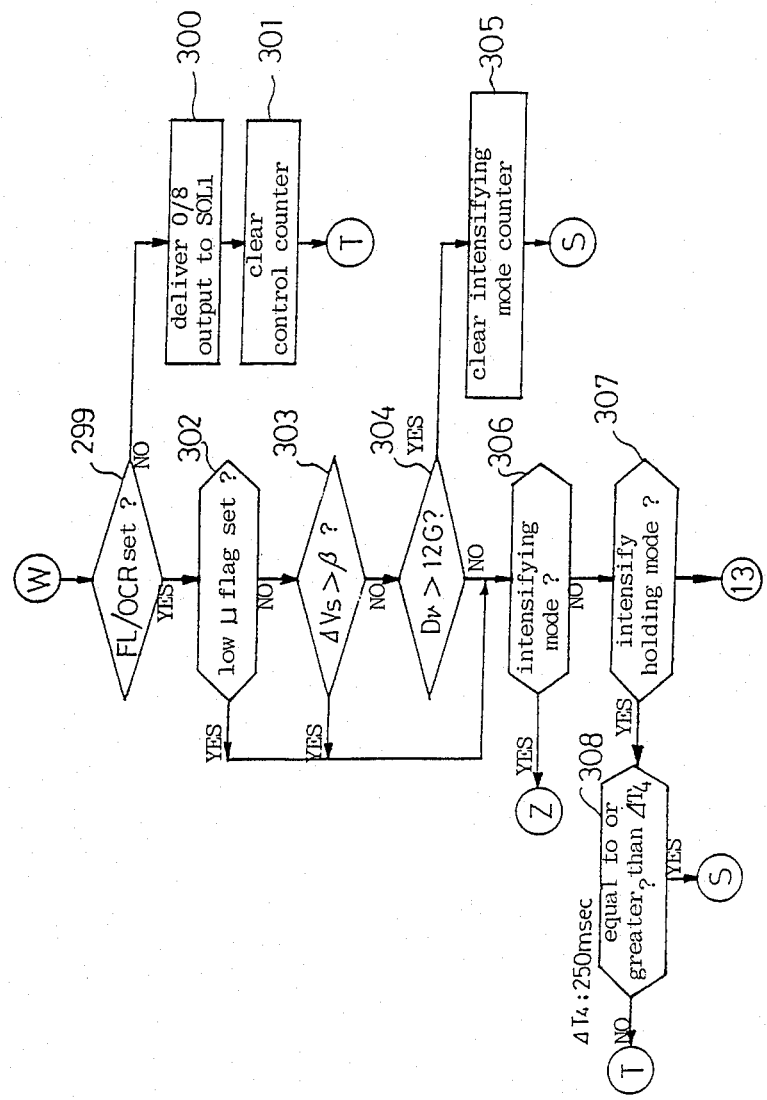
Figure 11G:
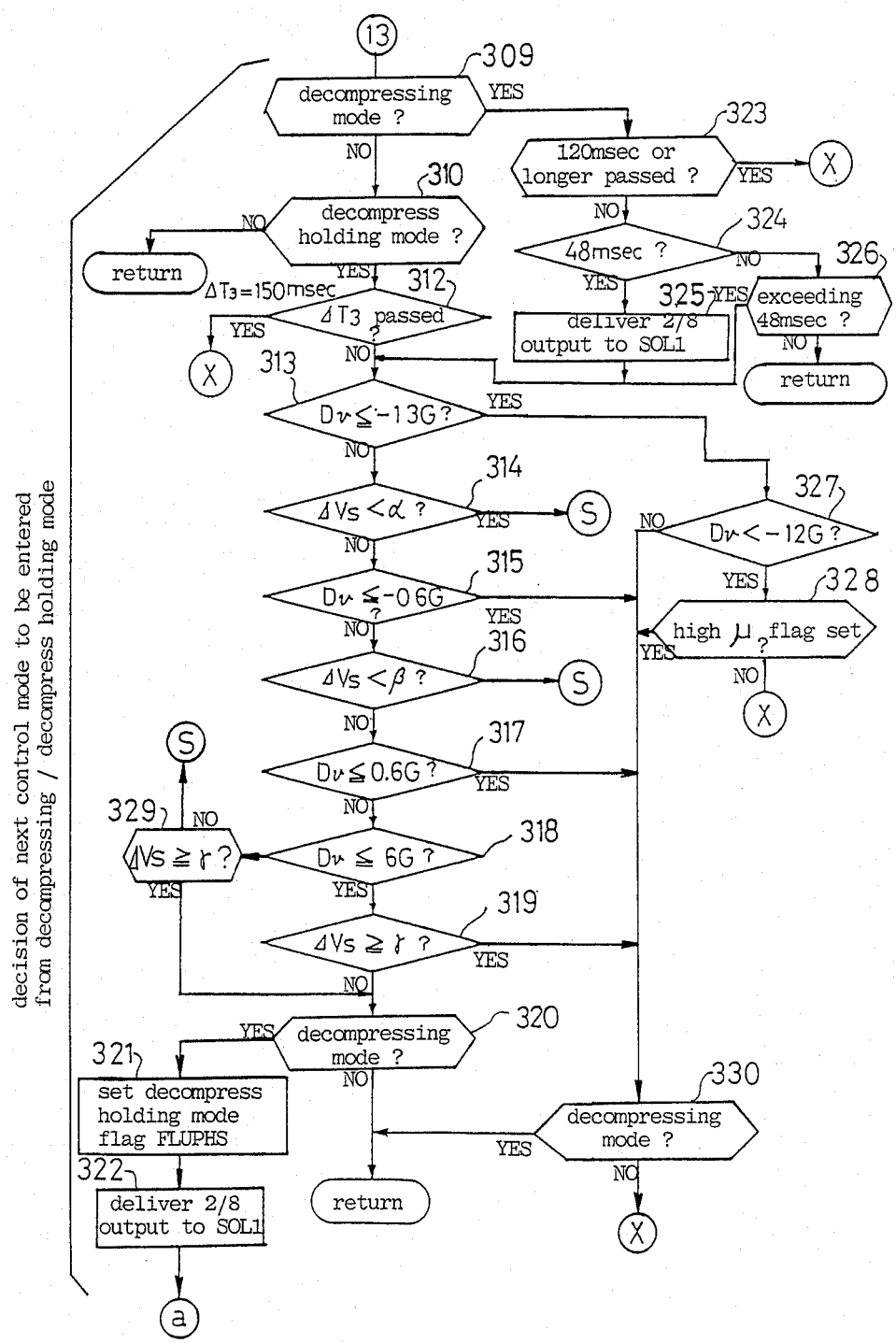

When entering the decision shown in FIG. 11f which determines the next control mode to be entered from the intensifying mode/intensify holding mode, the wheel acceleration/deceleration Dv is compared against −4 G (282), and if it is less than −4 G, the program proceeds to step 288 where $\Delta$Vs=Vs−Va is compared against −4 G 8 km/h. If $\Delta$Vs is equal to or greater than the latter, the decompressing mode is entered, thus proceeding to step 249 in FIG. 11d. However, if $\Delta$Vs is less than 8 km/h, the content of the intensifying mode counter is examined (289, 290), and if it is equal to 1, indicating that the intensifying mode has been entered for the first time after the execution of theddecompressing mode once or more times, this means that the intensifying operation may be continued and thus program returns to step 207. If the content of the intensifying mode counter is equal to 2, indicating that the intensifying mode is entered for the second time after the execution of the decompressing mode once or more times, it is examined whether the valve unit SOL1 is being energized (holding energization after completion of intensification with 0/8: see second row, left column of FIG. 2) (291). If it is being energized, the proram returns to allow the intensification to be continued (to complete one cycle of intensifying energization). If it is not being energized, this means that the required intensification has been completed, and accordingly the program proceeds to step 249 to effect the control in the decompressing mode. If the content of the intensifying mode coutner is equal to 3, this means that the intensifying mode is being executed for the first time after the brake on condition has been established (this results from the fact that the intensifying mode counter is set to 3 at step 228 and this count is left unchanged at step 265 if the count which then prevails is equal to 3), and the program proceeds to the control in the decompressing mode which begins with step 249 since the next control mode to be entered has been determined to be the decompressing mode (see FIG. 6b).

The purpose of immediately proceeding to the control in the decompressing mode after a decision therefor has been rendered, from the control in the first intensifyng mode after the brake on condition is to prevent the pressure from excessively intensified (causing the wheels to be locked). Whenever the control in the decompressing mode has been executed subsequently even once (thus clearing the intensifying mode counter), the control in the intensifying mode is repeated at least a minimum of two times whenever the pressure requires to be intensified, for the reason that the period of increasing and decreasing the liquid brake pressure can be increased since the time interval for intensifing the pressure is increased, thereby allowing the time interval for decompressing the pressure to be necessarily increased if the decompression is subsequently required. If the control in the intensifying mode is continued over two cycles, the likelihood that the pressure is excessively intensified (causing the wheels to be locked) is avoided because the liquid brake pressure has once been reduced by the preceding decompression. By increasing the period with which the liquid brake pressure rises and falls, the period of an oscillation in the braking force which results from a rise and fall in the liquid brake pressure can be increased far beyond the period of the unsprung oscillation of thevvehicle, thus avoiding an amplification of the unsprung oscillation which may be caused by a resonance or synchronization. By detecting that a change in the liquid brake pressure between its intensifying and decompressing phases occurs three or more times during 0.3 second, the hard condition is established in the variable attenuation shock absorbers, thus rapidly attenuating the oscillations of the vehicle. Thus, after the pressure has been decompressed once, the intensifying mode (see second row, left column of FIG. 2) is repeated over two cycles in succession to increase the period with which the liquid brake pressure rises and falls, and if three or more periods of such rise and fall cycle of the liquid brake pressure occur during 0.3 second, the shock absorbers are brought to their hard condition, thus rapidly attenuating the oscillations of the vehicle to prevent a resonance with the unsprung oscillation from occurring.

Returning to step 182 of FIG. 11e, if it is found at this step that the wheel acceleration/deceleration Dv is greater than −4 G, Dv is then compared against −2 G (283). If Dv is less than −2 G, ΔVs is compared against α (292), and if it is equal to or greater than α, the next control mode to be entered is either the continuous decompression or decompression. In either instance, the decompressing mode is to be executed. Accordingly the program proceeds to step 288 where a decision similar to the decision performed at step 288 and subsequent steps is made to effect the continued intensifying mode or the decompressing mode. If it is less than α, the next control mode to be entered is the holding mode. Since the operation is presently in the intensifying mode, this holding mode is one which follows the intensifying mode, that is the intensify holding mode, thus holding the intensified liquid brake pressure. Accordingly, the program proceeds through step 293 to set an intensify holding mode flag (294), and to establish 2/8 energization for the valve unit SOL1 (295), and then proceeds to step 266. When the program later proceeds to step 293 after 6 msec, the program returns from step 293 since the intensify holding mode has been set. Thus, upon entering the intensify holding mode, the holding mode is maintained unless conditions are satisfied to assume a mode other than the holding mode according to the segmentation chart shown in FIG. 6b.

Returning to step 283, when it is determined at this step that Dv is equal to or greater than −2 G, ΔVs is compared against α (284). If it is less than α, the next control mode to be entered is the intensifying mode. Accordingly, the present mode is examined to see if it is intensifying mode or intensify holding mode (297, 298). If the intensifying mode is determined, the program directly returns. If the intensify holding mode is determined, the program proceeds to step 262 to establish the intensifying mode. If it is found at step 284 that ΔVs is equal to or greater than α, ΔVs is compared against β (285). If ΔVs is less than β, a decision may be rendered whether the holding mode or intensifying mode is to be selected. At this end, Dv is compared against −1.3 G (296). If Dv is less than −1.3 G, the holding mode (the intensify holding mode) is to be selected. Accordingly, at step 293 and subsequent steps, the present mode is examined, and if the present mode is intensifying mode, the intensify holding mode is established (294), 2/8 energization is estallished for the valve unit SOL1 (295), and the program proceeds to step 266. If the present mode is the intensify holding mode, no change is required, and the program returns. If Dv is equal to or greater than −1.3 G, it is necessary that the intensifying mode be established. Hnnce, the present control mode is examined, and if it is the intensifying mode the program directly returns. If the present mode is the intensify holding mode, the program proceeds to step 262 (297, 298).

Returning to step 285 again, if it is determined at this step that ΔVs is equal to or greater than β, ΔVs is compared against γ(286), and if ΔVs is greater than γ, the next control mode to be entered is the decompressing mode, and accordingly, the program proceeds to step 288. If ΔVs is equal to or less than γ, Dv is compared against 6 G (287), and if Dv is equal to or less than 6 G, the next control mode to be entered is the decompressing mode, and hence the program proceeds to step 288. If Dv exceeds 6 G, the next control mode to be entered is the intensifying mode, and the program proceeds to step 297.

A decision to determine the next control mode to be entered from the decompressing mode/decompress holding mode, which begins with step 309 in FIG. 11, will now be described. The present mode is examined (309), and if the present mode is the decompressing mode, the time duration of the decompressing mode is read from the content of the decompression counter, and is compared against 120 msec (323). If it is equal to or exceeds 120 msec, this means that one cycle of decompression control (fifth row, left column of FIG. 2) has been completed, and the program proceeds to step 245. If the time duration is less than 120 msec, the content of the decompression counter is compared against 48 msec (decompressing energization time: fifth row, lef column of FIG. 2) (324), and if it is equal to 48 msec, 2/8 energization (holding) is established for the valve unit SOL1 (325) and the program proceeds to step 313. If the time duration exceeds 48 msec, the program proceeds to step 313. Dv is compared against −1.3 G at step 313, and if Dv is equal to or less than −1.3 G, Dv is compared against −12 G at step 327, and if Dv is equal to or greater than −12 G, the program proceeds to step 330. If Dv is less than −12 G, the high μ flag is examined, and if it is set, the program proceeds to step 328 while the program proceeds to step 249 if the flag is not set.

When it is found at step 309 that the operation is not in the decompressing mode, it is then determined whether the operation is in the decompress holding mode (310). If this is not in the decompress holding mode (which is impossible to occur), the program returns. If the operation is in the decompress holding mode, the content of the control counter (decompress holding time durtation) is examined and is compared against 150 msec (312). If the content is equal to or exceeds 150 msec, it is determined that the decompression is insufficient, and accordingly the program proceeds to step 249 where the decompressing mode is established. If the content is less than 150 msec, Dv is compared against −1.3 G (313), and if Dv is equal to or less than −1.3 G, this means the decompressing mode or the continuous decompression mode, and therefore, the program proceeds to step 327. If Dv exceeds −1.3 G, ΔVs is compared against α (314), and if ΔVs is less than α, this means that the next control mode to be entered is the intensifying mode, and accordingly, the program proceeds to step 262 and subsequent steps where the intensifying mode is established. If ΔVs is equal to or greater than α, Dv is compared against −0.6 G (315), and if Dv is equal to or less than −0.6 G, the next control mode to be entered is either the decompressing mode or the continuous decompression mode, and accordingly the program proceeds to step 330 where the decompressing mode is established. If Dv exceeds −0.6 G, ΔVs is compared against β at step 316, and if ΔVs is less than β, the program proceeds to step 262 and subsequent steps where the intensifying mode is established. If ΔVs is equal to or greater than β, Dv is compared against 0.6 G at step 317, and if Dv is equal to or less than 0.6 G, the program proceeds to step 330. However, if Dv exceeds 0.6 G, Dv is compared against 6 G (318), and if Dv exceeds 6 G, AVs is compared against γ (329). If ΔVs is equal to or greater than γ, the next control mode to be entered is the decompress holding mode, and accordingly, the program proceeds to step 320. If ΔVs is less than γ, the next control mode is the intensifying mode, and accordingly, the program proceeds to step 262 where the intensifying mode is established. If it is found at step 318, that Dv is equal to or less than 6 G, ΔVs is compared against γ (319), and if it is equal to or greater than γ, the next control mode to be enteeed is the compressing mode, and accordingly, the program proceeds to step 303. If the ΔVs is less than γ, the next control mode to be entered is the decompress holding mode, and hence the program proceeds to step 320 and subsequent steps where the decompress holding mode is established.

As described, during the control in the intensifying mode, which occurs for the frrst time after the brake on condition has been established, if the next control mode to be entered is determined to be the decompressing mode, the operation immediately proceeds to the control in the decompressing mode after such decision in order to prevent the pressure from being intensified excessively (causing the wheels to be locked). However, if the control in the decompressing mode is executed even only one cycle (which clears the intensifying mode counter), the content of the intensifying mode counter is incremented from 0 to 1 at step 265 during the subsequent intensifying cycle, thus continuing the intensifying energization another time at steps 289 and 290. In this manner, the intensifying cycle is repeated at least two cycles, thereby increasing the length of the intensifying time duration. This necessarily increases the time duration of the decompressing operation whenever the decompression is subsequently required, thus increasing the period with which the liquid brake pressure rises and falls. As a consequence, the period of oscillation in the braking force which results from the rise and fall of the liquid brake pressure increases considerably beyond the period of the unsprung oscillations of the vehicle, thus preventing any amplification of the unsprung oscillations as a result of resonance or synchronization therebetween. In addition, an absorber control (steps 505 to 511) is performed in which the occurrence of three or more control cycles, each of which intensifies and decompresses the liquid brake pressure, during a time interval of 0.3 second is sensed to establish the hard conditions in the variable attenuation shock absorbers, thereby rapidly attenuating oscillations of the vehicle. Thus, one decompression cycle is followed by two consecutive cycles of the intensifying mode (second row, left column of FIG. 2), thus increasing the period with which the liquid brake pressure rises and falls, and this combined with the rapid attenuation of oscillations of a vehicle achieved by the absorber control, prevents a resonance with the unsprung oscillations.

In the intensifying mode or intensify holding mode, a decision is rendered to determine the next control mode to be entered as shown in FIG. 11b according to the segmentation chart sown in FIG. 6b. In the decompressing mode or decompress holding mode, a decision is rendered to determine the next control mode to be entered at steps 309 to 328 shown in FIG. 11 in accordance with the segmentation chart shown in FIG. 6c. Comparing FIGS. 6b and 6c against each other, it will be noted that a particular value of acceleration/deceleration G which delineate between the decompressing mode and the holding mode, a similar value which delineates between the holding mode and intensifying mode and another similar value which delineates between the intensifying mode and decompressing mode are located toward a lower acceleration in FIG. 6b and is located toward a higher accelration in FIG. 6c. This prevents a frequent switching between the intensifying and the decompressing cycle or vice versa, thus removing mechanical oscillations of the vehicle or an abnormal sensation which a driver of a vehicle may experience when applying the brake. The interpostion of the holding region (decompress holding and intensify holding) between the decompressing region and the intensifying region is effective to reduce the probability of producing a rapid change in the control of the brake pressure from the intensification to the decompression immediately or vice versa, thus reducing to the likelihood of the producing oscillations by a corresponding amount. In the event an oscillation of the liquid brake pressure has developed as a result of the control over the liquid brake presuure, such oscillation is detected at an early stage to establish the hard condition in the variable attenuation shock absorbers, thus rapidly attenuating the oscillation. In this manner, the influence of an oscillation in the liquid brake pressure is minimized.

When the brake pedal 1 is depressed, the antiskid control (control over the liquid brake pressure) is entered provided the estimated vehicle speed is equal to or greater than the first value or 20 km/h below which the antiskid control is not entered. This takes place by proceeding from step 159 to step 183 in response to the depression of the brake pedal 1, and after going through steps 184 to 187, the antiskid implement flag OCR is examined at step 188, and if this flag is not set, indicating that the antiskid control is not yet effective, the program proceeds to step 228 and then to step 229, from which the program returns to step 169 without entering the antiskid control if the control reference vehicle speed does not exceed 20 km/h. The need to implement the antiskid control is determined at steps 233 to 244 provided the speed exceeds 20 km/h, and if the need is recognized, the corresponding flag OCR is set at step 240, 242 or 244, thus proceeding to the antiskid control 205, 206 or 207.

Once the antiskid control is entered and as long as the brake pedal 1 continues to be depressed, thus setting the antiskid implement flag OCR, the control reference vehicle speed Vs is compared against 8 km/h, representing the second value or the terminal speed relating to the antiskid control for the rear wheels, at step 203, and the control reference vehicle speed Vs is compared against 10 km/h, representing the second value or the terminal speed for the aniiskid control of the front wheels, at step 204. If the control reference vehicle speed Vs is less than 10 km/h, the antiskid control for the front wheels is terminated by clearing the flag OCR and deenergizing he valve units SOL1 and SOL2. When the control reference vehicle speed Vs becomes less than 8 km/h, the antiskid control for both the front and the rear wheels is terminated by clearing the flag OCR and deenergizing the valve units SOL1, SOL2 and SOL3. Accordingly, once the antiskid control is entered with a speed equal to or greater than 20 km/h, the antiskid control is maintained until the estimate speed for the front wheels becomes less than 10 km/h or the estimate speed for the rear wheels becomes less than 8 km/h.

Thus the ntiskid control is initiated with a speed equal to or greater than 20 km/h, which assures an accurate detection of the initial conditions, which is in turn combined with a continued logical consistency, thus enhancing the continuity and the stability and avoiding any abnormal sensation which may be experienced by a driver of the vehicle and without any significant increase in the braking distance. When the brake pedal 1 is depressed at a speed less than 20 km/h, the antiskid control is not initiated. However, because the speed is low, the likelihood that the wheels may be locked is also low, and hence a manual operation of the brake by the driver is sufficiently capable of accommodating for the situations. If the wheels are locked, the low speed involved does not retract from the driving maneuverability and the stability, and this choice is preferred over the implementation of the antiskid control at a speed less than 20 km/h.

In the described embodiment, the occurrence of a oscillation in the liquid brake pressure is determined by the occurrence of a cyclic change from the intensifying mode to the decompressing mode three or more times during a time interval of 0.3 second, and an absorber control is performed which establishes the hard condition of the variable attenuation shock absorbers. However, a hard condition of the shock absorbers may be established in response to a single change from the intensifying mode to the decompressing mode, which is then recognized as an indication of the initiation of the antiskid control. In this instance, a decision to determine the occurrence of mechanical oscillations of the vehicle is unnecessary.

From the foregoing, it will be understood that in accordance with the invention, a decision that an oscillation in the braking force has developed as a result of the control over the liquid brake pressure initiates an absorber control to establish a hard condition in the variable attenuation shock absorbers, and the similar absorber control is performed in response to a single change from the nntensifying and decompressing mode, which is recognized as an indication of the initiation of the antiskid control, so that mechanical oscillations of the vehicle can be attenuated rapidly, and a stable antiskid control is enabled while preventing its resonance with the unsprung oscillation.

With the described embodiment, a short-period switching between intesifying and decompressing the liquid brake pressure or vice versa is reduced. In addition, if such switchigndoes occur, the absorber control attenuates such oscilaation rapidly, thus substantially eliminating mechanical oscillations of the vehicle and any abnormal senation on the part of a driver of the vheicle. The stability of the antiskid control in the low speed ragnes is improved as is the vehicle driving stability.

What is claimed is:

1. An antiskid control system for a vehicle including a variable attenuation shock absorber in a wheel suspension, said variable attenuation shock absorber having attenuation control means for producing a high attenuation force in a "hard" condition and an actuator for driving said attenuation control means to the "hard" condition, comprising:

a liquid brake pressure control valve unit interposed in a liquid brake pressure supply line from a brake master cylinder to a brake wheel cylinder for feeding a liquid brake pressure to the brake wheel cylinder;

a valve unit operator for determining the liquid brake pressure;

means for detecting the rotational speed of a wheel and control means for calcuting a reference vehicle speed from the rotational speed of the wheel and its asscited acceleration/deceleration, determining the need to decompress or intensify the liquid brake pressure when the relationship among the refrrence vehicle speed, the rotational speed of the wheel and the acceleration/deceleration of the wheel is in a predetermined decompression or intensifying range, repsectively, supplying a first command signal to the valve unit operator based on the determination for establishing a decompressing/intensifying condition in the liquid brake pressure control value unit to intiate antiskiide control, and supplying a second command signal to the actuator for driving said attenuation control means to the "hard" condition when the initiation of antiskid control is determined to prevent resonance of unsprung oscillations of the vehicle with oscillations in the liquid rake pressure which occur upon the initiation of antiskid control.

2. An antiskid control system according to claim 1 in which the control means supplies the second command signal to the actuator when a combination of decompressing/intensifying conditions has been repeated a given number of times within a given time internal after the first command signal has been delivered.

3. An antiskid control system acocridng to claim 1 in which the liquid brake pressure control valve unit comprises a bypass valve assembly including a first liquid brake pressure port which receives the liquid brake pressure from the brake master cylinder, a control output port which feeds the liquid brake pressure to the wheel cylinder, a control input port, a first power liquid pressure port, a first valve element for opening and closing a path between the control output port and the control input port, first spring means for urging the first valve element in its closing direction and a first piston responsive to the pressure at the first power liquid pressure port for urging the first valve element in its opening direction and a liquid pressure control valve assembly including a second liquid brake pressure port which receives the liquid brake pressure from the brake master cylinder, a liquid pressure controlling chamber communicating with the control input port, a second power liquid pressure port, as eocnd valve element for opening and closing a path between the liquid pressure controlling chamber and the second liquid brake pressure port, second spring means for urging the second valve element in its closing direction and a second piston which is urged by the pressure at the second power liquid pressure port in a direction to open the second vlave element for movement in the corresponding direction to reduce the volume of the liquid pressure controlling chamber and to increase the volume thereof by a movement thereof in the opposite direction and which is also urged by the pressure of the liquid pressure controlling chamber which acts in a direction to oppose the pressure of the second power liquid pressure port and wherein the valve unit operator comprises a power liquid pressure source for feeding an accumulator pressure to the first power liquid pressure port of the bypass valve assembly and a switching solenoid valve unit disposed between an accumulator pressure output port and a drain pressure port of the power liquid pressure source and the second power liquid pressure port of the liquid pressure control valve assembly for connecting the second power liquid pressure of the liquid pressure control valve unit to the accumulator pressure output port when the first command signal indicates an intensifying condition and to the drain pressure port when the first command signal indicates a decompressing condition.

5. An antiskid control system according to claim 3 in which the power liquid pressure source comprises
an electric motor,
a liquid pressurizing pump driven by the motor, and
an accumulator which receives a discharge pressure from the pump and feeds an acuumulator pressure to the first power liquid pressure port of the bypass valve assembly.

5. An antiskid control system according to claim 4 in which the switching solenoid valve unit comprises
a multi-position switching solenoid valve unit having an intensifying position in which the second power liquid pressure port of the liquid pressure control valve assembly is connected to the accumulator pressure output port,
a holding position in which the second power liquid pressure port is closed and
a decompressing position in which the second power liquid pressure port is connected to the drain pressure port, and in which the control means determines the need to intensify, hold or decompress the liquid brake pressure on the basis of the reference speed, the rotational speed speed of the wheel and the acceleration/deceleration of the wheel, thereby operating the switching solenoid valve unit to one of the intensifying, holding and decompressing positions.

6. An antiskid control system according to claim 5 in which the control means determines the rate at which the liquid brake pressure fed to the wheel cylinder is intensified by a combination of the time duration of the intensifying position and the time duration of the holding position, and also determines the rate at which the liquid brake pressure fed to the wheel cylinder isdecompressed, by a combination of the time duration of the decompressing position and the time duration of the holding position.

7. An antiskid control system for vehicles including a variable atenuation shock absorber in a wheel suspension, said variable attenuation shock absorber having an attenuation control means producing a high attenuation force in a "hard" condition and an actuator for driving said atenuation control means to the "hard" condition, comprising;

a liquid brake pressure control valve unit having an intensifying position in which a brake wheel cylinder is connected to a brake master cyinder, a decompressing position in which the brake wheel cylinder is connected to a drain pressure and a holding position in which the brake wheel cylinder is disconnected from the brake master cylinder and the drain pressure;

valve unit operator for driivng the liquid brake pressure còntrol valve unit to the intensifying, decompressing and holding positions;

means for detecting the rotation speed of a wheel, and control means for calculating a reference vehicle speed from the rotational speed of the wheel and its associated acceleration/deceleration, determining the need to decompress or intensify the liquid brake pressure when the relationship among the reference vehicle speed, the rotation speed of the wheel and the acceleration/deceleration of the wheel is in a predetermined decompression or intensifying range, respectively, supplying a position command signal to the valve unit operator based on the detemrination for establishing a decompressing/intensifying condition in the liquid brake pressure control valve unit to initaite antiskid control, and supplying an attenuation command signal to the actuator for driving said attenuation control means to the "hard" condition when the initiation of antiskid control is determined to prevent resonance of unsprung oscillations of the vehicle with oscillations in the liquid brake pressure upon the initaiton of antiskid control;

wherein said control means supplies position command signals to said valve unit operator to drive asid control valve unit to said decompressing position and said holding position alternately when the control means determines said decompressing condition;

said control means supplies said position commadd signals to said valve unit operator to drive said control valve unit to said intensifying position and said holding position alternately when the control means determines said intensifying condition; and said control means supplies said position command signals to said valve unit operator to drive said control valve unit to said intensifying position and holding position alternately at least two times when the determination changes from said decompressing condition to said intensifying condition.

* * * * *